COMPUTER MEANS FOR USE WITH SCALES

Filed Aug. 21, 1963 16 Sheets-Sheet 1

INVENTORS
HENRY J. CICHANOWICZ
CLAYTON C. DEWITT

BY Dawson, Jackson, Bottcher & Dummer
ATTYS.

INVENTORS
HENRY J. CICHANOWICZ
CLAYTON C. DEWITT
BY Brown Jackson Boettcher & Dienner
ATTYS.

July 16, 1968 H. J. CICHANOWICZ ET AL 3,393,302

COMPUTER MEANS FOR USE WITH SCALES

Filed Aug. 21, 1963 16 Sheets-Sheet 3

INVENTORS
HENRY J. CICHANOWICZ
CLAYTON C. DEWITT

BY Brown, Jackson, Boettcher & Dienner
ATTYS.

INVENTORS
HENRY J. CICHANOWICZ
CLAYTON C. DEWITT
BY Brown, Jackson, Boettcher & Dienner
ATTYS.

INVENTORS
HENRY J. CICHANOWICZ
CLAYTON C. DEWITT

BY Brown, Jackson, Boettcher & Dienner
ATTYS.

COMPUTER MEANS FOR USE WITH SCALES

Filed Aug. 21, 1963 16 Sheets-Sheet 6

INVENTORS
HENRY J. CICHANOWICZ
CLAYTON C. DEWITT

BY Brown, Jackson, Boettcher & Dienner
ATTYS.

INVENTORS
HENRY J. CICHANOWICZ
CLAYTON C. DEWITT
BY Brown, Jackson, Boettcher & Dienner
ATTYS.

COMPUTER MEANS FOR USE WITH SCALES

Filed Aug. 21, 1963 16 Sheets-Sheet 8

INVENTORS
HENRY J. CICHANOWICZ
CLAYTON C. DEWITT
BY Brown Jackson Boettcher & Dienner
ATTYS.

LOGIC SEQUENCE CIRCUIT
130

INVENTORS
HENRY J. CICHANOWICZ
CLAYTON C. DEWITT

BY Brown Jackson Boettcher & Dienner
ATTYS.

July 16, 1968 H. J. CICHANOWICZ ET AL 3,393,302

COMPUTER MEANS FOR USE WITH SCALES

Filed Aug. 21, 1963 16 Sheets-Sheet 10

LOGIC SEQUENCE CIRCUIT 130

INVENTORS
HENRY J. CICHANOWICZ
CLAYTON C. DEWITT

BY Brown Jackson Boettcher & Dienner
ATTYS.

INVENTORS
HENRY J. CICHANOWICZ
CLAYTON C. DEWITT
BY Brown, Jackson, Boettcher & Dienner
ATTYS.

COMPUTER MEANS FOR USE WITH SCALES

Filed Aug. 21, 1963 16 Sheets-Sheet 12

INVENTORS
HENRY J. CICHANOWICZ
CLAYTON C. DEWITT

BY Brown, Jackson, Boettcher & Dienner
ATTYS.

COMPUTER MEANS FOR USE WITH SCALES
Filed Aug. 21, 1963 16 Sheets-Sheet 13
FIG. 13 A
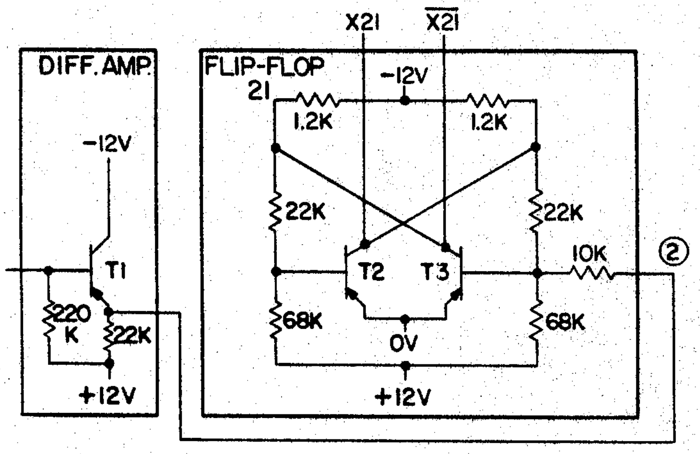
FIG. 13 B
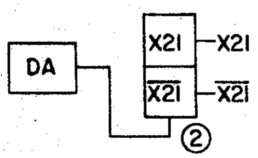
FIG. 13 C
| | | X21 | $\overline{X21}$ |
|---|---|---|---|
| ② | +12 | 0 | -12 |
| ② | -12 | -12 | 0 |
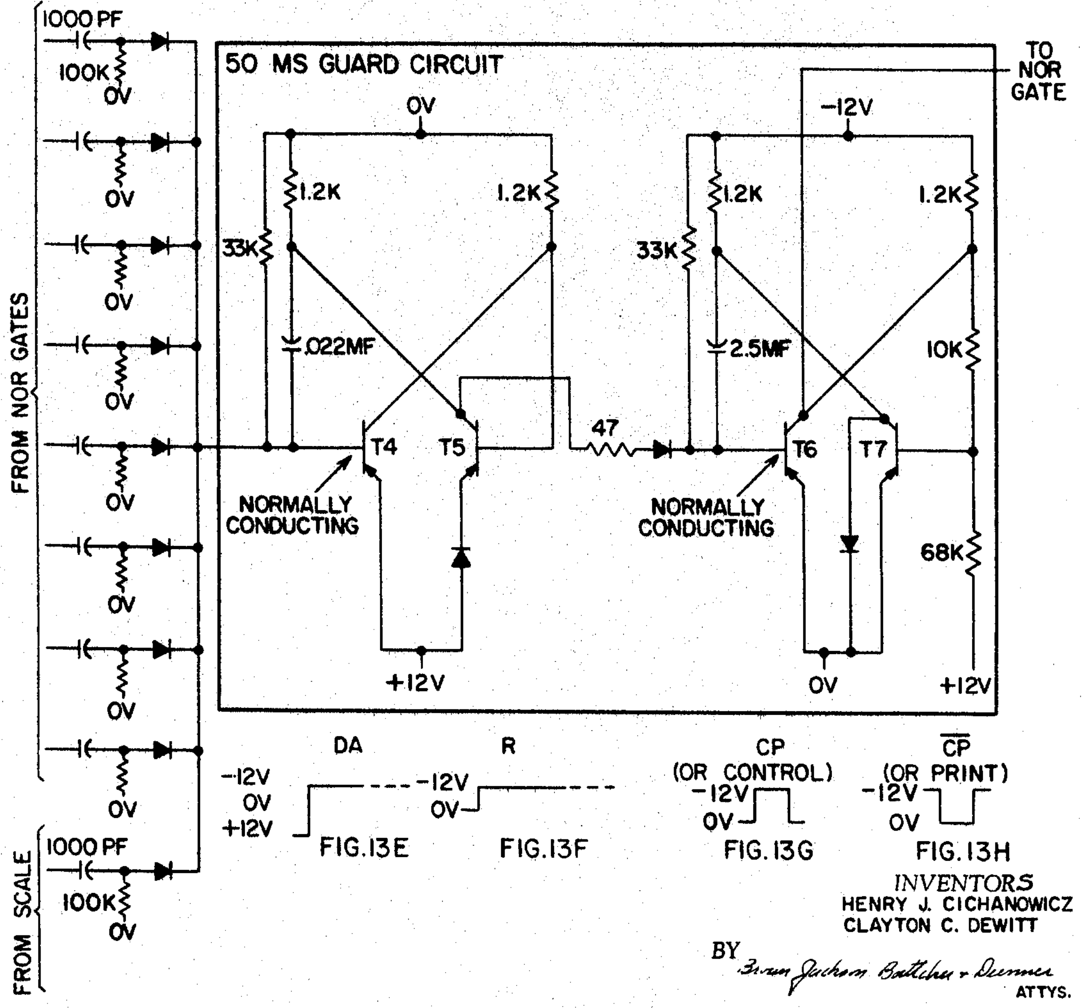
FIG. 13 D, FIG. 13 E, FIG. 13 F, FIG. 13 G, FIG. 13 H
INVENTORS
HENRY J. CICHANOWICZ
CLAYTON C. DEWITT
BY *[signature]*
ATTYS.

INVENTORS
HENRY J. CICHANOWICZ
CLAYTON C. DEWITT
BY Brown, Jackson, Boettcher & Dienner
ATTYS.

FIG. 14 A
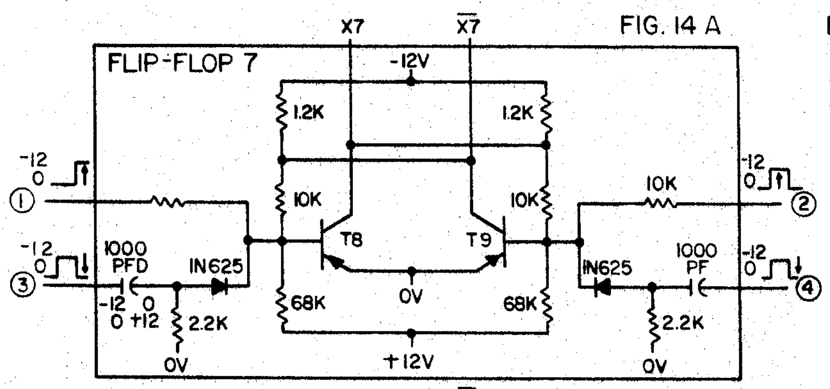
FIG.14B
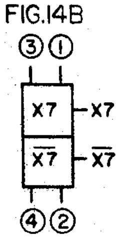
FIG.14C
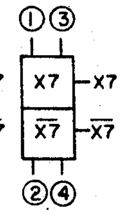
FIG.14 D
| | X7 | $\overline{X7}$ |
|---|---|---|
| ① | 0 | -12 |
| ② | -12 | 0 |
| ③ | -12 | 0 |
| ④ | 0 | -12 |
FIG. 14 E, FIG. 14 G
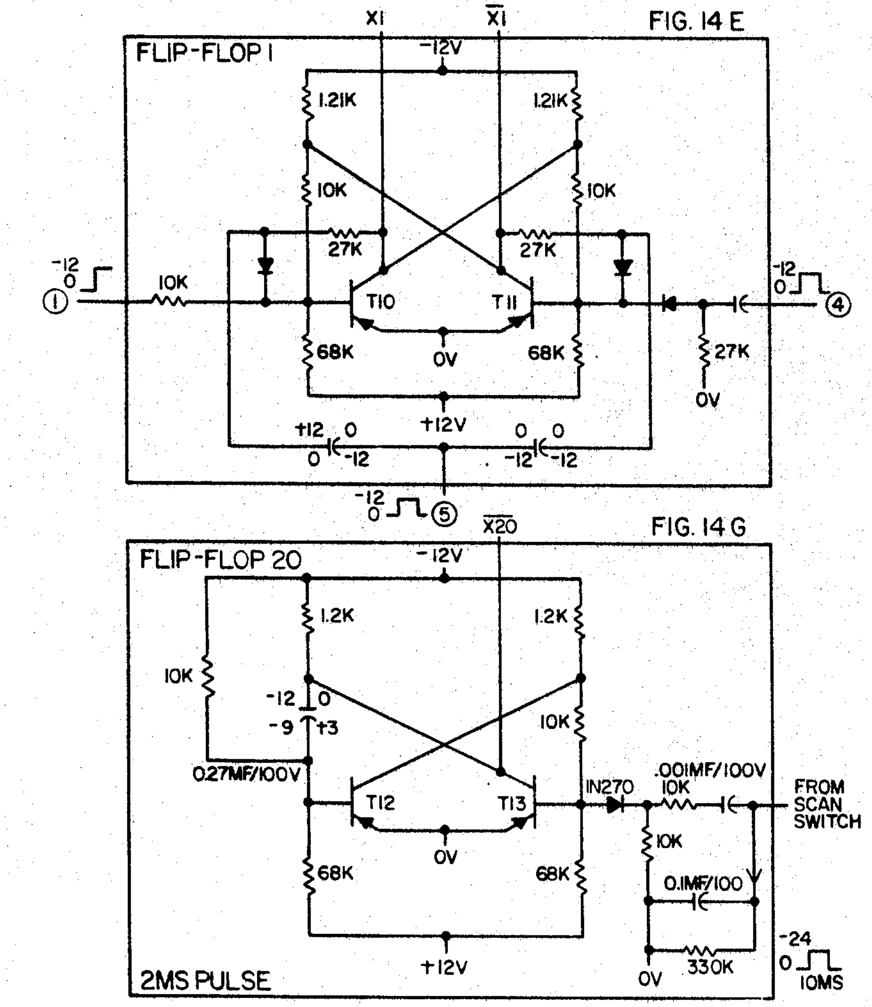
FIG.14 F
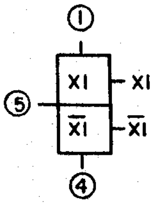
FIG.14 H
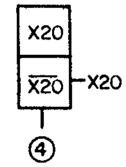
INVENTORS
HENRY J. CICHANOWICZ
CLAYTON C. DEWITT
BY Brown, Jackson, Boettcher & Dienner
ATTYS.

COMPUTER MEANS FOR USE WITH SCALES

Filed Aug. 21, 1963 16 Sheets-Sheet 16

NOR GATE

AND GATE

INHIBIT GATE

INVENTORS
HENRY J. CICHANOWICZ
CLAYTON C. DEWITT
BY Brown, Jackson, Boettcher & Dienner
ATTYS.

United States Patent Office 3,393,302
Patented July 16, 1968

3,393,302
COMPUTER MEANS FOR USE WITH SCALES

Henry J. Cichanowicz, Galion, Ohio, and Clayton C. De Witt, Torrance, Calif., assignors to North Electric Company, Galion, Ohio, a corporation of Ohio Filed Aug. 21, 1963, Ser. No. 303,644
23 Claims. (Cl. 235—151.33)

The present invention relates to weighing scales and more specifically to price and weight computation means which form a part therewith.

In supermarkets, butcher-shops, and the like, weighing scales are provided comprising a weighing scale proper, a computer, and a labeler including printer means which are adapted to mark packages and print labels which have printed thereon the weight, the price per pound, and the total price.

In the use thereof to weigh an article, the attendent would first manually turn three dials (dollars, dimes, and cents) on the labeler to represent the price per pound. Thereupon he would place the article to be weighed on the scale. As a result thereof, the scale provides the weight to the computer which in turn uses this information together with the price per pound from the labeler to compute the total price. The weight and total price determined by the computer enable the labeler to print the individual label for the package being weighed. The operator then removes the package from the scale, and attaches the individual label thereto. Thereupon the operator places another package containing an article on the scale, and the process is repeated until all the packages have been weighed and labeled. If the next batch of goods to be weighed bears a different price per pound, the manual setting of the dials is adjusted before the weighing operation is initiated.

While electromagnetic relay arrangements are known in the prior art to operate in such manner, it is considered desirable to provide computer means which are less bulky, less cumbersome and faster in operation. It is one object of the present invention therefore to provide an electronic computer for such a scale, and particularly a computer of such type which basically uses solid state components.

A specific object of the invention is to provide a system for weighing articles providing a price therefor which includes price register means which are adjustable by an attendant to register the price of the article per unit weight, a scale device which provides electrical signals representative of the weight of the article, a counting device which includes means for registering the different digits representing the weight of the article, means for operating the counter in a reverse count to determine the value of the digits marked thereon, and computer means operatively controlled by the counter means and the price register means to compute the product of the price registered on said price register means and the weight of the article marked on the counter means.

It is a further object of the invention to provide a computer arrangement of such type which includes motion detection means for detecting motion of the weighing mechanism indicated by the changing value of the electrical signals, and inhibit means for preventing system operation during the period of motion detection.

It is yet another object of the invention to provide sequence control means in such type arrangement which includes weight sequence means for controlling marking of the digits which represent the weight on said counter in a predetermined sequence, and in which the counter means are operative to determine the value of each digit as marked thereon by a reverse counting operation.

It is yet another object of the invention to provide a computing system for a signal of the type set forth in which the electrical signals provided by the signal device to the counter means are in a binary decimal reflected code, and which further includes means for translating such signals to a non-reflected form of the code.

It is yet another object of the invention to provide computer means of the type set forth in which the price register means includes means operative with each step on the counter in determining the value of the digit marked thereon to compute signals representative of partial product information of the price registered on the price register means and one count of the digit marked on the counter means.

It is a further object of the invention to provide a computer means of the type described above which includes a plurality of decade counter means having means operative with the price register means and the counter means to register the product of the price and the weight of the article, and print means connected to the decade counter to provide a printed record of such product.

It is an additional object of the invention to provide a computer system of the type disclosed which includes novel print means for providing a printed record of the product of the weight and price per pound including a set of print wheels, each of which has ten different decimal digits disposed thereon in sequence and each of which is operative to print the value of the digit which is stored in a different one of the decade means, means for initially setting each of the print wheels to the digit nine print position, pulse means for advancing the value of the digit in each of the decade counters one unit higher, and simultaneously stepping each of the wheels to a print position one unit lower, and means for stepping each print wheel as its associated decade counter advances to the digit zero, whereby the digit wheel will be operative to print the digit initially registered on its associated decade counter.

These and other advantages of the present invention will become apparent with reference to the following specification and accompanying drawings wherein basic embodiments of the structure are illustrated, and in which:

FIGURE 1 sets forth a block diagram of the system;

FIGURES 2–12 set forth a logic diagram of the system;

FIGURE 13A sets forth a circuit diagram of a Differential Amplifier and Flip-Flop of FIGURE 2;

FIGURE 13B sets forth a Logic Symbol of Differential Amplifier and Flip-Flop of FIGURE 2;

FIGURE 13C sets forth a Truth Table of Flip-Flop 21 of FIGURE 2;

FIGURE 13D sets forth a circuit diagram differentiating networks and fifty millisecond guard circuit of FIGURE 2;

FIGURES 13E–13H set forth the Definition of Signals used in the system;

FIGURE 14A sets forth a circuit diagram of Flip-Flop 7 of FIGURE 3;

FIGURES 14B and 14C set forth the logic symbols of Flip-Flop 7 of FIGURE 3;

FIGURE 14D sets forth a truth table of Flip-Flop 7 of FIGURE 3;

FIGURE 14E sets forth a circuit diagram of Flip-Flop 1 of FIGURE 4;

FIGURE 14F sets forth a logic symbol of Flip-Flop 1 of FIGURE 4;

FIGURE 14G sets forth a circuit diagram of Flip-Flop 20 of FIGURE 12;

FIGURE 14H sets forth a logic symbol of Flip-Flop 20 of FIGURE 12;

FIGURE 15A sets forth a circuit diagram of Print Control Circuits of FIGURE 6;

FIGURE 15B set forth a circuit diagram (typical) of NOR gates used in the system;

FIGURE 15C sets forth a logic symbol (typical) of NOR gates used in the system;

FIGURE 15*D* sets forth a circuit diagram (typical) of AND gates used in the system;

FIGURE 15 E sets forth a logic symbol (typical) of AND gates used in the system;

FIGURE 15F sets forth a logic symbol (typical) of INHIBIT gate means used in the system;

FIGURE 16A sets forth a circuit diagram of Flip-Flop 19 of FIGURE 8;

FIGURE 16B sets forth a logic diagram of Flip-Flop 19 of FIGURE 8; and

FIGURE 17 sets forth an assembly diagram for FIGURES 2–12.

GENERAL DESCRIPTION

Referring to FIGURE 1, a block diagram of the novel scale system is shown thereat. The scale system basically comprises a scale proper 100, a computer 101, and a labeler 102. Computer 101 as shown comprises a plurality of functional circuits. The labeler 102 includes the novel adjustable price switches 120 and the printer 121. In use, the attendant adjusts the price switches 120, places the goods to be weighted on the scale 100, and the computer 101 enables the labeler 102 to print a label containing the price per pound, the weight of the goods, and the total price.

The price switches 120 of the labeler may be adjusted for articles in a range extending from $.01 per pound to $4.99 per pound. The adjustment is effected by means of a dollars switch, a dimes switch, and a pennies switch on the scale (as shown in FIGURE 4 and described more fully hereinafter). Adjustment of these switches mechanically turns the price per pound wheels in the printer 121 (FIGURES 1, 7) to the correct position and adjusts the arms of dollars, dimes, and cents electrical switches (FIGURES 1, 4) to the correct position, whereby a forward counter 112 is selectively coupled through a logic circuit to the sequence circuit. Thereupon the operator places the item to be weighed on the scales. In the present embodiment, the weight may vary from .01 pound to 24.99 pounds. The fixed part of the scale 100 contains four groups of photoresistors, one group for each of the four digits of weight (FIGURE 2). The movable part of the scale 100 contains four tracks in registry with the photoresistors, each track comprising opaque and transparent regions. Light shining through the transparent regions actuates the photoresistors which reduces their resistance. Electrical signals are transmitted from the photoresistors to the differential amplifier 104, in a units distance binary reflected cyclic code.

The differential amplifiers 104 operate associated flip-flops 105. As long as the scale is in motion and has not settled, the weight control 123 comprising a flip-flop indicated as F19 only allows signals to pass from the flip-flops through NOR gates 107 which actuate the motion detector 108. The motion detector gives out a reset signal R to the whole system and inhibits the clock 109 so that the clock cannot give out clock pulses CP or $\overline{CP}$ used for synchronizing and enabling purposes. Clock pulses are pulses of approximately ten microseconds width with approximately twenty microseconds between pulses. CP pulses are negative pulses (0 v. to −12 v. to 0 v.) the trailing edges of which constitute positive going signals. $\overline{CP}$ pulses are positive pulses (−12 v. to 0 v. to −12 v.), the trailing edges of which constitute negative going signals. A $\overline{CP}$ pulse through an inverter becomes a negative pulse with a positive going trailing edge.

After the scale 100 has settled, the motion detector 108 removes the reset signal R, and removes the inhibit signal from the clock whereupon the clock resumes the propagation of clock signals CP and $\overline{CP}$ to the system.

The weight control 123 receiving CP pulses then signals the Logic Sequence Circuitry 130, inhibits the NOR gates 107, and enables the AND gates, and the code expressing the setting of the scale is passed through the code translator 110 into the backward counter 111 comprising flip-flops indicated as F7, F8, F9, and F10 in a programmed manner.

This programming is controlled by the weight program 127 comprising flip-flops indicated as F11 and F12. Since each flip-flop has two positions, four states are determined. The first state selectively enables the scale sequence control 122 which in turn enables the "ten pound" photoresistors on the scale (FIGURE 2) whereby the tens-of-pounds digit of weight passes into the background counter 111, in combination form, in one step.

The background counter 111 signals the Logic Sequence Circuitry (LSC) 130 as to the digit registered therein. The Logic Sequence Circuitry signals the Weight Control 123 which signals the Scale Sequence Control 122 which disconnects the signal for the ten pound digit from the scale 100 to the Backward Counter 111.

Thereupon the Logic Sequence Circuitry (LSC) drives the Background Counter 111 back step-by-step until it reaches the zero position, to count the value therein.

This backward stepping by the Backward Counter 111 controls the Weight Sequence Circuit 131 (which is also programmed by the Weight Program 127) to operate the weight accumulator 116 in the stepping of a Decade Counter 118 to register the tens of pounds digit.

The Forward Counter 112 is a straight binary counter comprising flip-flops designated F1, F2, F3, and F4 and following every backward count of the backward counter 111 goes through a stepping program, comprising a complete round of ten steps for the dollars digit of price, another round for the dimes digit of price, and another round for the cents digit of price. During the dollars round a partial product is fed via logic circuitry over the Price Switches 120 (FIGURES 1 and 4), the Price Sequence Circuit 114 (see also FIGURE 5) and the Price Accumulators 115 (FIGURES 1 and 5) into the Decade Counters 117 (FIGURES 1 and 6) in accordance with the setting of the dollars switch (FIGURES 1 and 4). Because the weight digit being considered is tens of pounds this partial product steps the tens of dollars decade counter (FIGURE 6).

It should be observed that the Price Sequence Circuit 114 is controlled by the Weight Sequence Circuit 131 and also by the Price Program Circuit 126 comprising flip-flops F5 and F6 which provide combinational positions, one for dollars, another for dimes, and another for cents.

During the next round of the forward counter 112 (the dimes round), a partial product will be fed into the dollars decade counter (FIGURE 6), as determined by the setting of the dimes price switch, which is such that the tens-of-pounds being considered results in dollars.

During the next round of the forward counter 112 (the cents round), a partial product will be fed into the dimes decade counter (FIGURE 6).

The Forward Counter 112 keeps reporting its position to the LSC circuitry 130. Logic Sequence Circuitry, for purposes of brevity, will be referred to hereinafter by the letters LSC. The Forward Counter 112 having completed its three rounds, the LSC 130 drives the Backward Counter 111 backward another step.

Thereupon the Forward Counter 112 goes through its three rounds again and the same partial products are fed into the same decade counters.

This procedure continues until the Backward Counter 111 has reached the zero position whereupon the Backward Counter 111 is reset by LSC 130, the Weight Control 123 is conditioned by the LSC 130 for the next digit of weight, and the Weight Program 127 comprising flip-flops F11 and F12 takes its next sequential position representing pounds. The Scale Sequence Control 122 and the Weight Sequence Circuit 131 are now advanced one step.

The Scale Sequence Control 122 energizes the "1 lb." set of photoresistors in the Scale (FIGURES 1 and 2) and the pound digit of weight is read into the Backward Counter 111.

Thereupon the Backward Counter is driven backward a step at a time, each step being registered in the Decade Counters associated with weight. The Forward Counter 112 goes through its count program following each backward step of the Backward Counter 111. Due to the shifting of place value by the Price Sequence Circuit 114 under the influence of the Price Program 126 and Weight Program 127, partial products are fed into the dollars, dimes, and cents decade counters (see also FIGURE 6).

Thereupon the Scale Sequence Counter 122 energizes the .1 lb. photoresistor group in the Scale (see also FIGURE 2) and a digit representing the number of tenths-of-a-pound is read into the Backward Counter 111. Thereupon the Backward Counter 111 is then driven backward a step at a time, each step being registered in the Decade Counters 118 associated with weight.

The Forward Counter 112 goes through its count program following each backward step of the Backward Counter 111. Due to the shifting of place value by the Price Sequence Circuit 114 under the influence of the Price Program 126 and the Weight Program 127, partial products are fed into the dimes, cents, and tenths of a cent decade counters (FIGURE 6).

Thereupon the Scale Sequence Control 122 energizes the .01 lb. photoresistor group in the Scale (FIGURE 2) and a digit representing the number of hundredths-of-a-pound is read into the Backward Counter 111. The Backward Counter 111 is driven backward a step at a time, each step being registered in the Decade Counters 118 associated with weight. The Forward Counter 112 goes through its count program following each backward step of the Backward Counter 111.

Due to the shifting of place value by the Price Sequence Circuit 114 under the influence of the Price Program 126 and the Weight Program 127, partial products are fed into the cents, tenths of a cent, and hundredths of a cent decade counters (FIGURE 6).

This is illustrated by the following table:

TABLE I

| | | $4 | .2 | 7 | | |
|---|---|---|---|---|---|---|
| X | 2 | 3 | .1 | 9 | | |
| Tens Of | $ | $1 | D | ¢ | Tenths ¢ | Hundredths ¢ |
| 4 | --- | 2 | 7 | | | |
| 4 | --- | 2 | 7 | | | |
| | | 4 | 2 | 7 | | |
| | | 4 | 2 | 7 | | |
| | | 4 | 2 | 7 | | |
| | | | 4 | 2 | 7 | |
| | | | | 4 | 2 | 7 |
| | | | | 4 | 2 | 7 |
| | | | | 4 | 2 | 7 |
| | | | | 4 | 2 | 7 |
| | | | | 4 | 2 | 7 |
| | | | | 4 | 2 | 7 |
| | | | | 4 | 2 | 7 |
| | | | | 4 | 2 | 7 |
| | | | | 4 | 2 | 7 |

Digressing, as the Backward Counter counts backward it actuates the Odd-Even Circuit 124 comprising flip-flop F13 via the LSC 130. The Odd-Even Circuit 124 keeps track of whether the previous digit registered in the Backward Counter was odd or even (decimally considered) whereby the Code Translator 110 is enabled to effect the desired translation.

Returning from the digression, after all partial products have been fed into the decade counters, which have carry provisions, it is necessary to round off to the nearest cent. Accordingly, the LSC 130 actuates the Round-off circuit 125 comprising flip-flop F18 (FIGURES 1 and 11) which conditions the Price Accumulator Circuit 115 to prepare the path to the tenths-of-a-cent decade counter. Thereupon the LSC 130 drives the Forward Counter 112 through a round during which five counts are placed in the tenths of a cent decade counter. If the digit originally in the tenths of a cent decade counter was five or higher there will be a carry to the cents decade counter for round off purposes.

With the Round-Off Circuit 125 actuated, the weight and price programs 126, 127 cycles completed, and the Forward Counter 112 in the nine position (positions running from 0–9), the LSC 130 actuates the Printer Start Control Circuit 128 comprising flip-flop F14, and releases the Round-Off Circuit 125.

The Print Start Control Circuit 128 actuates the Print Control Circuit 119 (FIGURE 6) which in turn actuates the Start Circuitry in the Printer 121. This actuates the Print Motor which, via slip clutch and gear means, drives the wheels and a Sequence Switch in the Printer in a single revolution in the counter-clockwise direction.

At each position of the Sequence Switch 129, a signal is fed to the LSC 130 which in turn feeds a pulse through the Price and Weight accumulators 115, 116 into the Decade Counters 117, 118.

After each decade counter reaches its position "9," the next pulse into the decade counter results in a pulse outgoing therefrom which, via the Print Control Circuit 119, energizes an associated solenoid in the printer which stops the associated wheel at the proper position.

Thus, in effect, pulses equal in number to the tens complement is fed into each decade counter resulting in steps taken by the print wheel equal to one less than the tens complement when stoppage of the print wheel occurs. Such action provides the nines complement number of steps taken by the print wheel so that with the characters on the print wheels in reverse and advancing in the order 9, 8, 7, etc., the character to be printed corresponds to the original digit in the decade counter.

As a specific example, if the digit seven is in a given decade counter, an output from the decade counter occurs after three additional pulses input thereto. As the first pulse occurs with the print wheel in the "nine" position the decade counter is driven to its position "eight." As the second pulse occurs with the print wheel in the eight position, the decade counter is driven to its "nine" position. As the third pulse occurs with the print wheel in the seven position, the decade counter is driven to its position "zero" whereupon the output therefrom effects the stopping of the print wheel. This may be summarized as follows:

TABLE II

| Digit in Decade Counter | Pulses to Decade Counter Before Print Wheel Stops | Steps Taken by Print Wheel | Stopping Position of Print Wheel |
|---|---|---|---|
| 0 | 10 | 9 | 0 |
| 1 | 9 | 8 | 1 |
| 2 | 8 | 7 | 2 |
| 3 | 7 | 6 | 3 |
| 4 | 6 | 5 | 4 |
| 5 | 5 | 4 | 5 |
| 6 | 4 | 3 | 6 |
| 7 | 3 | 2 | 7 |
| 8 | 2 | 1 | 8 |
| 9 | 1 | 0 | 9 |

When the motor has driven the wheels and sequence switch through the single revolution, the motor controls a print bar which operates to print the determined price per pound, weight, and total price on the label 103.

The operator thereupon removes the package from the scale 100 and affixes the label thereto. As a result of the return of the Scale to normal, the computer 101 and printer 102 become reset.

DESCRIPTION OF BASIC CIRCUIT COMPONENTS

A description of the different basic logic circuits used in the system is set forth hereat prior to the detailed description of the operation of the specific circuitry of the computer. The basic circuitry includes NOR gates, AND gates, Differential Amplifier, Differential Networks and Flip-Flops, each of which is briefly described hereat.

*NOR gate*

A typical NOR gate used is shown in FIGURE 15B and comprises a transistor, such as transistor T16, biassed as shown by a plurality of inputs to the base, and an output connected to the collector of transistor T16. Any input may have 0 volts or −12 volts thereon. The output will have approximately 0 volts or −12 volts thereon.

If all inputs have 0 volts thereon the transistor will be cut off and the output from the collector will be −12 volts. If any one of the inputs has −12 volts thereon, the transistor will conduct and the output will have 0 volts thereon. A NOR gate with a single input, therefore, becomes an inverter. While typical values are shown for the NOR circuit, these values may change under varied conditions of loading inputwise and outputwise.

FIGURE 15C illustrates the logic symbol used for the NOR gate in the description which appears hereinafter.

If "0" volts is considered "no input" the operation of the Nor gate can be summarized as follows:

(1) If there are no inputs there will be an output.

(2) If there is any input there will be no output.

*AND gate*

AND gates are also used in the computer. A typical AND gate is shown in FIGURE 15D and as there shown comprises a plurality of inputs, each having a diode therein poled to conduct with 0 volts on the left thereof and negative voltage through a 2.4K resistor on the right.

If 0 volt is on any input the output will be at 0 volts.

If all inputs are at −12 volts, no diode will be conducting and the output will be at approximately −12 volts.

*Differential amplifier and flip-flop 21 (See FIGURES 2 and 13a)*

Referring to FIGURE 2, the leads marked 10 lb., 1 lb.—.1 lb.—and .01 lb. have either 0 volts or −12 volts potential thereon according to the condition of the Scale and the programming of the Scale Sequence Circuit 122 (FIGURE 8).

If 0 volts is on a given one of these leads, the input through an associated photoresistor, such as 217, and a rectifier, such as 231, to a Differential Amplifier, such as 235, will be 0 volts.

If −12 volts is on a given one of these leads, the input through an associated photo-resistor, such as 217, and a rectifier, such as 231, to a Differential Amplifier, such as 235, will be governed by the resistance of the photoresistor.

Referring now to FIGURE 13A, the input lead of the Differential Amplifier is connected to the base of a transistor, such as T1. Accordingly the base of this transistor may be at 0 volts, high resistance −12 volts, with no light shining on the associated photoresistor, or lower resistance −12 volts, with light shining on the associated photoresistor.

With the base at 0 volts or at high resistance −12 volts, the transistor is non-conducting and the emitter thereof is at approximately +12 volts.

With the base thereof at low resistance −12 volts, the transistor fully conducts, raising the emitter potential to approximately −12 volts.

The emitter of the transistor T1 is connected to an input designated ② to Flip-Flop 21.

Flip-Flop 21 comprises a driven multivibrator having a pair of transistors T2, T3 including a first output lead X21 connected to the collector of the left transistor and a second output lead $\overline{\text{X21}}$ connected to the collector of the right transistor. $\overline{\text{X21}}$ should be read "X21 bar." The emitters are connected to zero potential, and the base elements are connected over volt duration (1.2K, 22K', 68K' between +12 and −12 volts). The collectors are connected at the position of the 1.2K and 22K resistors. When the input ② is at +12 volts, the right transistor is cut off so that the collector ($\overline{\text{X21}}$) thereof is at approximately −12 volts as determined by the left voltage divider comprising resistors 68K, 22K, and 1.2K.

The base of the left transistor is biassed negative with respect to the emitter by the left voltage divider, so that the left transistor is fully conducting, and collector (X21) is very close to 0 volts.

With input ② at 0 volts, the potential of X21 will be 0 volts, and the potential of $\overline{\text{X21}}$ will be at −12 volts. If the input ② becomes −12 volts, as illustrated in DA of FIGURE 13E, this −12 volt through resistor 10K causes the right transistor to fully conduct, whereby $\overline{\text{X21}}$ becomes 0 volt.

With the right transistor fully conducting, the upper end of the 22K resistor of the left voltage divider becomes 0 volts, whereby the base of the left transistor becomes approximately four volts positive with respect to the emitter, causing the left transistor to be cut off. With this transistor cut off, X21 is approximately −12 volt as determined by the right voltage divider.

Referring now to FIGURE 13B, the Differential Amplifier and Flip-Flop 21 are shown in logic form suitable for use in the logic diagram of FIGURE 2, Flip-Flop 21 being turned clockwise ninety degrees. For convenience, the upper part of the Flip-Flop 21 of FIGURE 13B is designated X21, and the lower part is designated $\overline{\text{X21}}$.

FIGURE 13C comprises a "truth table" for Flip-Flop 21 which may be read as follows. With input ② at +12 volts, X21 will be at 0 volts and $\overline{\text{X21}}$ at −12 volts. With input ② at −12 volts, X21 will be at −12 volts and $\overline{\text{X21}}$ at 0 volts.

*Differentiation networks and fifty millisecond guard circuit (See FIGURES 2 and 13D)*

When the scale is in motion, negative control pulses (such as shown in FIGURE 13E) are output from various of the Flip-Flop outputs X21, $\overline{\text{X21}}$, X22, $\overline{\text{X22}}$, X23, $\overline{\text{X23}}$, X24, and $\overline{\text{X24}}$ (see FIGURE 2) to NOR gates, such as 248–250; 240–247 connected thereto. As a result thereof negative control pulses such as shown in FIGURE 13E output from the NOR gates enter the differentiating networks, such as 251–259 in the motion detector 108. Also, a "No Load Sense" (NLS) lead from the scale 100 is coupled to the differentiating network 251. When the scale goes off-normal, or returns to normal, a negative pulse appears on lead NLS. Referring now to FIGURE 13D, the inputs from the NOR gates, such as 240–247 and from the "No Load Sense" lead NLS to the different networks 251–259 are shown thereat.

As negative pulses come into the differentiating circuits 251, 259, the trailing edges thereof which constitute positive going signals pass through the associated condenser, such as C1, and rectifier, such as R1, poled to pass positive going pulses to the fifty Millisecond Guard Circuit which comprises a first-monostable circuit M1 of five millisecond delay at the left connected to drive a second monostable circuit M2 of fifty millisecond delay at the right.

In the first monostable circuit M1, biassed as shown, transistor T4 is normally conducting due to advantage bias-wise given it by the diode D1 in the emitter circuit of transistor T5 and the 33K resistor from "OV" whereby the emitter of T4 tends to be more positive with respect to its base than the emitter of T5 does with respect to its base. With transistor T4 conducting, the collector thereof is only about .2 volt more negative than the emitter. As the collector of transistor T4 is directly connected to the base of transistor T5, the base of T5 would be at about +11.8 volts. In that approximately .6 volt drop tends to occur across the diode D1, the emitter-base path of transistor T5 would be reverse biassed.

In the second monostable circuit M2 the emitters of both transistors T6, T7 are connected to 0 volt and the base of transistor T6 is biassed more negative with respect to its emitter than the base of T7 is with respect to its emitter. Accordingly transistor T6 is normally conducting. With transistor T6 normally conducting, the upper end of the 10K resistor is essentially at 0 volts, whereby the base of transistor T7 is more positive than its emitter and transistor T7 is at cutoff.

The trailing edge of a negative 12 volt pulse, such as the control pulse of FIGURE 13E, is a positive going pulse incoming to the base of transistor T4. The pulse as added to the approximate 11.8 volts of the base charges the .022 microfarad capacitor C1 to approximately 23.8 volts, turning transistor T4 off.

The base of transistor T5 rises toward 0 volts potential becoming more negative than its emitter, and transistor T5 fully conducts, carrying the potential of the upper plate of the .022 microfarad condenser C1 to approximately 0 volts.

Thereupon the .022 microfarad condenser C1 discharges through the 33K and the 1.2K resistors in series. As this discharge occurs, the base of transistor T4 becomes less positive. In about five milliseconds the base of transistor T4 becomes more negative than the emitter and transistor T4 again conducts, turning transistor T5 off.

As transistor T5 went into conduction, a positive going pulse from the emitter thereof through the 47 ohms resistor and a diode D2 to the base of transistor T6 adds to the approximately +.2 volts of the base, charging the 2.5 microfarad capacitor to approximately +9.8 volts, turning transistor T6 off.

The base of transistor T7 becomes more negative than its emitter, and transistor T7 fully conducts carrying the potential of the upper plate of the 2.5 microfarad condenser C2 to approximately 0 volt.

Thereupon the 2.5 microfarad condenser C2 discharges through the associated 33K and 1.2K resistors in series, and as this discharge occurs, the base of transistor T6 becomes less positive. In about fifty milliseconds the base of transistor T6 becomes more negative than the emitter, and transistor T6 again conducts turning transistor T7 off.

If another pulse enters a differentiating circuit during the period the 2.5 microfarad condenser C2 is discharging, the first monostable circuit M1 reoperates and passes a positive going pulse to the base of transistor T6 to recharge the 2.5 microfarad condenser to its original charge thus restarting the fifty millisecond timing period.

As transistor T6 is cut off a negative twelve volt control pulse, such as shown in FIGURE 13D, is propagated to a NOR gate (210) which through another NOR gate 271 provides a reset signal and a clock inhibit signal.

*Flip-Flop F7 (FIGURES 14A–14D)*

Bistable circuits (flip-flops) of several kinds are used in the computer. A first type of flip-flop F7 (FIGURE 3) is illustrated in more detail in FIGURE 14A.

The flip-flop F7 comprises two transistors, such as T8 and T9, biassed and interconnected as shown. Either transistor is prepared for conduction by having its base and collector biassed negative with respect to its emitter. With the symmetric biassing and interconnections, the flip-flop will stay in the last state to which it is switched by external means. The flip-flop has four input leads ①, ②, ③, ④. Input leads designated ① and ③ are connected to the base of transistor T8, and input leads designated ② and ④ are connected to the base of transistor T9.

If transistor T8 is conducting, the collector thereof connects the upper end of resistor 10K in the right hand voltage divider to approximately 0 volts. Accordingly, the base of transistor T9 will be more positive than the emitter, inhibiting transistor T9.

Similarly, if transistor T9 is conducting, the collector thereof connects the upper end of resistor 10K in the left voltage divider to approximately 0 volts, whereby the base of transistor T2 is rendered more positive than the emitter, and transistor T2 is inhibited.

The signal incoming to the input lead ① is a signal comprising an abrupt change from 0 volts to −12 volts, the duration of the −12 volts being for an extended time (as illustrated by the reset signal designated R in FIGURE 13E). The negative going front edge of the signal through the 10K resistor turns on transistor T8 which inhibits transistor T9. In numerous places in the computer, such signal is designated R and constitutes the general reset signal for the system. The trailing edge of such signal comprises a positive going signal and resistor 10K prevents the signal from turning the transistor off.

The signal incoming to the input lead ② is a negative 12 volt pulse of thirty microseconds duration, the leading edge of which renders the base more negative than the emitter to turn on transistor T9 on which in turn inhibits transistor T8.

The signal incoming to the input ③ is a negative 12 volt, essentially square pulse, of ten microseconds duration. With the 1000 pfd. capacitor C4 normally discharged, the abrupt 12 volt negative leading edge results in an immediate potential of −12 volts on the right plate and the left plate of the capacitor, but the diode D4 prevents any current flow to the base of the transistor T8. While the pulse is at −12 volts, the 1000 pfd. capacitor fully charges through the 2.2K resistor so that the right plate assumes a potential of 0 volts. When the trailing edge of the pulse occurs, the abrupt change constitutes a positive going pulse which makes the left plate assume a potential of approximately 0 volts, and due to the charged condition of the capacitor the right plate assumes a charge of +12 volts. Diode D4 conducts rendering the potential of the base of transistor T8 much more positive than the emitter, and transistor T8 is cut off to in turn remove the inhibit from transistor T9, which conducts.

The signal incoming to the input ④ is a negative 12 volt essentially square pulse of ten milliseconds duration which has an effect upon transistor T9 similar to the effect the signal on input ③ has upon transistor T8. Summarizing, the pulse on input ④ turns transistor T9 off which allows transistor T8 to conduct.

The logic symbol of Flip-Flop 7 turned 90° clockwise is shown in FIGURE 14B, the logic symbol of Flip-Flop 7 turned 90° clockwise with inputs ① and ② on the left and inputs ③ and ④ on the right is shown in FIGURE 14C. The showings of FIGURES 14B or 14C are alternatively used in the following disclosure.

FIGURE 14D is a truth table for the Flip-Flop 7 which reads as follows:

The signal on input ① results in 0 volts on output conductor X7 and −12 volts on output conductor $\overline{X7}$.

The signal on input ② results in −12 volts on output conductor X7 and 0 volts on output conductor $\overline{X7}$.

The signal on input ③ results in −12 volts on output conductor X7 and 0 volts on output conductor $\overline{X7}$.

The signal on input ④ results in 0 volts on output conductor X7 and −12 volts on output conductor $\overline{X7}$.

Each of the Flip-Flops F7, F8, F9 and F10 in the Backward Counter of FIGURE 3 are of this type.

*Flip-Flop F1 (FIGURES 4 and 14E)*

Flip-Flop F1 comprises transistors T10 and T11 biassed and interconnected as shown. The biassing predisposes either transistor T10 or T11 to tend to conduct by biassing the base and collector more negative than the emitter. Transistor T10 when operated inhibits T11; and transistor T11 when operated inhibits transistor T10.

Inputs ① and ④ and associated signals thereon cause the Flip-Flop to function essentially as already described for Flip-Flop F7 and such description therefore is not repeated.

Flip-Flop 1 additionally has an input designated ⑤ which extends to the left through a capacitor C6 and diode D6 to the base of transistor T10; and to the right through another capacitor C7 and another diode D7 to the base of transistor T11. The common connection between the capacitor C6 and diode D6 on the left is connected through a 27K resistor to the collector of transistor T10. The common connection between the capacitor C7 and diode D7 on the right is connected through a 27K resistor to the collector of transistor T11.

It is first assumed that transistor T10 is conducting and transistor T11 is cut off and that a negative 12 volts pulse of ten milliseconds is incoming to input ⑤. With the right plate of the capacitor C7 at approximately −12 volts, the −12 volts pulse has no effect on capacitor C7. However, the negative pulse charges capacitor C6 through resistor 27K so that the left plate is at approximately 0 volts and the right plate at −12 volts. The trailing edge is a positive going pulse which instantaneously makes the right plate of capacitor C6 0 volts and the left plate +12 volts, turning transistor T10 off, and allowing T11 to conduct.

Assuming now that transistor T11 is conducting and transistor T10 is cut off, with transistor T10 cut off, the collector is at approximately −12 volts and the left plate of the capacitor C6 is at approximately −12 volts. Accordingly a negative 12 volt 10 millisecond pulse incoming to input ⑤ has no effect upon the transistor T10. However, with transistor T11 conducting, its collector is at approximately 0 volts. The negative pulse charges the capacitor C7 through resistor 27K so that the left plate is at −12 volts and the right plate at 0 volts. The trailing edge of the negative pulse which is a positive going pulse instantaneously causes the left plate of capacitor C7 to be 0 volts and the right plate to be +12 volts, thereby cutting off transistor T11 which allows transistor T10 to conduct.

Summarily pulses incoming to input ⑤ will cause the Flip-Flop to flip alternately from one side to the other. FIGURE 14F is a logic symbol, turned clockwise 90°, for the Flip-Flop of FIGURE 14E.

The Flip-Flop of FIGURES 14E and 14F is typical of the Flip-Flops F1, F2, F3, and F4 of the Forward Counter of FIGURE 4 and "Odd-Even" Flip-Flop F13 of FIGURE 9.

*Flip-Flop 20 Monostable (FIGURES 14G and 12)*

Flip-Flop 20 of FIGURE 14G comprises transistors T12 and T13 biassed and interconnected as shown. Both transistors are biassed for conduction with bases and collectors biassed more negative than emitters. However, the left voltage divider tends to make the base of transistor T12 more negative with respect to its emitter than the right voltage divider tends to make the base of transistor T13 negative with respect to its emitter. As a result, transistor T12 is normally conducting and inhibits transistor T13 by holding the upper end of the 10K resistor in the right voltage divider at approximately 0 volts.

During the print cycle, negative 24 volt pulses of ten milliseconds duration from the sequence switch of FIGURE 7 are incoming to the single input for transistor T13.

The leading edge of a negative pulse which appears in the input is coupled through the integrator circuit comprising a .001 microfarad capacitor C8 and two 10K resistors connected as shown and through a IN270 diode D8 poled as shown to pass the negative going pulse, to instantaneously raise the potential of the base of transistor T13 to −24 volts, and thereby effect full conduction by transistor T13. The collector of transistor T13 carries the lower end of the 1.2K resistor in the left voltage divider to approximately 0 volts which brings the upper plate of the .068 microfarad capacitor C9 to 0 volts and the lower plate to +3 volts (previous to this, the upper plate was at −12 volts and the lower plate at −9 volts), cutting off transistor T12 which disconnects 0 volts potential from the lower end of the 1.2K resistor in the right voltage divider.

At the end of the pulse incoming to the input, the trailing edge is blocked by the diode and the base of T13 assumes its normal conducting potential.

The .068 mf. capacitor C9 thereupon discharges through the 10K and 1.2K resistors associated therewith until the base of transistor T12 becomes more negative than the emitter, and transistor T12 once more conducts to inhibit transistor T13.

The functioning of transistor T13 causes the collector of T13 to go from −12 volts to 0 volts and back to −12 volts, to provide a pulse similar to the print pulse shown in FIGURE 13H.

FIGURE 14H is a logic symbol of the monostable multivibrator F20 turned 90° clockwise. The input is designated as a type ④ input and the out lead is $\overline{X20}$.

*Flip-Flop 19 (FIGURES 8 and 16A)*

Flip-Flop F19 comprises transistors T17 and T18 biassed and interconnected as shown. The biassing predisposes either transistor T17 or T18 to tend to conduct by biassing the base and collector more negative than the emitter. Transistor T17 when operated inhibits transistor T18; and transistor T18 when operated inhibits T17.

A −12 volt potential on input ① overrides inputs ③ or ④ and causes transistor T17 to conduct which inhibits transistor T18. If transistor T17 is conducting, the diode D10 in the ③ input will drive both sides thereof to nearly 0 volts; the right side through the low impedance of the emitter-base path to 0 volts; the left side through the associated 27K resistor to the collector of transistor T17 which is close to 0 volts.

When a negative pulse is incoming to the input ③ the leading edge comprising a negative going signal through the capacitor C10 tends to back-bias the diode D10, leaving transistor T17 conducting. The trailing edge however comprises a positive going signal which through the capacitor C10 forward biasses the diode D10 and makes the base of transistor T17 much more positive than the emitter, thereby cutting off transistor T17 which in turn allows transistor T18 to conduct.

If transistor T17 is cut off, the associated diode D11 will be back-biassed because the collector of transistor T18 holds the junction between the 10K and 1.21K resistors in the left voltage divider at close to 0 volts, whereby the base of the transistor T17 to which the right side of the diode D10 is connected is at a potential of about 1.5 volts, positive, and the left side of the diode through the 27K resistor is at approximately −12 volts.

Under these circumstances, any −12 volt pulse incoming to input ③ will have no effect upon transistor T17. The leading edge through the associated capacitor C10 will only make the left side of the diode more negative. The −12 volts positive-going, trailing edge through the capacitor C10 cannot make the left side of the diode D10 more positive than 0 volts, so that the emitter remains more positive than the base.

With transistor T18 conducting, a leading edge of a negative pulse incoming on input ④ through the associated capacitor C11 tends to back-bias the associated diode D11, leaving transistor T18 conducting. The trailing edge through the associated capacitor C11 comprises a positive going signal cuting off transistor T18 which allows transistor T17 to conduct.

With transistor T18 cut off, any −12 volt pulse incoming to input ④ cannot switch transistor T18.

*Print Control Circuit (FIGURES 6 and 15A)*

The print control circuit of FIGURE 15A comprising transistors T14 and T15 biassed and interconnceted, as shown, is bistable.

The left voltage divider comprises a 15K resistor, a 4.7K resistor, and the wheel stop solenoid WSS.

The right voltage divider comprises a 1K resistor, a 120 ohm resistor, and another 120 ohm resistor in series.

The input ① provides means whereby a reset signal of −12 volts through a 2.2K resistor causes transistor T14 to operate and cut off transistor T15.

The input ② provides means whereby the positive going trailing edge of a 12 volt negative signal through a differentiating circuit comprising an 820 picofarad capacitor C12 and a 100 ohm resistor, and through a 1N270 diode D12 to the base of transistor causes transistor T14 to be cut off, allowing transistor T15 to conduct. Wheel stop solenoid WSS operates over the path extending from 0 volts over the emitter-collector path of power transistor T15, and over the winding of the wheel stop solenoid to −24 volts.

On the next reset pulse, through input ① when the transistor T15 becomes non-conducting, the collector of transistor T15 rises to −12 volts. Circulating current from the winding of the wheel stop solenoid WSS passes through the diode D13 connected across its winding.

The following description makes reference to and uses the logic circuits and symbols set forth in FIGURES 13A–16A to more briefly set forth the disclosure of the circuitry for the novel scaling device of the present invention.

DETAILED DESCRIPTION OF SYSTEM (FIGS. 2–12)

*System at rest*

Figure 1:
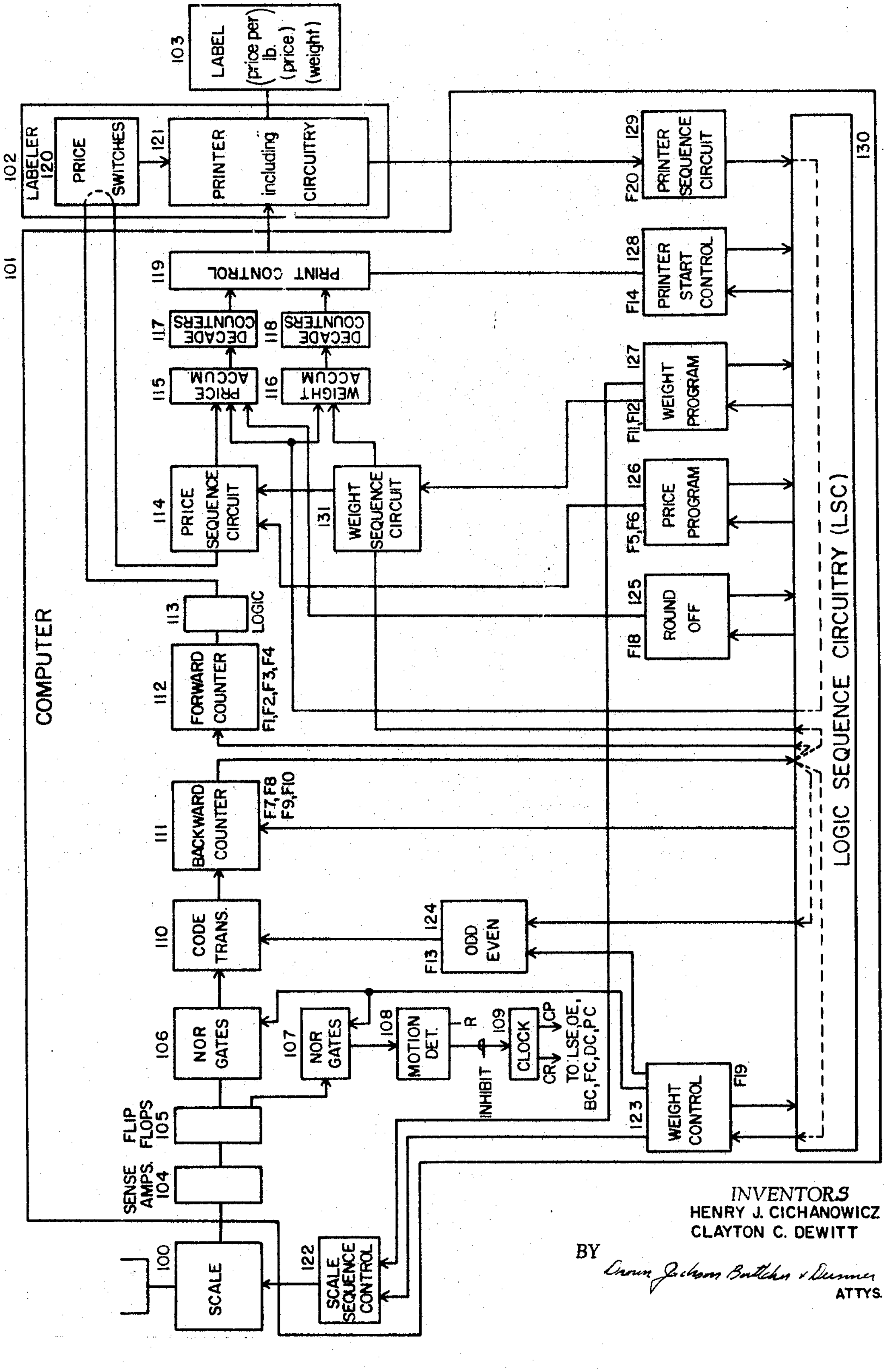

With reference now to the detailed showing of FIGURES 2–12, it is first noted that during a previous weighing, the trailing edge of the clock pulse CP next following the last reading into the backward counter 111 resets Flip-Flop F19 (803—FIGURE 8) in weight control circuit 123 via its input ④ to the "0" logic condition in which output X19 has 0 volts thereon and output $\overline{\mathbf{X19}}$ has −12 volts thereon.

The 0 volt output from the X19 portion of Flip-Flop F19 is coupled over conductor 819 to inverter 812 which results in −12 volts ($\overline{\mathbf{X19}}$) output from inverter 812.

The −12 volts output from the $\overline{\mathbf{X19}}$ portion of Flip-Flop F19 which is coupled to inverters 813 and 814 results in 0 volts output from these inverters on leads 820 and 821 and the output therefor is labeled X19.

The 0 volts on lead 820 is coupled to the inputs of NOR gates 240–247 (FIGURE 2) to prepare these gates for use in coupling signals from the scale to the Motion Detector 108.

The "0" volts on lead 820 as applied to NOR gate 271 prepares gate 271 for operation in the transmission of reset signal R. The 0 volts on lead 820 is further extended into the Logic Input Cable (LIP). The 0 volts on lead 821 is extended to AND gate 902 (FIGURE 9), and is also extended into the LIP cable.

The −12 volts on lead 819 is extended to NOR gate 808 which maintains the output from gate 808 at 0 volts even after gate 804 upon subsequent reset returns the output of gate 804 to 0 volts. The −12 volts on lead 819 also holds NOR gate 822 at 0 volts which in turn sets INVERTER 823 at −12 volts.

The −12 volts output of INVERTER 823 on lead 824 to NOR gates 248–250 and 306 holds the output of these gates at 0 volts so that the Backward Counter 111 could not count.

When the scale is returned to normal the NO LOAD SENSE lead NLS is transferred from 0 volts to −12 volts causing NOR gate 270 to put out 0 volts to NOR gate 271.

With both inputs at 0 volts, gate 271 provides −12 volts on the reset lead R to all points so designated; and also transmits −12 volts on the clock inhibit lead 273 to the inhibit gate 810 (FIGURE 8) which prevents pulses from the Clock 109 from reaching the CP lead 817 and the $\overline{\mathrm{CP}}$ lead 818. CP and $\overline{\mathrm{CP}}$ pulses are thus removed from all points so designated. The lead CP remains at 0 v., and the lead $\overline{\mathrm{CP}}$ remains at −12 volts.

The reset signal resets all flip-flops to the "0" logic condition and also resets the Print Control Circuits 119.

If the Scale bounces upon return to normal, a positive going signal on the NO LOAD SENSE lead through the Differentiating Circuit 251 and the rectifier 260 restarts the fifty millisecond timing interval in the Guard Circuit 269 keeping its output at −12 volts, so that the ouput of gate 270 remains at 0 volts.

The reset signal incoming to the reset input ① of Flip-Flop F19 (FIGURE 8) insures that F19 remains reset during the "at-rest" period.

Figure 7:
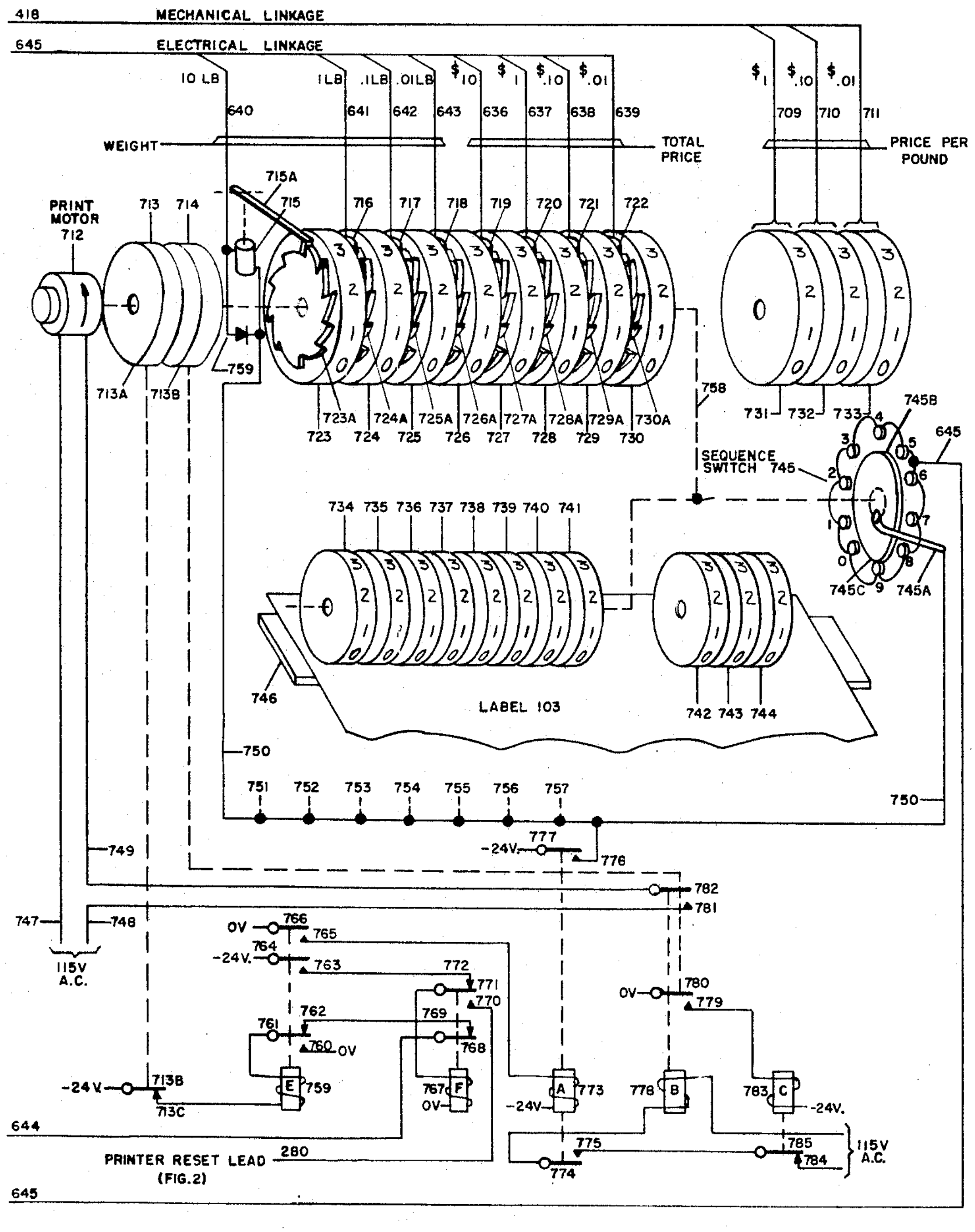

Finally, when the Scale returns to normal, the scale removes −24 volts from the Printer Reset Lead which releases relay 767 (FIGURE 7).

With the Scale at rest, gate 809 connects −12 volts to the .01 lb. lead 204 (cable 200) and the photoresistors 214–217 (FIGURE 2) to prepare for motion detection on the next weighing.

Actually, the "on-off" of photoresistors 214–217 on the upward return of the scale pan due to light impinging thereon results in pulses through the Differentiator Circuits to the Guard Circuit 269 which places −12 volts output therefrom to gate 270 which in turn places 0 volts on the output to gate 271 to control same to transmit −12 volts over the reset lead R and clock inhibit lead 273.

*Package placed on scale, scale in motion*

Thereafter when the operator places a package to be weighed on the Scale, the downward movement of the pan causes the Scale 100 to (1) reestablish −24 volts on the PRINTER RESET LEAD 280 (FIGURE 2) in preparation for the next printing; (2) transfer the NO LOAD SENSE lead NLS (FIGURE 2) from −12 volts to 0 volts which prepares gate 270. The transfer from −12 volts to 0 volts for gate 270 results in a positive going pulse through Differentiator 251 and rectifier 260 to Guard Circuit 269 which causes the Guard Circuit to quickly transfer its output to gate 270 from 0 volts to −12 volts. This maintains 0 volts on the output of gate 270 to gate 271 which maintains −12 volts on the reset lead R and the clock inhibit lead 273. Thus the fifty millisecond timing period of Guard Circuit 269 is initiated.

As the scale continues its excursion due to the weight in the pan, light impinging upon photoresistors 214–217 causes these resistors to momentarily lower their resistance. As a photoresistor, such as 217, for example, momentarily lowers its resistance a negative pulse through rectifier 231 to Differential Amplifier 235 causes the Differential Amplifier 235 to transfer its output to Flip-Flop 239 (F21) from +12 volts to −12 volts and back again to +12 volts which via the input ② causes the Flip-Flop F21 to momentarily assume its logic 1 condition and then revert back to its logic 0 condition.

The transfer of Flip-Flop F21 from the 0 to the 1 to the 0 logic conditions results in X21 being transferred from 0 volts to −12 volts to 0 volts and $\overline{\mathbf{X21}}$ being transferred from −12 volts to 0 volts to −12 volts.

It should be recalled that inputs to gates 248–250 from F19 are at −12 volts so that these gates do not react to signals during movement of the Scale; but inputs to the gates 240–247 from F19 are at 0 volts on these gates are prepared to be responsive to Scale movement.

The change of X21 from 0 volts to −12 volts to 0 volts causes a negative pulse to be input to NOR gate 243 which in consequence thereof causes its output to transfer from −12 volts to 0 volts to −12 volts. The leading edge of this pulse constitutes a positive going pulse which passes through the Differentiator 255 and rectifier 264 to the Guard Circuit 269 restarts the 50 ms. guard interval. The trailing edge of this pulse does not pass through the Differentiating Circuit 255.

The change of $\overline{\mathbf{X21}}$ from −12 volts to 0 volts to −12 volts causes a positive pulse to be input to NOR gate 247 which in consequence thereof causes its output to transfer from 0 volts to −12 volts to 0 volts. The leading edge of this pulse constitutes a negative going pulse which does not pass through the Differentiating Circuit 259. The trailing edge of this pulse constitutes a positive going pulse which passes through the Differentiator 259 and rectifier 268 to the Guard Circuit 269 to restart the 50 ms. guard interval.

Thus the Guard Circuit 269 is repeatedly reset until the Scale 100 comes to rest.

*Scale comes to rest*

When the scale comes to rest, the 50 ms. guard interval of Guard Circuit 269 runs its course, at the conclusion of which the Guard Circuit transfers its output from −12 volts to 0 volts. With 0 volts on both inputs of NOR gate 270, this gate transfers its output from 0 volts to −12 volts which causes the gate 271 to transfer its output from −12 volts to 0 volts removing the reset signal from lead R; and removing the clock inhibit signal from inhibit gate 810. Thereupon clock CP pulses resume on lead 817 and clock $\overline{\text{CP}}$ pulses resume on lead 818.

Figure 8:
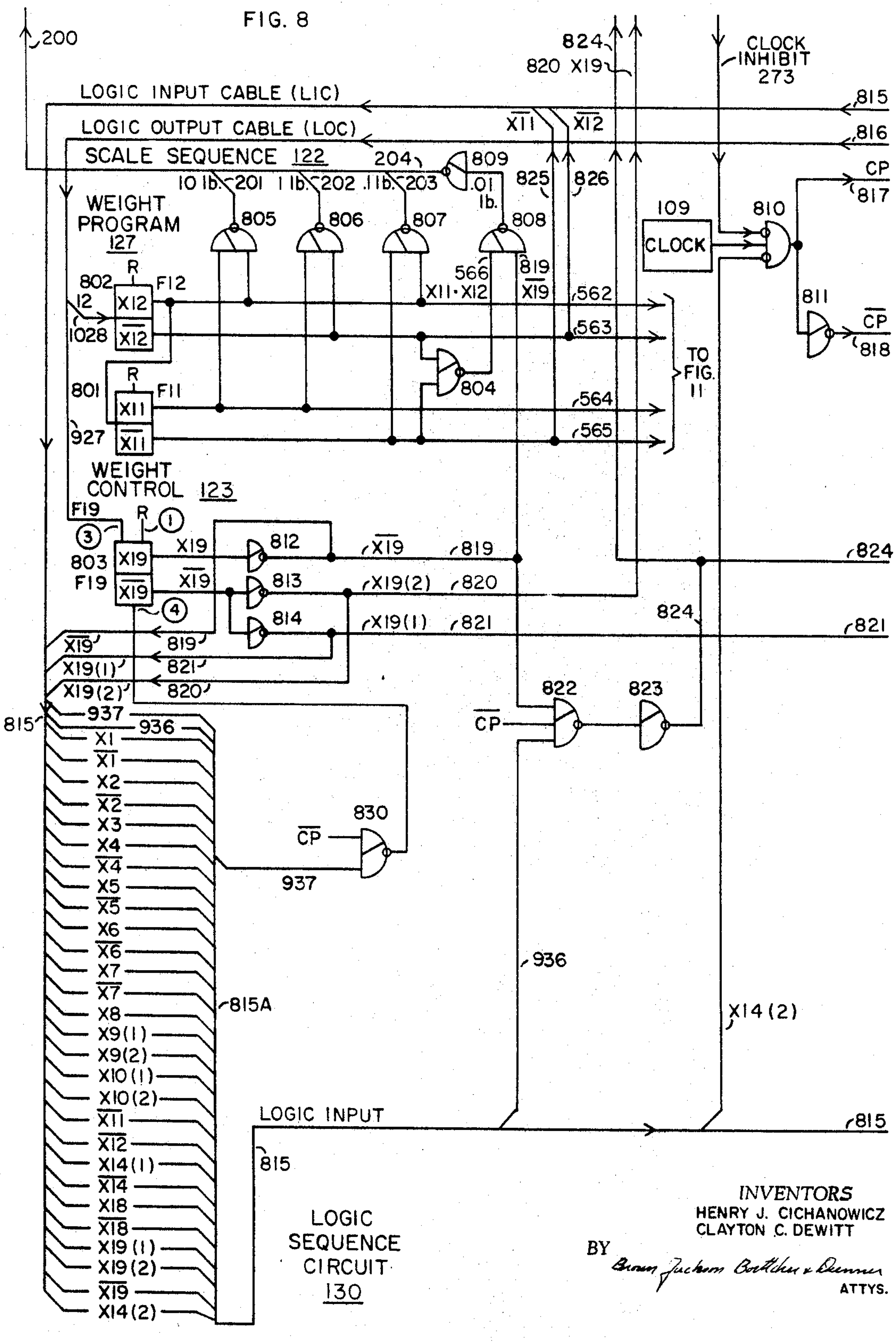
Figure 9:
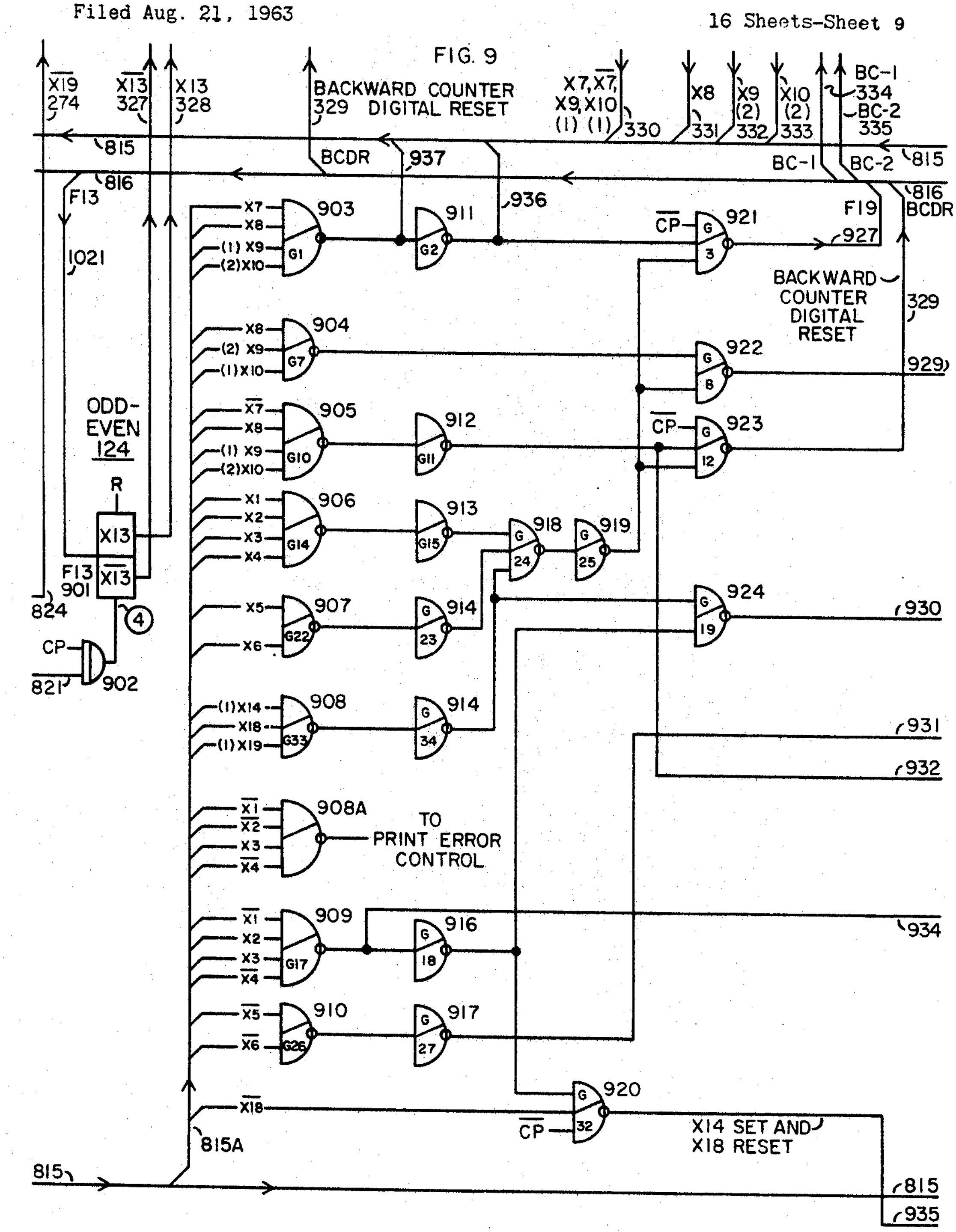

The first $\overline{\text{CP}}$ pulse causes F19 (FIGURE 8) to transfer from its logic 0 to its logic 1 condition. This is accomplished as follows:

A circuit can be traced from the X7 portion of flip-flop F7 (FIGURE 3) and conductor X7 into Cable 330 (FIGURE 9) thence into the Logic Input Cable (L.I.C.) 815 (FIGURE 8) out of FIGURE 8 in cable 815A (FIGURE 9) and the input to gate 903 (FIGURE 9).

The following similar paths can be traced for the outputs of the backward counter flip-flop X8–X10 (FIGURE 3), the forward counter flip-flop X1–X4 (FIGURE 4), price program flip-flop X5, X6 (FIGURE 1), printer start control flip-flop X14 (FIGURE 12), round off flip-flop X18 (FIGURE 11) and weight control flip-flop X19 (FIGURE 8):

X8 to gate 903
X9 (1) to gate 903
X10 (2) to gate 903
X1 to gate 906
X2 to gate 906
X3 to gate 906
X4 to gate 906
X5 to gate 907
X6 to gate 907
X14 to gate 908
X18 to gate 908
X19(1) to gate 908

With 0 volts on all these inputs, gates 903, 906, 907, and 908 each give out −12 volts. The −12 volts from gate 903 input to inverter 911 results in 0 volts output therefrom to gate 921.

The −12 volts outputs from gate 906 to inverter 913 results in 0 volts output therefrom to gate 918.

The −12 volts from gate 907 to inverter 914 results in 0 volts output therefrom to gate 918.

The −12 volts output from gate 908 to inverter 915 results in 0 volts output therefrom.

With 0 volts on all its inputs, gate 918 gives out −12 volts as input to inverter 919. With −12 volts as input, gate 919 gives out 0 volts to gate 921.

Figure 16A:
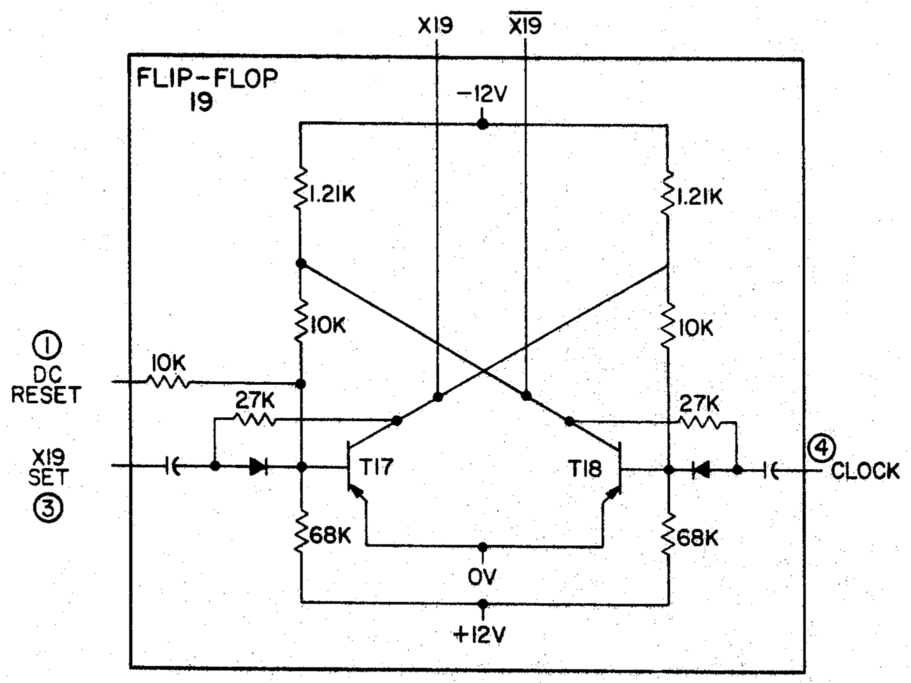
Figure 16B:
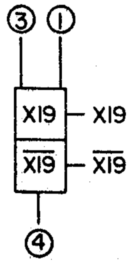
Figure 17:
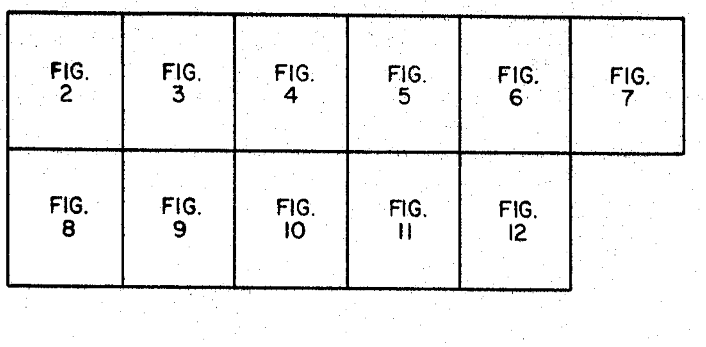
Figure 15A:
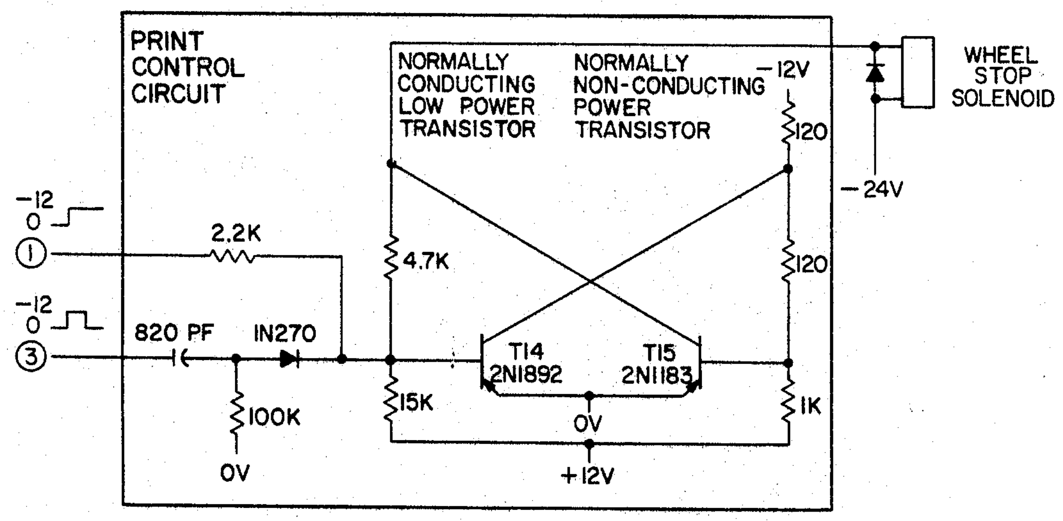
Figure 15B:
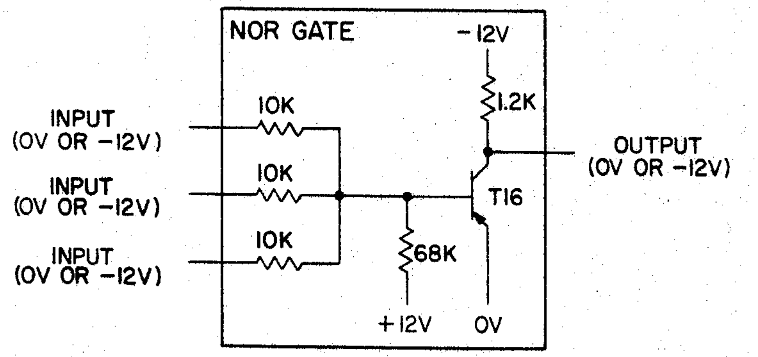
Figure 15C:
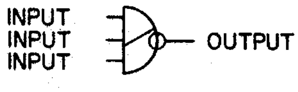
Figure 15E:
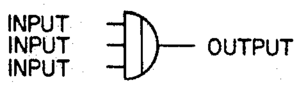
Figure 15D:
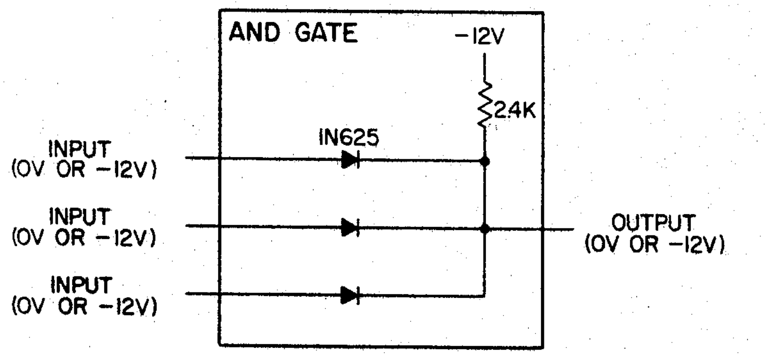
Figure 15F:
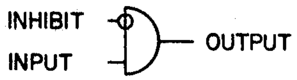

Accordingly, when the first $\overline{\text{CP}}$ pulse occurs (−12 v. to 0 v. to −12 v.), during the 10 microseconds that the pulse is at 0 volts, gate 921 has all its inputs at 0 volts. Accordingly, this gate gives out a negative pulse 0 v. to −12 v. to 0 v. The trailing edge of this pulse over conductor 927, Logic Output Cable (LOC) 816 (FIGURE 8), and conductor 927 over input 3 to flip-flop F19 (803). See also FIGURES 16A and 16B. This trailing edge causes flip-flop F19 to assume its logic 1 condition with X19 at −12 volts and $\overline{\text{X19}}$ at 0 volts.

LOGIC CIRCUITRY OF FIGURES 8, 9, 10

Figure 10:
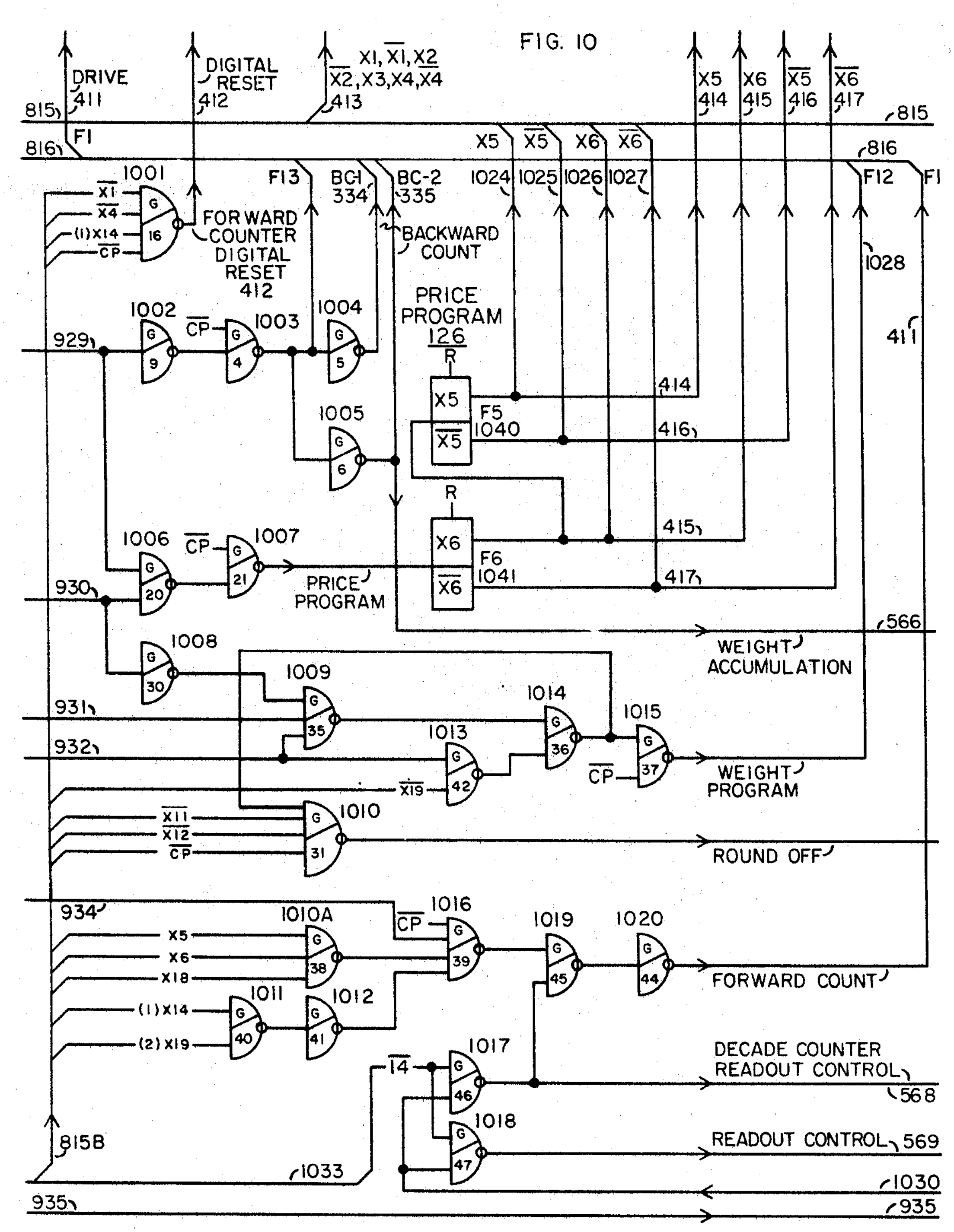
Figure 11:
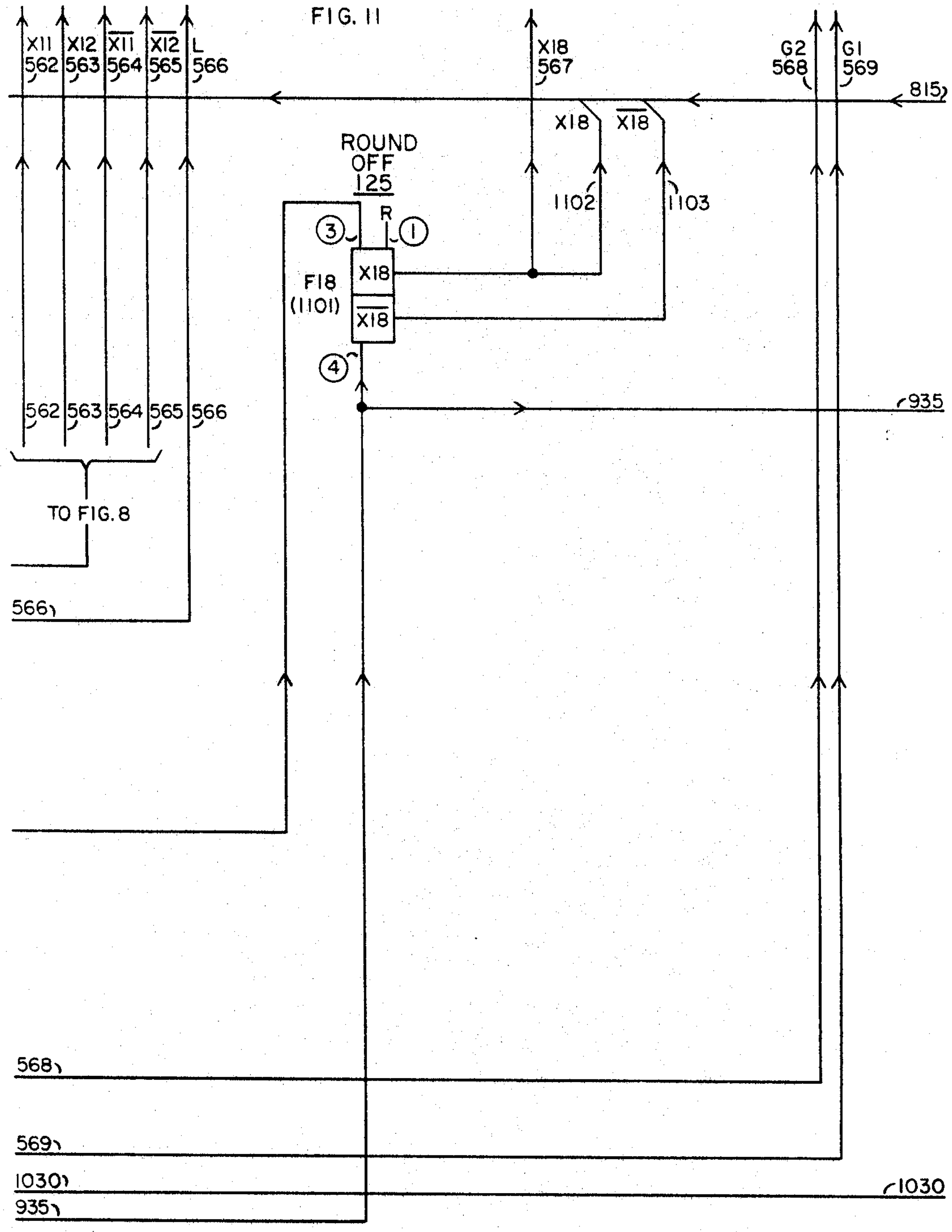
Figure 12:
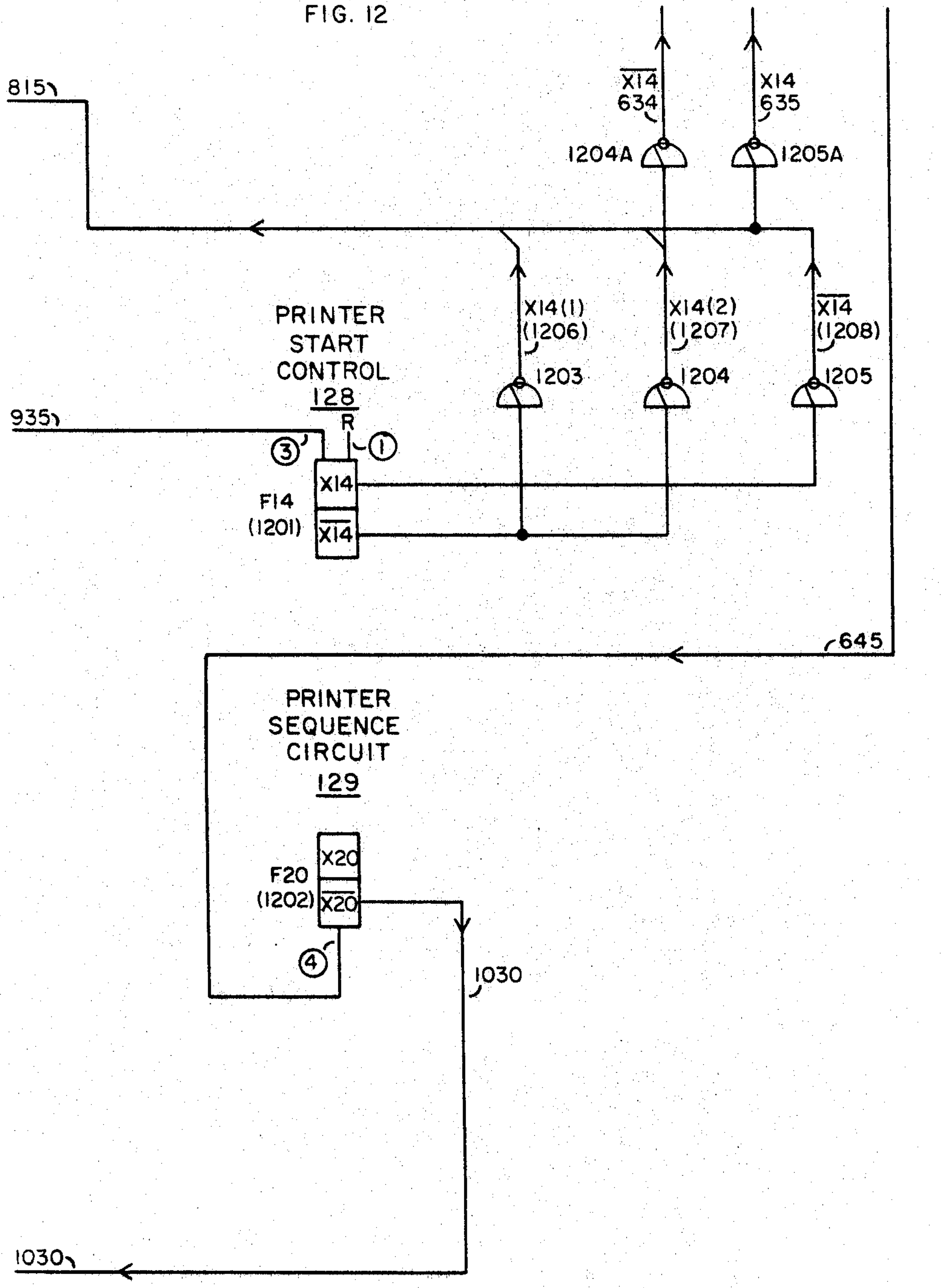

In order to provide for a generalized understanding of the logic circuitry of FIGURES 8, 9, and 10 which will avoid duplication in succeeding description, the circuit is considered at this point from a logical standpoint. The following examples are representative of the symbology used in the application, and are set forth as an aid to the understanding of the description:

$F7$=a given flip-flop $X7$=one side of this given flip-flop F7 and its output which may be an input to further logic circuitry. According to Boolean algebra this may be an output of said further logic circuitry $\overline{X7}$=the other side of the same flip-flop and its output which may be an input to further logic circuitry. According to Boolean algebra this may be an output of said further logic circuitry $\overset{0}{F7}$=one state of the flip-flop $\overset{1}{F7}$=the other state of the flip-flop $\overset{0}{X7}$=the logical output of X7 when F7 is in the 0 state $\overset{(-)}{\overline{X7}}$=the logical output of $\overline{\text{X7}}$ when F7 is in the 0 state $\overset{(-)}{X7}$=the logical output of X7 when F7 is in the − state $\overset{0}{\overline{X7}}$=the logical output of $\overline{\text{X7}}$ when F7 is in the − state There will be a −12 volt output from gate 903 when X7 and X8 and X9 (1) and X10 (2) are all at 0 volts. Written logically the −12 volt output of gate 903 accordingly can be written $$\overset{0}{X7}\overset{0}{X8}\overset{0}{X9}\overset{0}{X10}$$

There will be −12 volts output from gate 911 if there is no input thereto. There will be no input to gate 911 if there is no output from gate 903. There will be no output from gate 903 if X7 or X8 or X9 or X10 is at −12 volts. Logically described the −12 volt output of gate 911 accordingly can be written $\overline{X7}+\overline{X8}+\overline{X9}+\overline{X10}$.

The −12 v. output of gate 904 can be written $$\overset{0}{X8}\cdot\overset{0}{X9}\cdot\overset{0}{X10}$$

The −12 v. output of gate 905 can be written $$\overset{0}{X7}\cdot\overset{0}{X8}\cdot\overset{0}{X9}\cdot\overset{0}{X10}$$

The −12 v. output of gate 906 can be written $$\overset{0}{X1}\cdot\overset{0}{X2}\cdot\overset{0}{X3}\cdot\overset{0}{X4}$$

The −12 v. output of gate 907 can be written $$\overset{0}{X5}\cdot\overset{0}{X6}$$

The −12 v. output of gate 908 can be written $$\overset{0}{X14}\cdot\overset{0}{X18}\cdot\overset{0}{X19}$$

The −12 v. output of gate 909 can be written $$\overset{0}{\overline{X1}}\cdot\overset{0}{X2}\cdot\overset{0}{X3}\cdot\overset{0}{\overline{X4}}$$

The −12 v. output of gate 910 can be written $$\overset{0}{\overline{X5}}\cdot\overset{0}{\overline{X6}}$$

The −12 v. output of gate 912 can be written $$\overset{(-)}{\overline{X7}}+\overset{(-)}{X8}+\overset{(-)}{X9}+\overset{(-)}{X10}$$

The −12 v. output of gate 913 can be written $$\overset{(-)}{X1}+\overset{(-)}{X2}+\overset{(-)}{X3}+\overset{(-)}{X4}$$

The −12 v. output of gate 914 can be written $$\overset{(-)}{X5}+\overset{(-)}{X6}$$

The −12 v. output of gate 915 can be written $$\overset{(-)}{X14}+\overset{(-)}{X18}+\overset{(-)}{X19}$$

The −12 v. output of gate 916 can be written $$\overset{(-)}{\overline{X1}}+\overset{(-)}{X2}+\overset{(-)}{X3}+\overset{(-)}{\overline{X4}}$$

The −12 v. output of gate 917 can be written $$\overset{(-)}{\overline{X5}}+\overset{(-)}{\overline{X6}}$$

There will be a CP output from gate 830 if input 937 coming from gate 903 is at 0 volts. Gate 903 ouput will be at 0 volts if X7, X8, X9, or X10 are at −12 v. Written logically, the 0 volt output of gate 903 accordingly can be written $\overline{X7}+X8+X9+X10$.

There will be −12 volts output from gate 918 if all inputs thereof are at 0 volts. The inputs will be at 0 volts when the outputs of gates 913, 914, and 915 are all at 0 volts. The outputs of gates 913, 914, and 915 will be at 0 volts when the inputs thereof, which are the same as the outputs of gates 906, 907, and 908, are at −12 volts. Thus referring to the outputs of 906, 907, and 908, above, the output of gate 918 will be −12 volts when there are outputs from 906 and 907 and 908. Logically considered the −12 volt output of gate 918 can be written:

$$(\overset{0}{X1}\cdot\overset{0}{X2}\cdot\overset{0}{X3}\cdot\overset{0}{X4})\cdot(\overset{0}{X5}\cdot\overset{0}{X6})\cdot(\overset{0}{X14}\cdot\overset{0}{X18}\cdot\overset{0}{X19})$$

There will be −12 volts output from gate 919 if the input thereto which is the output of gate 918 is at 0 volts; which will occur if any input to gate 918, which is the output of gates 913, or 914 or 915, is at −12 volts. Thus referring to the outputs of 913, 914, and 915, above, logically considered the −12 volt output of gate 919 can be written:

$$(\overset{(-)}{X1}+\overset{(-)}{X2}+\overset{(-)}{X3}+\overset{(-)}{X4})+(\overset{(-)}{X5}+\overset{(-)}{X6})+(\overset{(-)}{X14}+\overset{(-)}{X18}+\overset{(-)}{X19})$$

There will be −12 volts output from gate 920 if all the inputs thereto are at 0 volts. This will necessitate the output of 916 to be at 0 volts which will occur if its input which is the same as the output of gate 909 is at −12 volts. Referring to gate 909 above, the −12 volts output of gate 920 can be written:

$$\overset{0}{\overline{CP}}\cdot(\overset{0}{\overline{X1}}\cdot\overset{0}{X2}\cdot\overset{0}{X3}.\overset{0}{\overline{X4}})\cdot\overset{0}{\overline{X18}}$$

There will be −12 volts output from gate 921 if all inputs are at 0 volts. The second input which is the output of gate 911 will be at 0 volts if its input which is the output of gate 903 is at −12 volts. The third input which is the output of gate 919 will be at 0 volts if the input thereof which is the output of gate 918 is at −12 volts. Referring to the −12 volts output of gates 903 and 918 above, the −12 volts output of gate 921 can be written:

$$\overset{0}{\overline{CP}}\cdot(\overset{0}{X7}\cdot\overset{0}{X8}\cdot\overset{0}{X9}\cdot\overset{0}{X10})\cdot(\overset{0}{X1}\cdot\overset{0}{X2}\cdot\overset{0}{X3}\cdot\overset{0}{X4})\cdot(\overset{0}{X5}\cdot\overset{0}{X6})\cdot(\overset{0}{X14}\cdot\overset{0}{X18}\cdot\overset{0}{X19})$$

Rearranged this would be:

$$\overset{0}{\overline{CP}}\cdot(\overset{0}{X1}\cdot\overset{0}{X2}\cdot\overset{0}{X3}\cdot\overset{0}{X4})\cdot(\overset{0}{X5}\cdot\overset{0}{X6})\cdot(\overset{0}{X7}\cdot\overset{0}{X8}\cdot\overset{0}{X9}\cdot\overset{0}{X10})\cdot(\overset{0}{X14}\cdot\overset{0}{X18}\cdot\overset{0}{X19})$$

There will be −12 volts output from gate 922 if both inputs are at 0 volts. The first input which is the output of gate 904 will be at 0 volts if any input of gate 904 is at −12 volts which can be written $$\overset{(-)}{X8}+\overset{(-)}{X9}+\overset{(-)}{X10}$$

The second input which is the output of gate 919 will be at 0 volts if the input of gate 919 which is the output of gate 918 is at −12 volts. Thus referring to the −12 volt output of gate 918 above, the output of gate 922 can be written:

$$(\overset{(-)}{X8}+\overset{(-)}{X9}+\overset{(-)}{X10})\cdot(\overset{0}{X1}\cdot\overset{0}{X2}\cdot\overset{0}{X3}\cdot\overset{0}{X4})\cdot(\overset{0}{X5}\cdot\overset{0}{X6})\cdot(\overset{0}{X14}\cdot\overset{0}{X18}\cdot\overset{0}{X19})$$

Rearranged this would be:

$$(\overset{0}{X1}\cdot\overset{0}{X2}\cdot\overset{0}{X3}\cdot\overset{0}{X4})\cdot(\overset{0}{X5}\cdot\overset{0}{X6})\cdot(\overset{(-)}{X8}+\overset{(-)}{X9}+\overset{(-)}{X10})\cdot(\overset{0}{X14}\cdot\overset{0}{X18}\cdot\overset{0}{X19})$$

Using these principles, the outputs of the remaining gates can be written as follows:

The −12 volt output of gate 923 can be written:

$$\overset{0}{\overline{CP}}\cdot(\overset{0}{\overline{X7}}\cdot\overset{0}{X8}\cdot\overset{0}{X9}\cdot\overset{0}{X10})\cdot(\overset{0}{X1}\cdot\overset{0}{X2}\cdot\overset{0}{X3}\cdot\overset{0}{X4})\cdot(\overset{0}{X5}\cdot\overset{0}{X6})\cdot(\overset{0}{X14}\cdot\overset{0}{X18}\cdot\overset{0}{X19})$$

Rearranged this would be:

$$\overset{0}{\overline{CP}}\cdot(\overset{0}{X1}\cdot\overset{0}{X2}\cdot\overset{0}{X3}\cdot\overset{0}{X4})\cdot(\overset{0}{X5}\cdot\overset{0}{X6})\cdot(\overset{0}{\overline{X7}}\cdot\overset{0}{X8}\cdot\overset{0}{X9}\cdot\overset{0}{X10})\cdot(\overset{0}{X14}\cdot\overset{0}{X18}\cdot\overset{0}{X19})$$

The −12 volt output of gate 924 can be written:

$$(\overset{0}{\overline{X1}}\cdot\overset{0}{X2}\cdot\overset{0}{X3}\cdot\overset{0}{\overline{X4}})\cdot(\overset{0}{X14}\cdot\overset{0}{X18}\cdot\overset{0}{X19})$$

The −12 volt output of gate 1001 can be written:

$$\overset{0}{\overline{CP}}\ \overset{0}{\overline{X1}}\ \overset{0}{\overline{X4}}\ \overset{0}{X14}$$

The −12 volt output of gate 1002 can be written:

$$[\overset{0}{X8}\cdot\overset{0}{X9}\cdot\overset{0}{X10}]+[(\overset{(-)}{X1}+\overset{(-)}{X2}+\overset{(-)}{X3}+\overset{(-)}{X4})+(\overset{(-)}{X5}+\overset{(-)}{X6})+(\overset{(-)}{X14}+\overset{(-)}{X18}+\overset{(-)}{X19})]$$

Rearranged this can be written:

$$(\overset{(-)}{X1}+\overset{(-)}{X2}+\overset{(-)}{X3}+\overset{(-)}{X4})+(\overset{(-)}{X5}+\overset{(-)}{X6})+(\overset{0}{X8}\cdot\overset{0}{X9}\cdot\overset{0}{X10})+(\overset{(-)}{X14}+\overset{(-)}{X18}+\overset{(-)}{X19})$$

The −12 volt output of gate 1003 can be written:

$$\overset{0}{\overline{CP}}\cdot(\overset{0}{X1}\cdot\overset{0}{X2}\cdot\overset{0}{X3}\cdot\overset{0}{X4})\cdot(\overset{0}{X5}\cdot\overset{0}{X6})\cdot(\overset{(-)}{X8}+\overset{(-)}{X9}+\overset{(-)}{X10})\cdot(\overset{0}{X14}\cdot\overset{0}{X18}\cdot\overset{0}{X19})$$

The −12 volt output of gates 1004 and 1005 can be written:

$$\overset{(-)}{\overline{CP}}+(\overset{(-)}{X1}+\overset{(-)}{X2}+\overset{(-)}{X3}+\overset{(-)}{X4})+(\overset{(-)}{X5}+\overset{(-)}{X6})+(\overset{0}{X8}\cdot\overset{0}{X9}\cdot\overset{0}{X10})+(\overset{(-)}{X14}+\overset{(-)}{X18}+\overset{(-)}{X19})$$

The −12 volt output of gate 1006 can be written:

$$\{(\overset{0}{X8}\cdot\overset{0}{X9}\cdot\overset{0}{X10})+[(\overset{(-)}{X1}+\overset{(-)}{X2}+\overset{(-)}{X3}+\overset{(-)}{X4})+(\overset{(-)}{X5}+\overset{(-)}{X6})+(\overset{(-)}{X14}+\overset{(-)}{X18}+\overset{(-)}{X19})]\}\cdot\{(\overset{(-)}{X14}+\overset{(-)}{X18}+\overset{(-)}{X19})+(\overset{(-)}{\overline{X1}}+\overset{(-)}{X2}+\overset{(-)}{X3}+\overset{(-)}{\overline{X4}})\}$$

which can be rearranged $$[\overset{(-)}{X1}+\overset{(-)}{X2}+\overset{(-)}{X3}+\overset{(-)}{X4}+\overset{(-)}{X5}+\overset{(-)}{X6}+(\overset{0}{X8}\cdot\overset{0}{X9}\cdot\overset{0}{X10})+\overset{(-)}{X14}+\overset{(-)}{X18}+\overset{(-)}{X19}]\cdot[\overset{(-)}{\overline{X1}}+\overset{(-)}{X2}+\overset{(-)}{X3}+\overset{(-)}{\overline{X4}}+\overset{(-)}{X14}+\overset{(-)}{X18}+\overset{(-)}{X19}$$

The —12 volt output of gate 1007 can be written:

$$\overset{0}{\overline{CP}}\cdot\{[(\overset{0}{X1}\cdot\overset{0}{X2}\cdot\overset{0}{X3}\cdot\overset{0}{X4})\cdot(\overset{0}{X5}\cdot\overset{0}{X6})\cdot(\overset{(-)}{X8}+\overset{(-)}{X9}+\overset{(-)}{X10})\cdot(\overset{0}{X14}\cdot\overset{0}{X18}\cdot\overset{0}{X19})]+[(\overset{0}{\overline{X1}}\cdot\overset{0}{X2}\cdot\overset{0}{X3}\cdot\overset{0}{\overline{X4}})\cdot(\overset{0}{X14}\cdot\overset{0}{X18}\cdot\overset{0}{X19})]\}$$

which can be rearranged $$\overset{0}{\overline{CP}}\cdot\{[\overset{0}{X1}\cdot\overset{0}{X2}\cdot\overset{0}{X3}\cdot\overset{0}{X4}\cdot\overset{0}{X5}\cdot\overset{0}{X6}\cdot(\overset{(-)}{X8}+\overset{(-)}{X9}+\overset{(-)}{X10})\cdot\overset{0}{X14}\cdot\overset{0}{X18}\cdot\overset{0}{X19}]+[\overset{0}{\overline{X1}}\cdot\overset{0}{X2}\cdot\overset{0}{X3}\cdot\overset{0}{\overline{X4}}\cdot\overset{0}{X14}\cdot\overset{0}{X18}\cdot\overset{0}{X19}]\}$$

The —12 volt output of gate 1008 can be written:

$$(\overset{(-)}{X14}+\overset{(-)}{X18}+\overset{(-)}{X19})+(\overset{(-)}{\overline{X1}}+\overset{(-)}{X2}+\overset{(-)}{X3}+\overset{(-)}{\overline{X4}})$$

which can be rearranged $$\overset{(-)}{\overline{X1}}+\overset{(-)}{X2}+\overset{(-)}{X3}+\overset{(-)}{X4}+\overset{(-)}{X14}+\overset{(-)}{X18}+\overset{(-)}{X19}$$

The —12 volt output of gate 1009 can be written:

$$(\overset{0}{\overline{X1}}\cdot\overset{0}{X2}\cdot\overset{0}{X3}\cdot\overset{0}{\overline{X4}}\cdot\overset{0}{X14}\cdot\overset{0}{X18}\cdot\overset{0}{X19})\cdot(\overset{0}{\overline{X5}}\overset{0}{\overline{X6}})\cdot(\overset{0}{\overline{X7}}\cdot\overset{0}{X8}\cdot\overset{0}{X9}\cdot\overset{0}{X10})$$

which can be rearranged $$\overset{0}{\overline{X1}}\cdot\overset{0}{X2}\cdot\overset{0}{X3}\cdot\overset{0}{\overline{X4}}\cdot\overset{0}{\overline{X5}}\cdot\overset{0}{\overline{X6}}\cdot\overset{0}{\overline{X7}}\cdot\overset{0}{X8}\cdot\overset{0}{X9}\cdot\overset{0}{X10}\cdot\overset{0}{X14}\cdot\overset{0}{X18}\cdot\overset{0}{X19}$$

The —12 volt output of gate 1010 can be written:

$$[\overset{0}{\overline{X1}}\cdot\overset{0}{X2}\cdot\overset{0}{X3}\cdot\overset{0}{\overline{X4}}\cdot\overset{0}{X14}\cdot\overset{0}{X18}\cdot\overset{0}{X19}\cdot\overset{0}{\overline{X5}}\cdot\overset{0}{\overline{X6}}\cdot\overset{0}{\overline{X7}}\cdot\overset{0}{X8}\cdot\overset{0}{X9}\cdot\overset{0}{X10}+\overset{0}{\overline{X19}}\cdot\overset{0}{\overline{X7}}\cdot\overset{0}{X8}\cdot\overset{0}{X9}\cdot\overset{0}{X10}]\cdot\overset{0}{\overline{X11}}\cdot\overset{0}{\overline{X12}}\cdot\overset{0}{\overline{CP}}$$

which can be rearranged $$[\overset{0}{\overline{X1}}\cdot\overset{0}{X2}\cdot\overset{0}{X3}\cdot\overset{0}{\overline{X4}}\cdot\overset{0}{\overline{X5}}\cdot\overset{0}{\overline{X6}}\cdot\overset{0}{\overline{X7}}\cdot\overset{0}{X8}\cdot\overset{0}{X9}\cdot\overset{0}{X10}\cdot\overset{0}{X14}\cdot\overset{0}{X18}\cdot\overset{0}{X19}+\overset{0}{\overline{X19}}\cdot\overset{0}{\overline{X7}}\cdot\overset{0}{X8}\cdot\overset{0}{X9}\cdot\overset{0}{X10}]\cdot\overset{0}{\overline{X11}}\cdot\overset{0}{\overline{X12}}\cdot\overset{0}{\overline{CP}}$$

The —12 volt output of gate 1010A can be written:

$$\overset{0}{X5}\cdot\overset{0}{X6}\cdot\overset{0}{X18}$$

The —12 volt output of gate 1011 can be written:

$$\overset{0}{X14}\cdot\overset{0}{X19}$$

The —12 volt output of gate 1012 can be written:

$$\overset{(-)}{X14}+\overset{(-)}{X19}$$

The —12 volt output of gate 1013 can be written:

$$\overset{0}{X7}\cdot\overset{0}{X8}\cdot\overset{0}{X9}\cdot\overset{0}{X10}\cdot\overset{0}{X19}$$

The —12 volt output of gate 1014 can be written:

$$(\overset{(-)}{\overline{X1}}+\overset{(-)}{X2}+\overset{(-)}{X3}+\overset{(-)}{\overline{X4}}+\overset{(-)}{X14}+\overset{(-)}{X18}+\overset{(-)}{X19})+(\overset{(-)}{\overline{X5}}+\overset{(-)}{\overline{X6}})+(\overset{(-)}{\overline{X7}}+\overset{(-)}{X8}+\overset{(-)}{X9}+\overset{(-)}{X10})$$

which can be rearranged $$\overset{(-)}{\overline{X1}}+\overset{(-)}{X2}+\overset{(-)}{X3}+\overset{(-)}{\overline{X4}}+\overset{(-)}{\overline{X5}}+\overset{(-)}{\overline{X6}}+\overset{(-)}{\overline{X7}}+\overset{(-)}{X8}+\overset{(-)}{X9}+\overset{(-)}{X10}+\overset{(-)}{X14}+\overset{(-)}{X18}+\overset{(-)}{X19}$$

The —12 volt output of gate 1015 can be written:

$$\overset{0}{\overline{CP}}\cdot[(\overset{0}{\overline{X1}}\cdot\overset{0}{X2}\cdot\overset{0}{X3}\cdot\overset{0}{\overline{X4}}\cdot\overset{0}{\overline{X5}}\cdot\overset{0}{\overline{X6}}\cdot\overset{0}{\overline{X7}}\cdot\overset{0}{X8}\cdot\overset{0}{X9}\cdot\overset{0}{X10}\cdot\overset{0}{X14}\cdot\overset{0}{X18}\cdot\overset{0}{X19})+(\overset{0}{\overline{X7}}\cdot\overset{0}{X8}\cdot\overset{0}{X9}\cdot\overset{0}{X10}\cdot\overset{0}{\overline{X19}})]$$

The —12 volt output of gate 1016 can be written:

$$\overset{0}{\overline{CP}}\cdot(\overset{(-)}{\overline{X1}}+\overset{(-)}{X2}+\overset{(-)}{X3}+\overset{(-)}{\overline{X4}})\cdot(\overset{(-)}{X5}+\overset{(-)}{X6}+\overset{(-)}{X18})\cdot\overset{0}{X14}\cdot\overset{0}{X19}$$

The —12 volt output of gate 1017 and 1018 can be written:

$$\overset{0}{\overline{X14}}\cdot\overset{0}{\overline{X20}}$$

The —12 volt output of gate 1019 can be written:

$$[\overset{(-)}{\overline{CP}}+(\overset{0}{\overline{X1}}\cdot\overset{0}{X2}\cdot\overset{0}{X3}\cdot\overset{0}{\overline{X4}})+(\overset{0}{X5}\cdot\overset{0}{X6}\cdot\overset{0}{X18})+(\overset{(-)}{X14}+\overset{(-)}{X19})]\cdot[\overset{(-)}{\overline{X14}}+\overset{(-)}{\overline{X20}}]$$

which can be rearranged $$[\overset{(-)}{\overline{CP}}+(\overset{0}{\overline{X1}}\cdot\overset{0}{X2}\cdot\overset{0}{X3}\cdot\overset{0}{\overline{X4}})+(\overset{0}{X5}\cdot\overset{0}{X6}\cdot\overset{0}{X18})+\overset{(-)}{X14}+\overset{(-)}{X19}]\cdot[\overset{(-)}{\overline{X14}}+\overset{(-)}{\overline{X20}}]$$

The —12 volt output of gate 1020 can be written:

$$[\overset{0}{\overline{CP}}\cdot(\overset{(-)}{\overline{X1}}+\overset{(-)}{X2}+\overset{(-)}{X3}+\overset{(-)}{\overline{X4}})\cdot(\overset{(-)}{X5}+\overset{(-)}{X6}+\overset{(-)}{X18})\cdot\overset{0}{X14}\cdot\overset{0}{X19}]+[\overset{0}{\overline{X14}}\cdot\overset{0}{\overline{X20}}]$$

It will be observed that the output of gate 1004 extends over the BC–1 Conductor 334, LOC cable 816, conductor 334 (FIGURE 3) as an input to gates 316–320.

Accordingly, the —12 volt output of gate 316, for example, can be written:

$$\overset{0}{\overline{X7}}\cdot\overset{0}{\overline{X8}}\cdot\overset{0}{X9}\cdot\overset{0}{X10}\cdot\overset{0}{\overline{CP}}\cdot\overset{0}{X1}\cdot\overset{0}{X2}\cdot\overset{0}{X3}\cdot\overset{0}{X4}\cdot\overset{0}{X5}\cdot\overset{0}{X6}\cdot(\overset{(-)}{X8}+\overset{(-)}{X9}+\overset{(-)}{X10})\cdot\overset{0}{X14}\cdot\overset{0}{X18}\cdot\overset{0}{X16}$$

which can be rearranged $$\overset{0}{\overline{CP}}\cdot\overset{0}{X1}\cdot\overset{0}{X2}\cdot\overset{0}{X3}\cdot\overset{0}{X4}\cdot\overset{0}{X5}\cdot\overset{0}{X6}\cdot\overset{0}{\overline{X7}}\cdot\overset{0}{\overline{X8}}\cdot\overset{0}{X9}\cdot\overset{0}{X10}\cdot(\overset{(-)}{X8}+\overset{(-)}{X9}+\overset{(-)}{X10})\cdot\overset{0}{X14}\cdot\overset{0}{X18}\cdot\overset{0}{X19}$$

The —12 volt output of gate L (FIGURE 5) is the same as the output from gate 1003.

In defining the logical condition of a flip-flop, such as F1 for example, $$\overset{0}{X1}\text{ is equivalent to }\overset{(-)}{\overline{X1}}$$

because X1 is 0 volts and $\overline{\mathbf{X1}}$ is —12 volts; also $$\overset{(-)}{X1}\text{ is equivalent to }\overset{0}{\overline{X1}}$$

because X1 is —12 volts when $\overline{\mathbf{X1}}$ is 0 volts. Also $$\overset{0}{\overline{CP}}\text{ is equivalent to }\overset{(-)}{CP}$$

Using terminology $$\overset{0}{F1}\text{ meaning }F1$$

in the logic 0 condition, for example, whenever $$\overset{0}{X1}\text{ or }\overset{(-)}{\overline{X1}}$$

is encountered;

$$\overset{1}{F1}\text{ meaning }F1$$

in the logic 1 condition whenever $\overset{(-)}{X1}$ or $\overset{0}{\overline{X1}}$ is encountered; and clock when either $\overset{0}{\overline{CP}}$ or $\overset{(-)}{CP}$ is encountered; we can define —12 volts output of certain gates as follows:

The —12 volt output of gate 921 which operates flip-flop F19 can be expressed as follows:

$$\text{Clock}\cdot\overset{0}{F1}\cdot\overset{0}{F2}\cdot\overset{0}{F3}\cdot\overset{0}{F4}\cdot\overset{0}{F5}\cdot\overset{0}{F6}\cdot\overset{0}{F7}\cdot\overset{0}{F8}\cdot\overset{0}{F9}\cdot\overset{0}{F10}\cdot\overset{0}{F14}\cdot\overset{0}{F18}\cdot\overset{0}{F19}$$

The —12 volt output of gate 923 which provides Backward Counter Digital Reset can be expressed as follows:

$$\text{Clock}\cdot\overset{0}{F1}\cdot\overset{0}{F2}\cdot\overset{0}{F3}\cdot\overset{0}{F4}\cdot\overset{0}{F5}\cdot\overset{0}{F6}\cdot\overset{1}{F7}\cdot\overset{0}{F8}\cdot\overset{0}{F9}\cdot\overset{0}{F10}\cdot\overset{0}{F14}\cdot\overset{0}{F18}\cdot\overset{0}{F19}$$

The —12 volt output of gate 1001 which provides Forward Counter Digital Reset can be expressed as follows:

$$\text{Clock}\cdot\overset{1}{F1}\cdot\overset{1}{F4}\cdot\overset{0}{X14}$$

The —12 volt output of gate 1003 which drives flip-flop F13 over conductor 1021 can be expressed as follows:

$$\text{Clock}\cdot\overset{0}{F1}\cdot\overset{0}{F2}\cdot\overset{0}{F3}\cdot\overset{0}{F4}\cdot\overset{0}{F5}\cdot\overset{0}{F6}\cdot(\overset{1}{F8}+\overset{1}{F9}+\overset{1}{F10})\cdot\overset{0}{F14}\cdot\overset{0}{F18}\cdot\overset{0}{F19}$$

The —12 volt output of gate 316 which steps the Backward Counter back from decimal digit 1 for example may be expressed as follows:

$$\text{Clock}\cdot\overset{0}{F1}\cdot\overset{0}{F2}\cdot\overset{0}{F3}\cdot\overset{0}{F4}\cdot\overset{0}{F5}\cdot\overset{0}{F6}\cdot\overset{1}{F7}\cdot\overset{1}{F8}\cdot\overset{0}{F9}\cdot\overset{0}{F10}\cdot(\overset{1}{F8}+\overset{1}{F9}+\overset{1}{F10})\cdot\overset{0}{F14}\cdot\overset{0}{F18}\cdot\overset{0}{F19}$$

Figure 5:
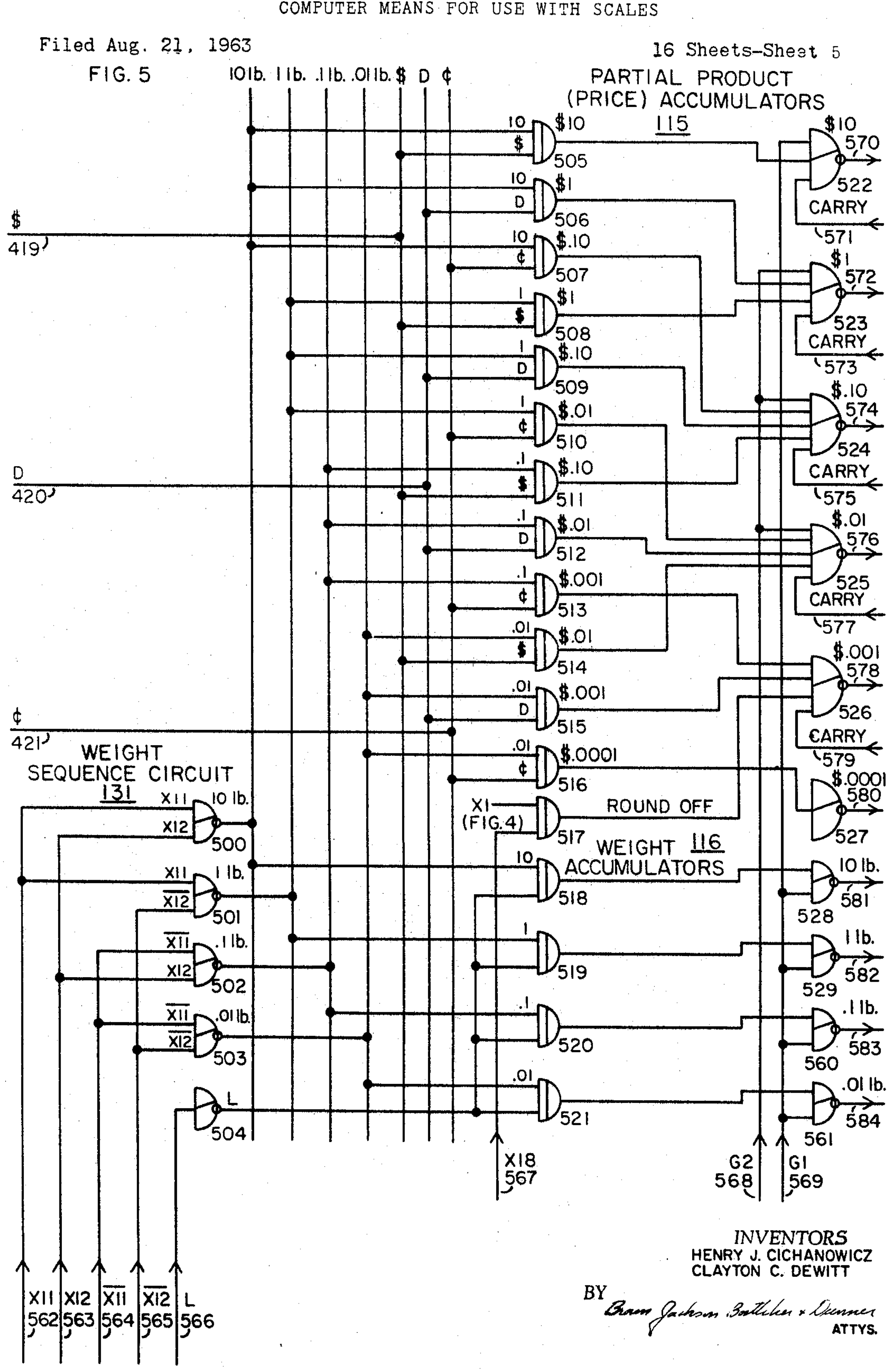

The —12 volt output of gate 504 (L)—FIGURE 5—which contributes to weight accumulation can be expressed as:

$$\text{Clock}\cdot\overset{0}{F1}\cdot\overset{0}{F2}\cdot\overset{0}{F3}\cdot\overset{0}{F4}\cdot\overset{0}{F5}\cdot\overset{0}{F6}\cdot(\overset{1}{F8}+\overset{1}{F9}+\overset{1}{F10})\cdot\overset{0}{F14}\cdot\overset{0}{F18}\cdot\overset{0}{F19}$$

The —12 volt output of gate 1007 which steps flip-flop F6 to control price programming can be expressed as follows:

$$\text{Clock}\cdot\{[\overset{0}{F1}\cdot\overset{0}{F2}\cdot\overset{0}{F3}\cdot\overset{0}{F4}\cdot\overset{0}{F5}\cdot\overset{0}{F6}\cdot(\overset{1}{F8}+\overset{1}{F9}+\overset{1}{F10})\cdot\overset{0}{F14}\cdot\overset{0}{F18}\cdot\overset{0}{F19}]+[\overset{1}{F1}\cdot\overset{0}{F2}\cdot\overset{0}{F3}\cdot\overset{1}{F4}\cdot\overset{0}{F14}\cdot\overset{0}{F18}\cdot\overset{0}{F19}]\}$$

The —12 volt output of gate 1015 which, via conductor 1028, cable LOC, and conductor 1028, steps flip-flop F12 to control weight programming can be expressed as follows:

$$\text{Clock}\cdot[(\overset{1}{F1}\cdot\overset{0}{F2}\cdot\overset{0}{F3}\cdot\overset{1}{F4}\cdot\overset{1}{F5}\cdot\overset{1}{F6}\cdot\overset{1}{F7}\cdot\overset{0}{F8}\cdot\overset{0}{F9}\cdot\overset{0}{F10}\cdot\overset{0}{F14}\cdot\overset{0}{F18}\cdot\overset{0}{F19})+(\overset{1}{F7}\cdot\overset{0}{F8}\cdot\overset{0}{F9}\cdot\overset{0}{F10}\cdot\overset{1}{F19})]$$

The —12 volt output of gate 1010 which controls flip-flop F18 to provide round off can be expressed as follows:

$$\text{Clock}\cdot\overset{1}{F1}\cdot\overset{0}{F2}\cdot\overset{0}{F3}\cdot\overset{1}{F4}\cdot\overset{1}{F5}\cdot\overset{1}{F6}\cdot\overset{1}{F7}\cdot\overset{0}{F8}\cdot\overset{0}{F9}\cdot\overset{0}{F10}\cdot\overset{1}{F11}\cdot\overset{1}{F12}\cdot\overset{0}{F14}\cdot\overset{0}{F18}\cdot\overset{1}{F19}$$

The —12 volt output of gate 1020 which via conductor 411, LOC cable 816 to FIGURE 4, and conductor 411 emerging therefrom drives flip-flop F1 to provide forward counting can be expressed as follows:

$$[\text{Clock}\cdot(\overset{0}{F1}+\overset{1}{F2}+\overset{1}{F3}+\overset{0}{F4})\cdot(\overset{1}{F5}+\overset{1}{F6}+\overset{1}{F18})\cdot\overset{0}{F14}\cdot\overset{0}{F19}]+[\overset{1}{F14}\cdot\overset{1}{F20}]$$

The —12 volt output of gate 1017 or 1018 which provides decade counter readout control can be expressed as follows:

$$\overset{1}{F14}\cdot\overset{1}{F20}$$

The —12 volt output of gate 920 which sets flip-flop F14 via its input ③ to its logic 1 state and resets flip-flop F18 via its input ④ to provide for print start control can be expressed as follows:

$$\text{Clock}\cdot\overset{1}{F1}\cdot\overset{0}{F2}\cdot\overset{0}{F3}\cdot\overset{1}{F4}\cdot F18$$

The meaning of certain patterns in the aforegoing formulae is pointed out as follows:

| | |
|---|---|
| $\overset{0}{F1}\cdot\overset{0}{F2}\cdot\overset{0}{F3}\cdot\overset{0}{F4}$ | Defines the forward counter in the "0" position which is also the reset condition. |
| $\overset{0}{F1}+\overset{1}{F2}+\overset{1}{F3}+\overset{0}{F4}$ | Defines the forward counter in the "NOT 9" position. |
| $\overset{1}{F1}\cdot\overset{0}{F2}\cdot\overset{0}{F3}\cdot\overset{1}{F4}$ | Defines the forward counter in the "9" position. |
| $\overset{1}{F1}\cdot\overset{1}{F4}$ | Also defines the forward counter in the "9" position. |
| $\overset{1}{F1}\cdot\overset{1}{F4}\cdot\overset{0}{F14}$ | With the forward counter in the "9" position and the print cycle not initiated, this defines the condition for initiating forward counter digital reset. |
| $\overset{0}{F5}\cdot\overset{0}{F6}$ | Defines the reset or neutral position of the price programmer. |
| $\overset{1}{F5}\cdot\overset{1}{F6}$ | Defines the completion of program of price programmer. |
| $\overset{1}{F5}+\overset{1}{F6}+\overset{1}{F18}$ | Defines the condition of the price programmer not at neutral or round-off occurring as a condition for allowing the forward counter to be stepped. |
| $\overset{0}{F7}\cdot\overset{0}{F8}\cdot\overset{0}{F9}\cdot\overset{0}{F10}$ | Defines the backward counter in the reset condition. |
| $\overset{1}{F7}\cdot\overset{0}{F8}\cdot\overset{0}{F9}\cdot\overset{0}{F10}$ | Defines the backward counter in the 0 position. |
| $\overset{1}{F8}+\overset{1}{F9}+\overset{1}{F10}$ | Backward counter in a condition appropriate to receive pulse to drive it backward (i.e. backward counter not in the reset or in the "0" position but in one of the conditions 1–9). |
| $\overset{1}{F11}\cdot\overset{1}{F12}$ | Defines the completion of program of weight programmer. |
| $\overset{0}{F14}$ | Defines the computer as not advanced to print cycle. |
| $\overset{1}{F14}$ | Defines the computer as advanced to print cycle. |
| $\overset{0}{F18}$ | Defines the computer as not advanced to round off stage. |
| $\overset{1}{F18}$ | Defines the computer as advanced to round off stage which occurs during the next ten pulses. |
| $\overset{0}{F19}$ | Defines the computer as not advanced to the weight read in stage. |
| $\overset{1}{F19}$ | Defines the computer as advanced to the weight read in stage. |

WEIGHT AND PRICE COMPUTATION

It was stated that weight may vary from .01 to 24.99 pounds and that price per pound may vary from $.01 to $4.99. With the system as illustrated, the total price may vary from $.01 to $99.99.

To illustrate operation of the system, an example is described in which the operator first adjusts the price switches to $1.05 per pound, and then places a package weighing 12.01 pounds on the table of the scale.

Figure 2:
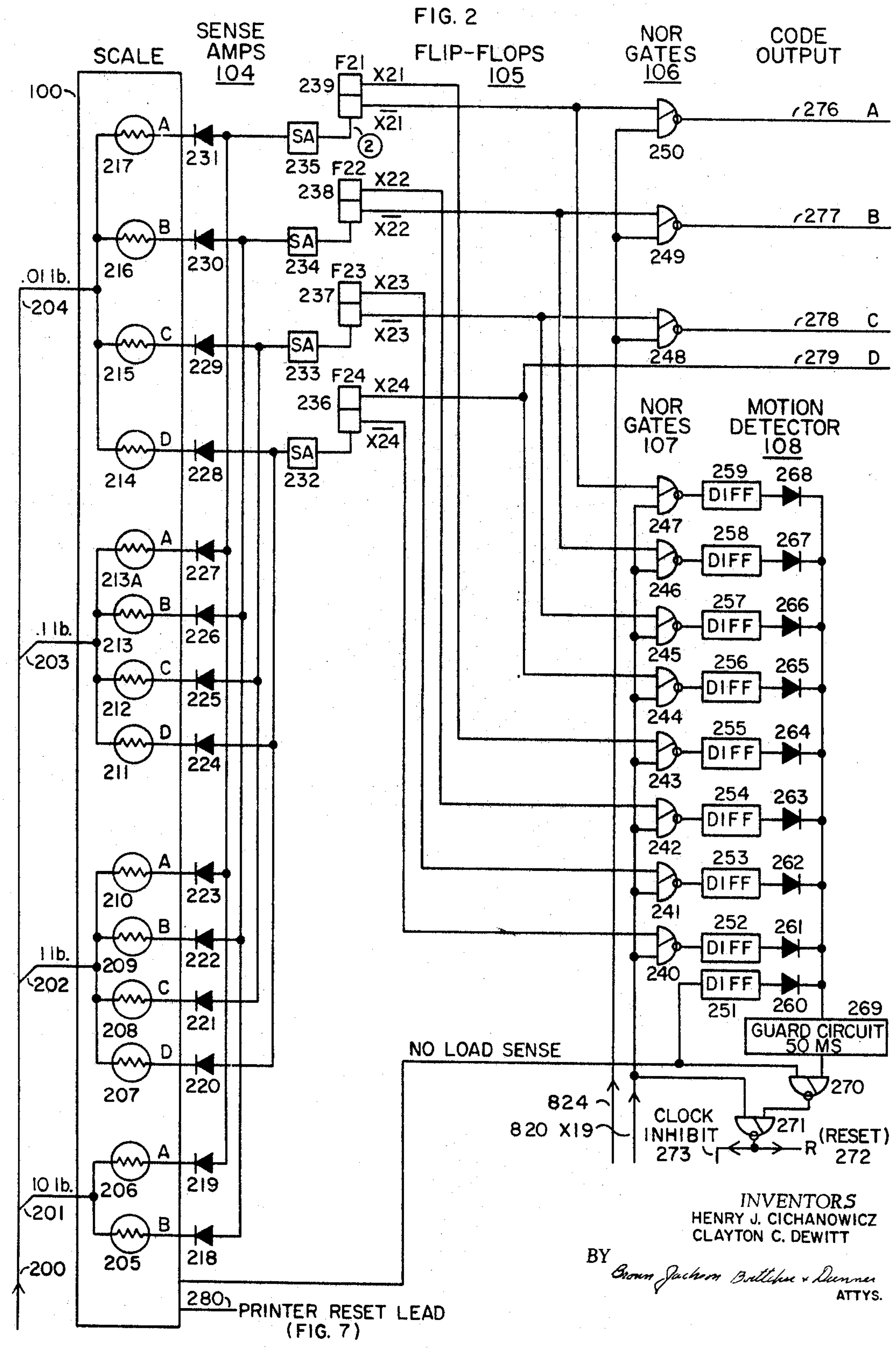

As hereinbefore described, while the Scale 100 is in motion due to the package having been placed thereon, the .01 lb. lead 204 has —12 volts thereon and signals from photoresistors 214–217 result in the transmission of the reset signal and clock inhibit signal over conductors 272, 273 (FIGURE 2). During this period, with X12 (FIGURE 8) at 0 volts and X11 at 0 volts in the weight program circuit 127, both inputs to gate 805 in the scale sequence circuit 122 are at 0 volts, whereby gate 805 places —12 volts over lead 201 (cable 200 to photoresistors 205 and 206 (FIGURE 2)). The movement of the Scale results in signals from these photoresistors which are incidental at this time.

*Clock pulse 1*

When the scale comes to rest with the package thereon the trailing edge of the first clock pulse thereafter which we shall designate clock pulse 1 operates flip-flop 803 (F19—FIGURE 8) to its logic 1 condition in which $\overline{X19}$ was at 0 volts so that the input to gate 808 in the sequence circuit 122 via conductor 819 is at 0 volts. With both inputs at 0 volts, gate 808 puts out −12 volts to inverter 809 which changes its output from −12 volts to 0 volts, removing −12 volts operating potential from lead 204 and photoresistors 214–217.

Also with F19 in the logic 1 condition, X19 becomes −12 volts inhibiting gates 240–247 from response to signals from the Scale 100. Also with $\overline{\mathbf{X19}}$ at 0 volts, gates 248–250 become responsive to signals from the Scale.

With the tens of pounds lead 201 at −12 volts and the Scale 100 stopped to register 12.01 lb. the tens of pounds digit 1 of weight is indicated by light impinging on photoresistors 206 and 205 which represent the A and B members of a binary code which will be described presently.

Photoresistors 206 and 205 reduce their resistance, and negative twelve volts from gate 805, the ten pound lead, photoresistors 206 and 205 and rectifiers 219 and 218 input to Differential Amplifiers 235 and 234 cause these amplifiers to change their outputs from +12 volts to −12 volts causing flip-flops F21 and F22 to assume their logic 1 condition.

0 volts on $\overline{\mathbf{X21}}$ causes NOR gate 250 to put out −12 volts over conductor 276 to input ② of flip-flop F7 (FIGURE 3) causing this flip-flop to assume its logic 1 condition.

0 volts on $\overline{\mathbf{X22}}$ causes NOR gate 249 to put out −12 volts over conductor 277 to input ② of F8, causing F8 to assume its logic 1 condition.

Thus tens of pounds digit 1 is registered in Backward Counter 111 by $$\overset{1}{F7}\cdot\overset{1}{F8}\cdot\overset{0}{F9}\cdot\overset{0}{F10}$$

It should be noted that flip-flops F7, F8, F9, and F10 are placed in logic state 1 in combination corresponding to the photoresistors with lowered resistance in the group of photoresistors being read.

*Code from scale*

Before proceeding further with sequence, the binary decimal units distance reflected cyclic code representing weight issuing from the Scale 100 is briefly considered in the following chart. Column 1 of the chart illustrates various weights in decimal form in which digits from left to right are tens of pounds, pounds, tenths of pounds, and hundredths of pounds. Each of the other four columns represent, in the above named code, one of the decimal digits. Column 2 represents the tens of pounds digit in the above named code. Column 3 represents the pounds digit in the above named code. Column 4 represents the tenths of pounds digit in the above code. Column 5 represents the hundredths of pound digit in the above named code.

Each value in columns 2–5 is represented in four place binary notation, the right place being designated generally the A place; the place next to the left being designated the B place; the next place to the left being designated the C place; and the extreme left place being designated the D place.

In the code, relative to values in any of the column 2–5 in the chart, if the value in the column just to the left is even (decimally speaking):

| Decimal | | DCBA |
|---|---|---|
| 0 | = | 0001 |
| 1 | = | 0011 |
| 2 | = | 0010 |
| 3 | = | 0110 |
| 4 | = | 0100 |
| 5 | = | 1100 |
| 6 | = | 1110 |
| 7 | = | 1010 |
| 8 | = | 1011 |
| 9 | = | 1001 |

However, if the value in the column just to the left is odd (decimally speaking):

| Decimal | | DCBA | |
|---|---|---|---|
| 0 | = | 1001 | Reflected |
| 1 | = | 1011 | |
| 2 | = | 1010 | |
| 3 | = | 1110 | |
| 4 | = | 1100 | |
| 5 | = | 0100 | |
| 6 | = | 0110 | |
| 7 | = | 0010 | |
| 8 | = | 0011 | |
| 9 | = | 0001 | |

In the above, note that the value in place D is inverted, giving a reflected code.

CHART III.—CODE OUTPUT FROM SCALE

| Column 1, Weight in Pounds | Column 2, Tens | Column 3, Units | Column 4, Tenths | Column 5, Hundredths |
|---|---|---|---|---|
| | BA | DCBA | DCBA | DCBA |
| 00.00 | 0001 | 0001 | 0001 | 0001 |
| 00.01 | 0001 | 0001 | 0001 | 0011 |
| 00.02 | 0001 | 0001 | 0001 | 0010 |
| 00,03 | 0001 | 0001 | 0001 | 0110 |
| 00.04 | 0001 | 0001 | 0001 | 0100 |
| 00.05 | 0001 | 0001 | 0001 | 1100 |
| 00,06 | 0001 | 0001 | 0001 | 1110 |
| 00.07 | 0001 | 0001 | 0001 | 1010 |
| 00,08 | 0001 | 0001 | 0001 | 1011 |
| 00.09 | 0001 | 0001 | 0001 | 1001 |
| 00.10 | 0001 | 0001 | 0011 | 1001 |
| 00.11 | 0001 | 0001 | 0011 | 1011 |
| 00.12 | 0001 | 0001 | 0011 | 1010 |
| 00.13 | 0001 | 0001 | 0011 | 1110 |
| 00.14 | 0001 | 0001 | 0011 | 1100 |
| 00.15 | 0001 | 0001 | 0011 | 0100 |
| 00,16 | 0001 | 0001 | 0011 | 0110 |
| 00.17 | 0001 | 0001 | 0011 | 0010 |
| 00.18 | 0001 | 0001 | 0011 | 0011 |
| 00.19 | 0001 | 0001 | 0011 | 0001 |
| 00.20 | 0001 | 0001 | 0010 | 0001 |
| 00.21 | 0001 | 0001 | 0010 | 0011 |
| 00.22 | 0001 | 0001 | 0010 | 0010 |
| 00.23 | 0001 | 0001 | 0010 | 0110 |
| 00.24 | 0001 | 0001 | 0010 | 0100 |
| 00.25 | 0001 | 0001 | 0010 | 1100 |
| 00.26 | 0001 | 0001 | 0010 | 1110 |
| 00.27 | 0001 | 0001 | 0010 | 1010 |
| 00.28 | 0001 | 0001 | 0010 | 1011 |
| 00.29 | 0001 | 0001 | 0010 | 1001 |
| 00.30 | 0001 | 0001 | 0110 | 1001 |
| 00.40 | 0001 | 0001 | 0100 | 0001 |
| 00.50 | 0001 | 0001 | 1100 | 1001 |
| 00.60 | 0001 | 0001 | 1110 | 0001 |
| 00.70 | 0001 | 0001 | 1010 | 1001 |
| 00.80 | 0001 | 0001 | 1011 | 0001 |
| 00.90 | 0001 | 0001 | 1001 | 1001 |
| 00.91 | 0001 | 0001 | 1001 | 1011 |
| 00.92 | 0001 | 0001 | 1001 | 1010 |
| 00.93 | 0001 | 0001 | 1001 | 1110 |
| 00.94 | 0001 | 0001 | 1001 | 1100 |
| 00.95 | 0001 | 0001 | 1001 | 0100 |
| 00.96 | 0001 | 0001 | 1001 | 0110 |
| 00.97 | 0001 | 0001 | 1001 | 0010 |
| 00.98 | 0001 | 0001 | 1001 | 0011 |
| 00.99 | 0001 | 0001 | 1001 | 0001 |
| 01.00 | 0001 | 0011 | 1001 | 0001 |
| 01.01 | 0001 | 0011 | 1001 | 0011 |
| 01.02 | 0001 | 0011 | 1001 | 0010 |
| 01.03 | 0001 | 0011 | 1001 | 0110 |
| 01.04 | 0001 | 0011 | 1001 | 0100 |
| 01.05 | 0001 | 0011 | 1001 | 1100 |
| 01.06 | 0001 | 0011 | 1001 | 1110 |
| 01.07 | 0001 | 0011 | 1001 | 1010 |
| 01.08 | 0001 | 0011 | 1001 | 1011 |
| 01.09 | 0001 | 0011 | 1001 | 1001 |
| 01.10 | 0001 | 0011 | 1011 | 1001 |
| 01.20 | 0001 | 0011 | 1010 | 0001 |
| 01.30 | 0001 | 0011 | 1110 | 1001 |
| 01.40 | 0001 | 0011 | 1100 | 0001 |
| 01.50 | 0001 | 0011 | 0100 | 1001 |
| 01,60 | 0001 | 0011 | 0110 | 0001 |
| 01.70 | 0001 | 0011 | 0010 | 1001 |
| 01.80 | 0001 | 0011 | 0011 | 0001 |
| 01.90 | 0001 | 0011 | 0001 | 1001 |
| 01.91 | 0001 | 0011 | 0001 | 1011 |
| 01,92 | 0001 | 0011 | 0001 | 1010 |
| 01.93 | 0001 | 0011 | 0001 | 1110 |
| 01.94 | 0001 | 0011 | 0001 | 1100 |
| 01.95 | 0001 | 0011 | 0001 | 0100 |
| 01.96 | 0001 | 0011 | 0001 | 0110 |
| 01.97 | 0001 | 0011 | 0001 | 0010 |
| 01.98 | 0001 | 0011 | 0001 | 0011 |
| 01,99 | 0001 | 0011 | 0001 | 0001 |
| 02.00 | 0001 | 0010 | 0001 | 0001 |
| 02.10 | 0001 | 0010 | 0011 | 1001 |
| 02.20 | 0001 | 0010 | 0010 | 0001 |
| 02.30 | 0001 | 0010 | 0110 | 0001 |
| 02.40 | 0001 | 0010 | 0100 | 0001 |
| 02.50 | 0001 | 0010 | 1100 | 1001 |
| 02.60 | 0001 | 0010 | 1110 | 0001 |
| 02.70 | 0001 | 0010 | 1010 | 1001 |
| 02.80 | 0001 | 0010 | 1011 | 0001 |
| 02.90 | 0001 | 0010 | 1001 | 1001 |

CHART III—Continued

| Column 1, Weight in Pounds | Column 2, Tens | Column 3, Units | Column 4, Tenths | Column 5, Hundredths |
|---|---|---|---|---|
| | BA | DCBA | DCBA | DCBA |
| 03.00 | 0001 | 0110 | 1001 | 0001 |
| 04.00 | 0001 | 0100 | 0001 | 0001 |
| 05.00 | 0001 | 1100 | 1001 | 0001 |
| 06.00 | 0001 | 1110 | 0001 | 0001 |
| 07.00 | 0001 | 1010 | 1001 | 0001 |
| 08.00 | 0001 | 1011 | 0001 | 0001 |
| 09.00 | 0001 | 1001 | 1001 | 0001 |
| 10.00 | 0011 | 1001 | 0001 | 0001 |
| 11.00 | 0011 | 1011 | 1001 | 0001 |
| 12.00 | 0011 | 1010 | 0001 | 0001 |
| 13.00 | 0011 | 1110 | 1001 | 0001 |
| 14.00 | 0011 | 1100 | 0001 | 0001 |
| 15.00 | 0011 | 0100 | 1001 | 0001 |
| 16.00 | 0011 | 0110 | 0001 | 0001 |
| 17.00 | 0011 | 0010 | 1001 | 0001 |
| 18.00 | 0011 | 0011 | 0001 | 0001 |
| 19.00 | 0011 | 0001 | 1001 | 0001 |
| 20.00 | 0010 | 0001 | 0001 | 0001 |
| 21.00 | 0010 | 0011 | 1001 | 0001 |
| 22.00 | 0010 | 0010 | 0001 | 0001 |
| 23.00 | 0010 | 0110 | 1001 | 0001 |
| 24.00 | 0010 | 0100 | 0001 | 0001 |
| 24.99 | 0010 | 0100 | 1001 | 0001 |

This provides a code in which only one bit changes at a time in any of the four columns, whereby ambiguity of readout is minimized with error amounting to .01 lb. or less, usually less.

*Clock pulse 2*

Returning to sequential operation, the trailing edge of the very next clock pulse incoming to input ④ of flip-flop F19, after the operation of F7 and F8 to the logic 1 state to register tens of pounds digit "1" in the Backward Counter returns F19 to the logic 0 state.

*Clock pulse 3*

On the next clock pulse, the output of gate 1004 (FIGURE 10) via conductor 334, cable 816, and conductor 334 to gate 316 (FIGURE 3) will have a pulse (−12 volts to 0 volts to −12 volts) thereon because the forward counter 112 is in the neutral position, the price programmer 126 is in the neutral position, the backward counter 111 is not in the "0" position, printing has not been initiated, round-off is not occurring, and flip-flop F19 is in the logic 0 state. The remaining inputs to gate 316 are at 0 volts because of the digit "1" position of the backward counter.

Thus, on this clock pulse, gate 316 gives out a −12 volt pulse, the trailing edge of which is a positive going signal which passes over conductor 1 (cable 336) and rectifier 340 into input ④ of flip-flop F8 to return the flip-flop F8 to its logic 0 state, thus driving the backward counter back to the next lower digital setting of "0" with F7 in the logic 1 state and F8–F10 in the logic 0 state.

The trailing edge of clock pulse 3 also steps flip-flop 901 (F13) to the logic 1 state via the output of gate 1003 conductor 1021, cable 816, and conductor 1021 because of F8 being in the logic 1 state at the time of the pulse as well as certain other conditions being met as will be appreciated by reference to the previous description of the logic for flip-flop F13. In general, it should be appreciated that each clock pulse which drives the backward counter 111 back a step also steps F13, which steps according to the following pattern to keep a record of whether the digit in the Backward Counter 111 is odd or even.

Clock pulse 1 ---------- $\overset{1}{F13}$

Clock pulse 2 ---------- $\overset{0}{F13}$

Clock pulse 3 ---------- $\overset{1}{F13}$

Clock pulse 4 ---------- $\overset{0}{F13}$

Clock pulse 5 ---------- $\overset{1}{F13}$ etc.

so that if the digit in the Backward Counter was odd, F13 will be in the logic 1 state; if even, F13 will be in the logic 0 state.

With flip-flop F8 in the logic 1 state at the time of the third clock pulse and certain other conditions satisfied, the trailing edge of this clock pulse 3 also enables gate 1007 to step flip-flop 1041 (F6—FIGURE 10) to the logic 1 state as will be appreciated by reference to the first part of the logic formula for gate 1007 set forth hereinabove.

Also, as a result of clock pulse 3, the ten pound decade counter receives a pulse to step the counter from the digit "0" to the digit "1" position as now set forth.

Flip-flops 801 (F11) and 802 (F12) control the weight program circuit 127. Leads 564, 565, 562 and 563 (FIGURE 8) which issue from X11 $\overline{X11}$, X12, and $\overline{X12}$ extend in combinations, as shown, to the Weight Sequence Circuit 117 (FIGURE 5) which comprises tens of pounds gate 500, pounds gate 501, tenths of pound gate 502, and hundredths of pound gate 503. Flip-flops X11 and X12 sequentially program gates 500–503 in the order given at appropriate times.

The flip-flops X11 and X12 inputs to ten pound gate 500 are normally at 0 volts whereby gate 500 gives out −12 volts to the ten pound bus which is connected to tens of pound Weight Accumulator AND gate 518, preparing this gate to provide an output.

The other input to weight accumulator gate 518 is connected to the output of inverter 504, the input of which is the Weight Accumulator Lead 566 connected to the output of gate 1005.

By reference to the logic formulae set forth hereinbefore, it will be seen that gate 504 (L) will give a −12 volt output pulse during clock pulse 3 with the forward counter at rest, flip-flops F5 and F6 in the logic 0 state; flip-flops F18 and F19 in the logic 0 state, and with flip-flop F8 in the logic 1 state.

Accordingly, during clock pulse 3, a negative pulse will be put out by gate 504 as an input to gate 518, and gate 518 gives out a negative pulse to gate 528. This causes gate 528 which was normally giving out −12 volts to give out a pulse −12 volts to 0 volts to −12 volts to the ten pound decade counter 607. By reference to the ten dollar decade counter 601 (which is set forth in detail to illustrate the circuitry of counters 601–610), it will be seen that the positive going pulse extends to a NOR gate such as 600 and also causes a gate such as 615 to give out a negative pulse 0 volts to −12 volts to 0 volts as an input to a flip-flop, such as 611, the positive going trailing edge of which causes this flip-flop to assume its logic 1 state to register ten dollars (ten pounds of weight in decade counter 607).

Such operation occurs during clock pulse 3 before the trailing edge of the clock pulse changes flip-flop F6 to the logic 1 state, and flip-flop F8 to the logic 0 state.

Figure 4:
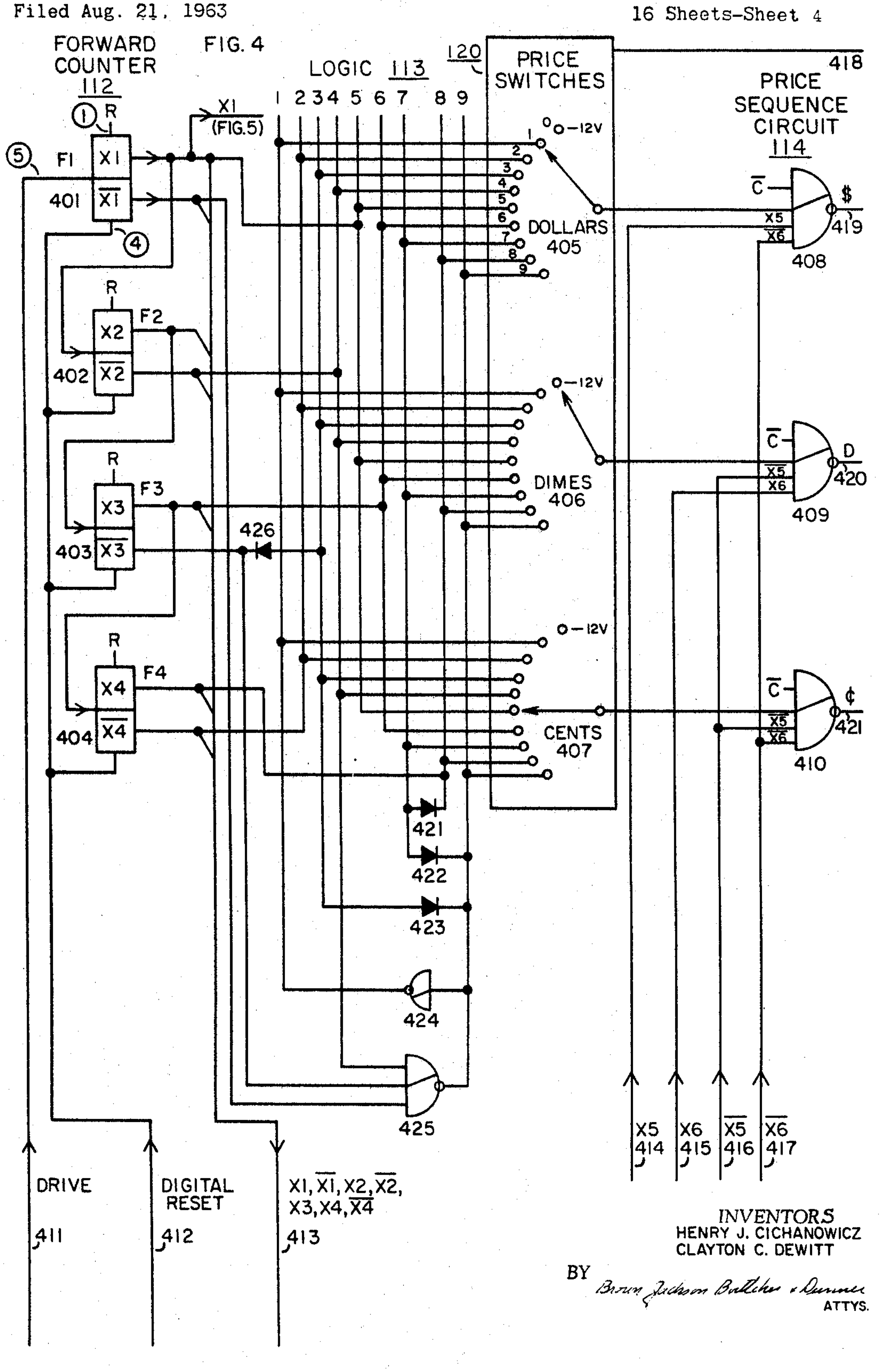

The trailing edges of the next nine clock pulses (i.e. clock pulses 4–12) drive the forward counter comprising flip-flops 401–404 (F1–F4) of FIGURE 4 through nine steps. The trailing edge of the next clock pulse (i.e., 13) resets the forward counter. With the aid of logic circuit 113 (FIGURE 4) 0 volts will be found selectively coincident with clock pulses 4–13 on the numbered buses 1–9 of logic circuit 113 which represent digits and are multiple to bank contacts of the dollars, dimes, and cents price switches of the group 120 (FIGURE 4), the setting of the arms of which determine the digit will be extended to the gates 408–410 of the Price Sequence Circuit 114 of FIGURE 4. The circuitry effects such operation in the following manner.

*Clock Pulse 4*

Referring to the logic formulae for gate 1020 as set forth above, with flip-flop F6 in the logic 1 state, the forward counter in the "NOT 9" state, and certain other conditions met, the next clock pulse CP results in a pulse from forward count gate 1020 (FIGURE 10) over conductor 411, cable 816, conductor 411 to input ⑤ of flip-flop F1 (FIGURE 4) the trailing edge of which drives flip-flop F1 to its logic 1 state.

The flip-flops F1–F4 are interconnected as shown to form an ordered binary counter.

As flip-flop F1 is stepped from logic 0 to logic 1, its output X1 is transferred from 0 volts to −12 volts. It will be seen that this X1 output is connected to input ⑤ of F2 but the change from 0 volts to −12 volts constitutes a negative going signal which (with reference to FIGURE 14E) is blocked by a rectifier from affecting F2.

*Clock pulse 5*

The next clock pulse results in another pulse from gate 1020 to input ⑤ of F1, the trailing edge of which causes F1 to transfer from its logic 1 to its logic 0 state.

As F1 steps from logic 1 to logic 0, its output X1 steps from −12 volts to 0 volts, causing a positive going signal to input ⑤ of F2 which causes F2 to step from logic 0 to logic 1.

*Clock pulse 6*

The next clock pulse results in another pulse from gate 1020, stepping F1 from logic 0 to logic 1.

*Clock pulse 7*

The next clock pulse results in another pulse from gate 1020, stepping F1 from logic 1 to logic 0. The positive going signal on X1 steps F2 from the logic 1 to logic 0. The positive going signal on X2 steps F3 from logic 0 to logic 1.

*Clock pulse 8*

The next clock pulse results in another pulse from gate 1020, stepping F1 from logic 0 to logic 1.

*Clock pulse 9*

The next clock pulse results in another pulse from gate 1020, stepping F1 from logic 1 to logic 0. The positive going signal on X1 steps F2 from logic 0 to logic 1.

*Clock pulse 10*

The next clock pulse results in another pulse from gate 1020, stepping F1 from logic 0 to logic 1.

*Clock pulse 11*

The next clock pulse results in another pulse from gate 1020, stepping F1 from logic 1 to logic 0. The positive going signal on X1 steps X2 from logic 1 to logic 0. The positive going signal on X2 steps X3 from logic 1 to logic 0. The positive going pulse on X3 steps X4 from logic 0 to logic 1.

*Clock pulse 12*

The next clock pulse results in another pulse from gate 1020, stepping F1 from logic 0 to logic 1.

*Clock pulse 13*

The next clock pulse resets the forward counter and steps the price programmer as will be explained shortly.

The states of the forward counter during clock pulses 4–13 is summarized in the following table.

FORWARD COUNTER

| | Binary | X4 | $\overline{X4}$ | X3 | $\overline{X3}$ | X2 | $\overline{X2}$ | X1 | $\overline{X1}$ |
|---|---|---|---|---|---|---|---|---|---|
| Clock Pulse: | | | | | | | | | |
| 4 | 0000 | 0 | −12 | 0 | −12 | 0 | −12 | 0 | −12 |
| 5 | 0001 | 0 | −12 | 0 | −12 | 0 | −12 | −12 | 0 |
| 6 | 0010 | 0 | −12 | 0 | −12 | −12 | 0 | 0 | −12 |
| 7 | 0011 | 0 | −12 | 0 | −12 | −12 | 0 | −12 | 0 |
| 8 | 0100 | 0 | −12 | −12 | 0 | 0 | −12 | 0 | −12 |
| 9 | 0101 | 0 | −12 | −12 | 0 | 0 | −12 | −12 | 0 |
| 10 | 0110 | 0 | −12 | −12 | 0 | −12 | 0 | 0 | −12 |
| 11 | 0111 | 0 | −12 | −12 | 0 | −12 | 0 | −12 | 0 |
| 12 | 1000 | −12 | 0 | 0 | −12 | 0 | −12 | 0 | −12 |
| 13 | 1001 | −12 | 0 | 0 | −12 | 0 | −12 | −12 | 0 |
| | | ↓ Digit 8 | ↓ Digit 2 | ↓ Digit 6 | | | ↓ Digit 4 | ↓ Digit 5 | |

Referring now to FIGURE 4, it will be seen that X1 is connected to logic bus 5. Referring to the above table, it will be seen that X1 is at 0 volts during five clock pulses, i.e., pulses 4, 6, 8, 10, and 12. Thus 0 volts on bus 5 during five clock pulses constitutes digit 5. Bus 5 will be at −12 volts during the alternate five clock pulses.

$\overline{X2}$ is connected to bus 4. From the table, it will be seen that $\overline{X2}$ is at 0 volts during four clock pulses constituting digit 4. Bus 4 will be at −12 volts during six clock pulses.

X3 is connected to bus 6. From the table, it will be seen that X3 is at 0 volts during six clock pulses constituting digit 6. Bus 6 will be at −12 volts during four clock pulses.

X4 is connected to bus 8. From the table, it will be seen that X4 is at 0 volts during eight clock pulses constituting digit 8. Bus 8 will be at −12 volts during two clock pulses.

$\overline{X4}$ is connected to bus 2. From the table, it will be seen that $\overline{X4}$ is at 0 volts during two clock pulses constituting digit 2. Bus 2 will be at −12 volts during eight clock pulses.

The remaining digits 1, 3, 7, and 9 cannot be selected directly from the table but must be derived.

To derive digit 9, bus 9 is connected to the output of NOR gate 425 which has inputs connected to $\overline{X1}$, $\overline{X2}$, and $\overline{X3}$. Bus 9 will be at 0 volts whenever one or more (i.e., at least one) of the inputs is at −12 volts. But by reference to the chart, at least one of $\overline{X1}$, $\overline{X2}$, and $\overline{X3}$ will be at −12 volts during clock pulses 4, 5, 6, 7, 8, 9, 10, 12, and 13, but not on clock pulse 11. Accordingly, with this arrangement, bus 9 will be at 0 volts during nine clock pulses to give digt 9. Bus 9 will be at −12 volts during clock pulse 11.

To derive digt 1, bus 1 is connected to the output of inverter 424, the input of which is connected to bus 9. When bus 9 is at 0 volts, bus 1 will be at −12 volts; but during the single clock pulse that bus 9 is at −12 volts (i.e., clock pulse 11), bus 1 will be at 0 volts to give digit 1. During the other nine clock pulses, bus 1 will be at −12 volts.

To derive digit 3, $\overline{X3}$ is connected to bus 3 via a rectifier poled to pass current when $\overline{X3}$ is at −12 volts and bus 9 is connected to bus 3 via a rectifier poled to pass current when bus 9 is at −12 volts.

By reference to the chart, it can be seen that $\overline{X3}$ is at −12 volts during the fourth, fifth, sixth, seventh, twelfth, and thirteenth clock pulses; and bus 9 is at −12 volts on the eleventh clock pulse; so that bus 3 will be at −12 volts on seven clock pulses; and accordingly will be at 0 volts during three clock pulses, i.e., the eighth, ninth, and tenth. Thus 0 volts on bus 3 during three clock pulses constitutes digit 3.

To derive digit 7, bus 8 is connected to bus 7 via rectifier 421 poled to conduct when bus 8 is at −12 volts, whereby when bus 8 is at −12 volts during clock pulses 12 and 13, bus 7 via rectifier 422 poled to conduct when bus 9 is at −12 volts, whereby when bus 9 is at −12 volts during clock pulse 11, bus 7 also will be at −12 volts. Thus bus 7 will be at 0 volts during seven clock pulses (i.e., clock pulses 4–10) which constitutes digit 7.

In the illustration chosen, it was assumed that the weight is 12.01 lb. and that the Backward Counter 111 registered the tens digit "1" of weight and was driven back a single digit to the digit 0 position. Thereupon the Forward Counter went through a cycle of counting.

In the illustration chosen, it was also assumed that the price per pound is $1.05. Accordingly, the dollars price switch 405 will be set at "1"; the dimes price switch 406 at 0; and the cents price switch 407 at "5".

Referring to dollars gate 408, it will be seen that this gate has four inputs, the first connected to the $\overline{C}$ lead; the second to the arm of the dollars price switch; the third to X5; and the fourth to $\overline{X6}$.

Referring to dimes gate 409, it will be seen that this gate has four inputs, the first connected to the $\overline{CP}$ lead; the second to the arm of the dimes price switch; the third to $\overline{X5}$; and the fourth to X6.

Referring to the cents gate 410, it will be seen that this gate has four inputs, the first connected to the $\overline{CP}$ lead; the second to the arm of the cents switch; the third to $\overline{X5}$; and the sixth to $\overline{X6}$.

Clock pulses $\overline{CP}$ (i.e., −12 volts to 0 volts to −12 volts) are continually trying to cause each of these three gates to give an output. Flip-flops F5 and F6 however program these gates, first the dollars gate, then the dimes gate, then the cents gate.

While a particular gate in the Price Sequence Circuit 114 has been prepared by flip-flops F5 and F6, the 0 volts or −12 volts condition of the arm of the associated price switch during clock pulses via the $\overline{CP}$ input determines whether or not clock pulses succeed in causing an output from the gate.

In the illustrated example, the trailing edge of clock pulse 3, placed flip-flop 1041 (F6) in the logic 1 state. Accordingly, input X5 and $\overline{X6}$ input to gate 408 were both in the 0 volts conditions, following clock pulse 3.

With the arm of the Dollars switch set on terminal 1 for dollars digit 1 during clock pulse 11 (see above), bus 1 of logic 113 goes from −12 volts to 0 volts to −12 volts. During this same clock pulse CP goes from −12 volts to 0 volts to −12 volts.

Accordingly during the eleventh clock pulse all inputs to gate 408 will be found at 0 volts, and during the eleventh clock pulse, the output lead 419 of gate 408 will go from 0 volts to −12 volts to 0 volts.

Lead 419 will be found connected to the dollars ($) bus in FIGURE 5 and accordingly, during the eleventh clock pulse, a negative pulse will appear on this bus which is connected as an input to AND gate 505. The second input of gate 505 is connected to the 10 lb. bus which, as previously described, has −12 volts thereon.

Accordingly, $10 Partial Product Accumulation gate 505 gives out a negative pulse 0 volts to −12 volts to 0 volts to $10 gate 522. The inputs of gate 522 are normally at 0 volts, so that this negative pulse causes gate 522 to give out a pulse −12 volts to 0 volts to −12 volts to inverter 615 in the $10 Decade Counter 601. As a result thereof, the inverter 615 gives out a negative pulse 0 volts to −12 volts to 0 volts to flip-flop 611, the trailing edge of which causes this flip-flop to assume the logic 1 state to register $10.

As before stated, clock pulse 13 resets the forward counter 112 and steps the price programmer 126. Such operation is now described.

Referring to the logic formulae above, it will be recalled that one condition for an output from gate 1020 for forward counting is $$\overset{0}{F1}+\overset{1}{F2}+\overset{1}{F3}+\overset{0}{F4}$$

(i.e., the NOT 9 position). As a result of the previous clock pulse (i.e., clock pulse 12) we found $$\overset{1}{F1},\ \overset{0}{F2},\ \overset{0}{F3},\text{ and }\overset{1}{F4}$$

Accordingly, on clock pulse 13, there will be no pulse output from 1020, and the forward counter will be reset to the digit "0" position as now set forth.

Referring to gate 1001, which has input leads designated $\overline{X1}$, $\overline{X4}$, X14(1), and $\overline{CP}$, after clock pulse 12, the inputs $\overline{X1}$ and $\overline{X4}$ will both be at 0 volts. Also, X14 is at 0 volts because the computer has not advanced to the print stage. Accordingly, on clock pulse 13, the $\overline{CP}$ lead will have a positive pulse −12 volts to 0 volts to −12 volts thereon which will cause gate 1001 to extend a negative pulse to input ④ of each flip-flop F1–F4 in the forward counter over digital reset lead 412. The trailing edge of this negative pulse is a positive going signal which causes flip-flops F1 and F4 (FIGURE 4) each to transfer to its logic 0 state.

Also with the forward counter in the "9" position $$(\overset{1}{F1}\cdot\overset{0}{F2}\cdot\overset{0}{F3}\cdot\overset{1}{F4})\text{ and }\overset{0}{F14},\overset{0}{F18},\text{ and }\overset{0}{F19}$$

(see logic formula for gate 1007) when clock pulse 13 occurs, clock pulse 13 causes gate 1007 to give out a negative pulse, the trailing edge of which steps F6 back to its logic 0 state. In this transfer, the output of X6 goes from −12 volts to 0 volts to provide a positive going signal, which causes flip-flop X5 to assume its logic 1 state. Referring to FIGURE 4, with flip-flops $$\overset{0}{F6}\text{ and }\overset{1}{F5}$$

dollars gate 408 will be inhibited by −12 volts on X5 and $\overline{X6}$; dimes gate 409 will be prepared by 0 volts on $\overline{X5}$ and $\overline{X6}$; and pennies gate 410 will be inhibited by −12 volts on $\overline{X6}$.

It should be observed that although dimes gate 409 is prepared by flip-flops $\overline{X5}$ and X6, the arm of the dimes switch in the "0" position is extended over the bank "0" contact to −12 volts whereby the second round of the forword counter does not result in any pulses output from gate 409 and the output thereof remains at 0 volts to the dimes bus D (FIGURE 5) and to $1 partial product accumulator gate 506. Thus although gate 506 has its other input connected to the 10 lb. bus which is at −12 volts, there will be no output therefrom to $1 gate 523, and accordingly, no output therefrom will pulse $1 decade counter 602, so that "0" dollars remains normally registered therein. If the arm had been on bank terminal 6 for example, 0 volts from X3 to gate 409 when clock pulse 13 occurs would have allowed this clock pulse to produce an output from gate 409.

*Clock pulses 14–22*

As a result of the trailing edge of the next nine clock pulses (clock pulses 14–22), the forward counter 112 steps as described above to selectively control the signals on buses 1–9 of logic 113 but as explained above there will be no outputs from gates 408, 409, or 410. After clock pulse 23, the forward counter lead from gate 1020 is inhibited.

*Clock pulse 23*

When clock pulse 23 occurs with the forward counter in position "9," gate 1007 again puts out a negative pulse, the trailing edge of which steps flip-flop F6 to the logic 1 state. As flip-flop X6 goes from 0 volts to −12 volts, the negative going signal does not step flip-flop F5. The trailing edge of clock pulse 23 also controls gate 1001 to reset the forward counter 112.

*Clock pulses 24–32*

As a result of the next nine clock pulses (clock pulses 24–32), gate 1020 drives the forward counter as described above to selectively control the signals on buses 1–9 of logic 113 (see FIGURE 4).

*Clock pulse 33*

With the clock in the "9" position, clock pulse 33 does not result in a pulse from gate 1020 to drive the forward counter 112, but clock pulse 33 does result in a pulse from gate 1001 over digital reset lead 412 which resets the Forward Counter 112.

During this round of the forward counter 112, gate 410 was conditioned to transmit pulses by $\overline{X5}$ at 0 volts and $\overline{X6}$ at 0 volts. With the arm of the cents switch on bank contact 5 which is connected to bus 5 which is connected to X1, it can be observed by reference to the forward counter table above that X1 will be at 0 volts during clock pulses 24, 26, 28, 30, 32, whereby cents gate 410 gives out negative pulses during these clock pulses.

The output of cents gate 410 is connected over conductor 421 to the cents bus from which there is an input to ($.10) gate 507, the other input of which is connected to the 10 lb. bus which has −12 volts thereon. Accordingly AND gate 507 gives out five negative pulses to $.10 partial product accumulator gate 524. As a result thereof gate 574 changes its output five times from −12 volts to 0 volts to −12 volts which output extends to a NOR gate similar to 615 in the $.10 Decade Counter 603. This NOR gate gives out five negative pulses to the decade counter flip-flops (similar to 611–614) whereby digit 5 is stored therein. Referring to 611 to 614 which we shall can generally F25–F28, the trailing edges of these five pulses step the decade counter as follows, in a fashion similar to the stepping of the Forward Counter 112 already described.

| | | | | |
|---|---|---|---|---|
| Pulse 1 | F25 | F26 | F27 | F28 |
| Pulse 2 | F25 | F26 | F27 | F28 |
| Pulse 3 | F25 | F26 | F27 | F28 |
| Pulse 4 | F25 | F26 | F28 | F28 |
| Pulse 5 | F25 | F26 | F27 | F28 |

A more detailed description of the functioning of the Decade Counters will be included hereinafter.

Also, with the forward counter 112 in position 9

$$(\overset{1}{F1}\cdot\overset{0}{F2}\cdot\overset{0}{F3}\cdot\overset{1}{F4})$$

clock pulse 33 causes price program gate 1007 to give out a negative pulse, the trailing edge of which steps flip-flop 1041 (F6) to its logic 0 position which in turn steps flip-flop F5 to its logic 0 position. With flip-flops F5 and F6 both in the logic 0 state, at least one input to each of price sequence gates 408, 409, and 410 will be negative.

Also, with the forward counter 112 in position 9, the price programmer 126 at its pennies position prior to the trailing edge of the clock pulse, and the Backward Counter 111 in its digit 0 position $$(\overset{1}{F7}\cdot\overset{0}{F8}\cdot\overset{0}{F9}\cdot\overset{0}{F10}),\ \text{and}\ \overset{0}{F14},\ \overset{0}{F18},\ \overset{0}{F19}$$

clock pulse 33 causes weight program gate 1015 to give out a negative pulse which via conductor 1028, cable 816, conductor 1028 steps weight program flip-flop 802 (F12) to its logic 1 state.

With F12 in the logic 1 state, its X12 output changes from 0 volts to −12 volts whereby gate 805 changes its output on 10 pound lead 201 from −12 volts to 0 volts, inhibiting photoresistors 205 and 206.

With $\overline{X12}$ changed to 0 volts, this input to gate 806 together with the X11 input which has remained at 0 volts allows gate 806 to change its output to 1 lb. lead 202 from 0 volts to −12 volts which via cable 200 and conductor 202 prepares photoresistors 207–210.

With X12 at −12 volts 10 lb. NOR gate 500 (FIGURE 5) in the weight sequence circuit 117 changes its output from −12 volts to 0 volts, whereby the 10 lb. bus becomes 0 volts. With X11 at 0 volts and $\overline{X12}$ also at 0 volts, 1 lb. NOR gate 501 in the weight sequence circuit 117 changes its output from 0 volts to −12 volts, whereby 1 lb. bus to which it is connected is likewise prepared by the change from 0 volts to −12 volts.

The shift of potential from the 10 lb. bus to the 1 lb. bus shifts the subsequent partial products over one place, mathematically speaking.

*Clock pulse 34*

Clock pulse 34 causes gate 923 (see logic circuitry formulae) to give out a negative pulse which via Backward Counter Digital Reset lead 329 (lead BCDR), cable 816, and lead 329 to the Backward counter 111 resets the Backward Counter 111 by causing F7 to transfer from its logic 1 to its logic 0 state.

*Clock pulse 35*

Clock pulse 35 causes gate 921 to give out a negative pulse which via conductor 927, cable 816, and conductor 927 to input ⑧ of flip-flop F19 causes this flip-flop to change from its logic 0 to its logic 1 condition.

With weight control flip-flop F19 in its logic 1 state, X19 will be at −12 volts inhibiting NOR gates 240–247; and $\overline{X19}$ will be at 0 volts as input to gates 248–250.

It should be recalled that with flip-flop F12 in the logic 1 state and flip-flop F11 in the logic 0 state, 1 lb. lead 202 (FIGURE 2) has −12 volts thereon. By reference to the code output table it will be recalled that the code for digit "2" is 0010 if the prior digit (i.e., the tens of pounds) is even; and 1010 if the prior digit (i.e., the tens of pounds) is odd. As the tens of pounds digit was odd (i.e., "1"), the code for the pounds digit "2" coming out of the scale will be 1010.

More specifically, with the scale at rest at 12.01 lb., the pounds digit of weight "2" results in photoresistors 209 and 207 (B and D) lowering their resistance due to light impinging thereon, whereby the −12 volts on 1 lb. lead 202 through photoresistors 209 and 207, and rectifiers 222 and 220 causes Differential Amplifiers 234 and 232 to change the outputs thereof from +12 volts to −12 volts causing flip-flops F22 and F24 each to assume the logic 1 state, whereby the output $\overline{X22}$ is changed from −12 volts to 0 volts; and the output X24 is changed from 0 volts to −12 volts.

As a result of 0 volts input from $\overline{X22}$ to gate 249 the −12 volts output from gate 249 via conductor 277 causes flip-flop (F8) to change from the logic 0 to the logic 1 state.

The −12 volts on the 1 lb. lead 202 via photoresistor 207 associated with the D digit, through diode 220 causes Differential Amplifier 232 to change its output from +12 volts to −12 volts whereby the output X22 is changed from 0 volts to −12 volts. This −12 volts via conductor 279 extends to inverter 304 and NOR gate 307.

It will be recalled that odd-even flip-flop 901 (F13) is in its logic 1 state because the 10 lb. digit of weight "1" (i.e., the prior digit) was odd. With F13 in the logic 1 state, flip-flop X13 is at −12 volts and $\overline{X13}$ at 0 volts.

The −12 volts on X13 via conductor 328 input to gate 307 insures that the output from gate 307 will be 0 volts, whereby this input to gate 306 essentially means "no input" so that the NO INVERSION branch is in effect removed from influencing gate 306.

The 0 volts on odd-even flip-flop $\overline{X13}$ via conductor 327 input to gate 305 essentially prepares gate 305 for any other signals incoming thereto. The second incoming signal is determined by the signals on conductor 279. That is, as noted above, −12 volts was connected to conductor 279 because of the inverted code element in the D place. Accordingly, −12 volts on conductor 279 results in 0 volts output from inverter 304 which controls NOR gate 305 to provide −12 volts output therefrom.

This −12 volts is input to NOR gate 306. Since the input from gate 307 is 0 volts, and the weight control $\overline{X19}$ input on lead 274 is 0 volts, the output of NOR gate 306 is 0 volts to input ② of flip-flop F10, and F10 accordingly remains in the logic 0 state.

Thus, we find that the code from the scale (1010) for digit "2" does not result in flip-flop F8 and F10 being placed in the logic 1 state (which would correspond to the inverted code); but results in only F8 being placed in the logic 1 state which corresponds to a non-inverted or non-reflected code (0010). Thus, the code translator 110 comprising gates 304–307 and odd-even flip-flop F13 has translated the code from the inverted or reflected code to a non-inverted or non-reflected code.

Before proceeding with the sequence operation of the system, the code translator 110 is described more generally hereat.

*Code translator 110*

If the previous tens of pounds digit had been odd, as stated, and the pounds digit had been eight pounds, for example, the code from the scale would

DCBA
0010

The 0 in the D position would have resulted in no change in the resistance of photoresistor 207 whereby Differential Amplifier 232 would not have switched its output and flip-flop F24 would have remained in the logic 0 state. Accordingly, X24 would have been at 0 volts. Thus, 0 volts on conductor 279 input to inverter 304 would have resulted in —12 volts output therefrom, and as input to gate 305 would have resulted in 0 volts output from gate 305. This 0 volts input to gate 306 wowuld have resulted in −12 volts output therefrom to the ② input of flip-flop 303 (F10) which would have caused this flip-flop to change to its logic 1 state.

Now let us suppose that the previous digit (i.e., the tens of pounds digit) had been even. F13 would be in the logic 0 state with X13 at 0 volt and $\overline{X13}$ at −12 volts. The −12 volts on $\overline{X13}$ input to gate 305 would insure that the output therefrom would be 0 volt. This 0 volt would be input to gate 306, whereby the INVERSION path is essentially removed from influencing gate 306. The 0 volts on X13 input to gate 307 essentially prepares gate 307 to react according to the other signal input thereto.

If the code element in the D position is 1, flip-flop F24 will be in the logic 1 position with −12 volts on conductor 279. This −12 volts input to gate 307 results in 0 volt, and the input to gate 306 which results in −12 volts to input ② of flip-flop F10, whereby this flip-flop assumes the logic 1 state, so that it corresponds to the logic 1 element of the code.

If the code element in the D position is 0, flip-flop F24 will be in the logic 0 position with 0 volt on conductor 279. This 0 volt input to gate 307 results in −12 volts input to gate 306 which results in 0 volt to input ② of flip-flop F10, whereby this flip-flop remains in the logic 0 state so that it corresponds to the logic 0 element of the code.

*Clock pulse 36*

With weight control flip-flop X19(1) at −12 volts, gate 814 prepares gate 902 so that when clock pulse 36 occurs, the CP input to gate 902 goes from 0 volt to −12 volts to 0 volt, and gate 902 gives out a negative pulse to input ④ of flip-flop 901 (F13) whereby odd-even flip-flop F13 is transferred from the logic 1 to the logic 0 state so that it can "start from scratch" in examining the subsequent backward stepping of the backward counter.

Clock pulse 36 to input ④ of flip-flop F19 as a CP pulse (0 volt to −12 volts to 0 volt) resets F19 to the logic 0 state by the positive going trailing edge of this CP pulse.

*Clock pulse 37*

Figure 3:
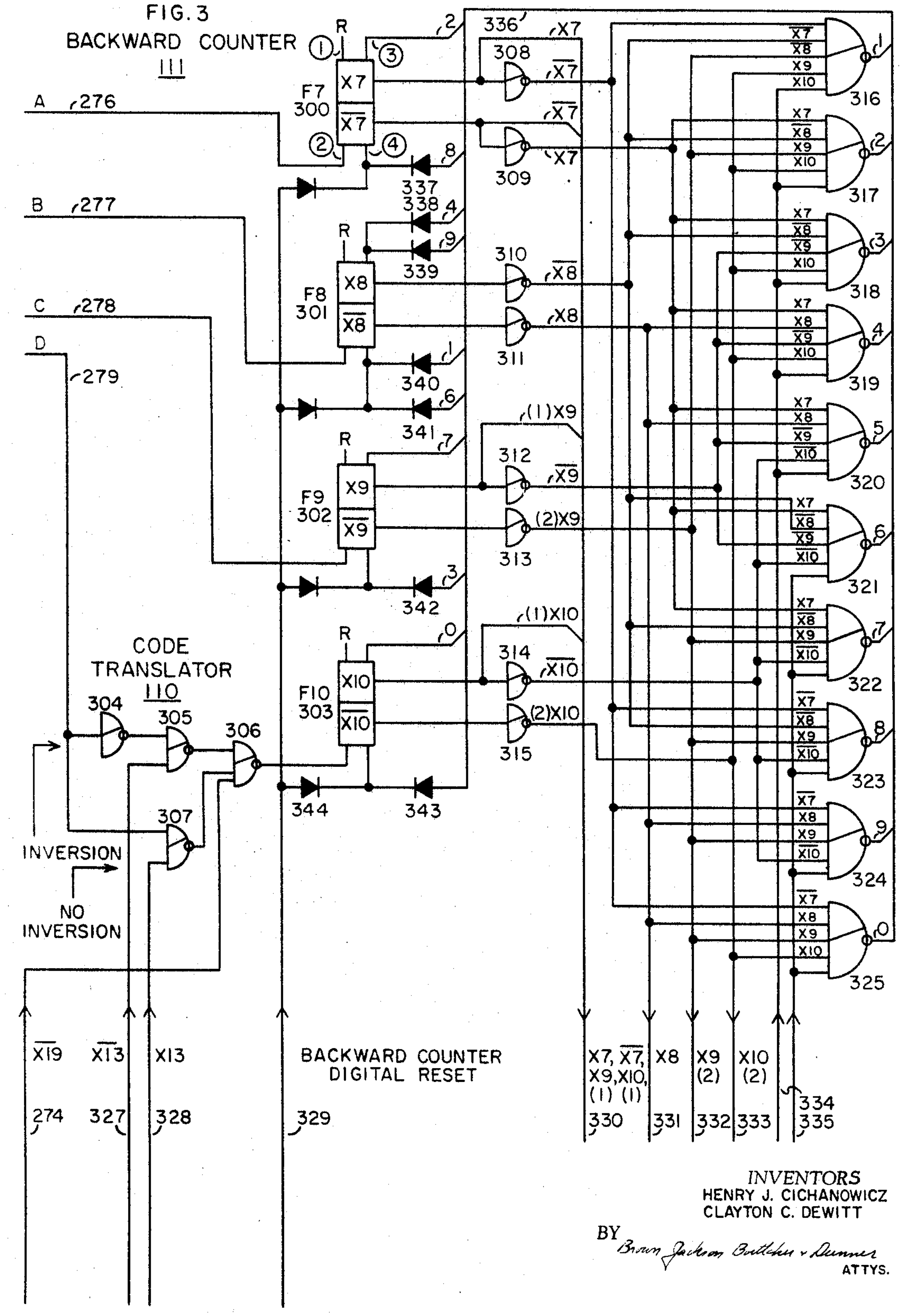

Clock pulse 37 operates gates 1003, 1004, steps the backward counter backward from decimal digit 2 (0010) to decimal digit 1 (0011), the output of gate 1004 extending via conductor 334, cable 816, conductor 334 to FIGURE 3 to gate 317 (digit 2) presenting a pulse −12 volts to 0 volt to −12 volts, as an input to gate 317. with X7, $\overline{X8}$, X9, and X10 all at 0 volt, this pulse results in a negative pulse from gate 317 over digit 2 conductor cable 336, digit 2 conductor via the ③ input conductor to flip-flop F7 which transfers this flip-flop to the logic 1 state.

Clock pulse 37 also steps odd-even flip-flop 901 (F13) from the logic 0 to the logic 1 state as can be verified by reference to the formula for the output of gate 1003.

Also clock pulse 37 steps price program flip-flop 1041 (F6) to logic 1 state on the trailing edge of this pulse, as can be verified by reference to the logic output of gate 1007. Operation of price program flip-flop 1041 prepares the forward counter 112 for drive by the succeeding clock pulses.

*Clock pulses 38–47*

Reference to the logic formula for the output of forward count gate 1020 shows that with flip-flop F6 (1041) and the forward counter in the "NOT 9" position, clock pulses will drive the forward counter. Accordingly, clock pulses 38–46 drive the forward counter as before described and the forty-seventh clock pulse steps flip-flop 1041 (F6) to the logic 0 state (see gate 1007) and resets the forward counter through the action of gate 1001. The stepping of F6 to the logic 0 state steps F5 to the logic 1 state.

During this round of the forward counter 112, with the arm of the dollars switch 405 still set at "1" ($1.05) the arm will receive one positive pulse during pulse 45. With inputs X5 and $\overline{X6}$ to gate 408 at 0 volt, both the dollars arm input and the $\overline{C}$ input will have positive pulses thereon during pulse 45 whereby a negative pulse output therefrom will be found on the dollars bus (FIGURE 5).

With weight sequence gate 501 enabled to couple −12 volts to the 1 lb. bus as input to gate 508 (see clock pulse 33), this negative pulse on the $1 bus causes AND gate 508 to give out a negative pulse to $1 gate 523, which causes gate 523 to give out a positive pulse to the inverter, such as 615, in the $1 Decade Counter which steps this counter.

Referring to gate 409, with $\overset{0}{F6}$ in the price program circuit 126, input X6 will be at 0 volt; and with $\overset{1}{F5}$, input $\overline{X5}$ will be at 0 volt. Gate 409 is thus prepared for operation.

*Clock pulses 48–57*

An inspection of the formula for the output of gate 1020 shows that with $\overset{1}{F5}$ and the foward counter in the "NOT 9" position, clock pulses will drive the forward counter 112. Accordingly, clock pulses 48–56 drive the forward counter 112 as before described, and the fifty-seventh clock pulse steps flip-flop F6 in price program circuit 126 to the logic 1 state (see logic for gate 1007) and resets the forward counter 112 through the action of gate 1001.

During the round of the forward counter with the arm of the dimes switch 406 on the "0" bank terminal (to which −12 volts is solidly connected) gate 409 cannot give an output, whereby $.10 Decade Counter 603 is not stepped which in effect is the same as placing "0" therein.

Referring to gate 410, with $\overset{1}{F6}$, input $\overline{X6}$ will be at 0 volt; and with $\overset{1}{F5}$, input $\overline{X5}$ will be at 0 volt. Accordingly, gate 410 is now prepared to give an output on the next round of the forward counter.

*Clock pulses 58–67*

An inspection of the formula for the output of gate 1020 shows that with $\overset{1}{F5}$ and $\overset{1}{F6}$ and the forward counter in the "NOT 9" position, clock pulses will drive the forward counter 112. Accordingly, clock pulses 58–66 drive the forward counter, as before described, and the sixty-seventh clock pulse steps flip-flop F6 to the logic 0 state (see gate 1007) and resets the forward counter through the action of gate 1001. The stepping of F6 to the logic 0 state in turn steps F5 to the logic 0 state. During the round of the forward counter 112, with the arm of the cents switch 410 set on the bank contact 5 for $.05, this arm will receive five positive pulses during clock pulses 58, 60, 62, 64, and 66. With inputs $\overline{X5}$ and $\overline{X6}$ to gate 410 at 0 volt, both the cents are input and the $\overline{C}$ input will have positive pulses thereon during clock pulses 58, 60, 62 and 64 whereby negative pulses output therefrom will be found on the cents bus (FIGURE 5).

With −12 volts already on the 1 lb. bus as an input to gate 510, these negative pulses on the cents bus cause AND gate 510 to give out five negative pulses to ($.01) gate 525, which causes gate 525 to give out five positive pulses to an inverter, such as 615, in the $.01 Decade Counter to step this counter therein five steps.

*Clock pulse 68*

Clock pulse 68 steps the price program circuit 126 off neutral, backs up the backward counter 111 a step to the digit "0" position, and steps the odd-even flip-flop.

More specifically, price program gate 1007 steps 1041 (F6) to the logic 1 state; digit 1, gate 316 causes flip-flop 301 (F8) to transfer from the logic 1 state to the logic 0 state, whereby the backward counter is then in the digit "0" position (0001); and AND gate 1003 steps odd-even flip-flop 901 (F13) from the logic 1 to the logic 0 state (the pounds digit "2" being even).

*Clock pulses 69–78*

Clock pulses 69–77 drive the forward counter, as described, and Clock pulse 78 resets the forward counter.

It should be observed that during this round of the forward counter the 1 lb. bus (FIGURE 5) remains energized with −12 volts inasmuch as weight program flip-flops F11 and F12 remain in the same position.

With price program flip-flop F6 in the logic 1 state and F5 in the logic 0 state, both inputs X5 and $\overline{X6}$ to gate 408 are in the 0 volts condition, whereby the positive pulse on the arm of dollars price switch 405 at the same time as the $\overline{C}$ pulse input to gate 408 during the seventy-sixth clock pulse results in a single negative pulse output from gate 408 to the dollars bus.

Accordingly coincident negative signals to gate 508 result in a negative pulse to $1 gate 523 which gives out a positive pulse stepping $1 Decade Counter 602.

Clock pulse 78 resets the forward counter as aforestated and also drives flip-flop F6 to its logic 0 state which drives F5 to its logic 1 state, preparing price sequence gate 409.

*Clock pulses 79–88*

Clock pulses 79–87 drive the forward counter as described. Clock pulse 88 resets the forward counter.

During this round of the forward counter the 1 lb. bus (FIGURE 5) remains energized with −12 volts inasmuch as weight program flip-flops F11 and F12 remain in the same position.

With F5 in the logic 1 state and F6 in the logic 0 state, the $\overline{X5}$ and $\overline{X6}$ inputs to gate 409 are both at 0 volts preparing gate 409 but with the arm connected to −12 volts, gate 409 does not give out any pulses whereby the $.10 Decade Counter again is not stepped so that "0" is again "placed" therein.

Clock pulse 88 resets the forward counter as stated above and also steps F6 to the logic 1 state.

*Clock pulses 89–98*

Clock pulses 89–97 drive the forward counter 112 as described. Clock pulse 98 resets the forward counter.

It should be observed that during this round of the forward counter the 1 lb. bus (FIGURE 5) remains energized with −12 volts inasmuch as F11 and F12 remain in the same position.

With F5 and F6 both in the logic 1 state the $\overline{X5}$ and $\overline{X6}$ inputs to gate 410 are both at 0 volt. Again with the arm of price switch 407 on bank contact 5, gate 410 will give out five negative pulses on clock pulses 89, 91, 93, 95, and 97 which via gates 510 and 525 step the $.01 Decade Counter 604.

Clock pulse 98 resets the forward counter as stated above; steps F6 to the logic 0 state, which steps F5 to the logic 0 state; and steps F12 from the logic 1 state to the logic 0 state which steps F11 from the logic 0 state to the logic 1 state.

Reference to the output of gate 1015 (column 21) will show that this clock pulse steps F12 because the forward counter was found in the "9" position $$(\overset{1}{F1}\cdot\overset{0}{F2}\cdot\overset{0}{F3}\cdot\overset{1}{F4})$$

and the price program circuit 126 had reached its last position $$\overset{1}{F5}\cdot\overset{1}{F6}$$

and the backward counter 111 was in the digit "0" position $$\overset{1}{F7}\cdot\overset{0}{F8}\cdot\overset{0}{F9}\cdot\overset{0}{F10} \text{ and } \overset{0}{F14}\cdot\overset{0}{F18}\cdot\overset{0}{F19}$$

*Clock pulse 99*

Clock pulse 99 results in a negative pulse output from gate 923 because of the following condition (see logic formula above):

$$\overset{0}{F1}\cdot\overset{0}{F2}\cdot\overset{0}{F3}\cdot\overset{0}{F4}\cdot\overset{0}{F5}\cdot\overset{0}{F6}\cdot\overset{1}{F7}\cdot\overset{0}{F8}\cdot\overset{0}{F9}\cdot\overset{0}{F10}\cdot\overset{0}{F14}\cdot\overset{0}{F18}\cdot\overset{0}{F19}$$

This negative pulse output from gate 923 extends via conductor 329, cable 816, conductor 329, through a rectifier poled to conduct the positive trailing edge to flip-flop F7 to transfer same from the logic 1 to the logic 0 state, and thereby reset the backward counter 111 from the digit "0" position (0001) to the reset position (0000).

TENTHS OF POUNDS MULTIPLIED BY DOLLARS, DIMES AND CENTS

*Clock pulse 100*

With the following condition met:

$$\overset{0}{F1}\cdot\overset{0}{F2}\cdot\overset{0}{F3}\cdot\overset{0}{F4}\cdot\overset{0}{F5}\cdot\overset{0}{F6}\cdot\overset{0}{F7}\cdot\overset{0}{F8}\cdot\overset{0}{F9}\cdot\overset{0}{F10}\cdot\overset{0}{F14}\cdot\overset{0}{F18}\cdot\overset{0}{F19}$$

(see logic formula above) clock pulse 100 causes gate 921 to put out a negative pulse which, over the path traced hereinbefore to the ③ input of F19 (FIGURE 8) steps weight control flip-flop F19 from the logic 0 to the logic 1 state.

With weight program flip-flop F11 in the "1" state and F12 in the "0" state, the X11 and X12 inputs to gate 807 of the scale sequence circuit 122 will both be at 0 volt. whereby gate 807 gives out −12 volts via conductor 203, cable 200 and the .1 lb. conductor 203 to photoresistors 211, 212, 213, and 213A to prepare these photoresistors.

As the tenths of a pound digit of weight is 0 (recall that the exemplary weight is 12.01 lb.), and the previous digit was even; (i.e., 2) only photoresistor 213A of the group 211–213A will have its resistance lowered by light impinging thereon, whereby the code 0001 will be read out of the scale by low resistance negative potential through diode 231 to low resistance differential amplifier 235 which transfers its output from +12 volts to −12 volts in turn causing flip-flop F21 to assume the logic 1 state, which via gate 250 causes flip-flop F7 (FIGURE 3) to assume the logic 1 state. With F22 and F23 not affected, flip-flops F8 and F9 will not be affected. With flip-flop F24 not affected, X24 wil remain at 0 volt. As F13 is in the logic 0 state because the previous digits (units of pound digit 2) was even, X13 will present 0 volt input to gate 307 and $\overline{X13}$ will present −12 volts input to gate 305 whereby the NO INVERSION path is prepared so that the 0 volt on X24 input to gate 307 results in −12 volts output therefrom to gate 306, which causes the output therefrom to be 0 volt, to the input ② of F10 whereby F10 remains in the logic 0 state.

*Clock pulse 101*

With the backward counter in the digit "0" position $$\begin{matrix} 1 & 0 & 0 & 0 \\ \multicolumn{4}{c}{(F7 \cdot F8 \cdot F9 \cdot F10)} \end{matrix}$$

and the weight control flip-flop F19 in the logic 1 state, i.e., F19, clock pulse 101 results in weight program gate 1015 giving out a negative pulse which steps weight program flip-flop F12 (FIGURE 8) from the 0 to the 1 state.

With F12 in the "1" state and F11 remaining in the "1" state, the X12 input to the .1 lb. gate 502 will be at −12 volts so that the .1 lb. output which is connected to the .1 lb. bus remains at 0 volt. However, with the $\overline{X11}$ and $\overline{X12}$ inputs to gate 503 both at 0 volt, gate 503 gives out −12 volts on the .01 lb. lead which is connected to the .01 lb. bus..

With no signals issuing from gate 511, 512, and 513, no signals will issue from gates 524, 525, and 526, so that the $.10 Decade Counter, the $.01 Decade Counter, and the $.001 Decade Counter are not stepped which is the same as feeding the digit "0" into each of these Decade Counters.

The trailing edge of clock pulse 101 as a CP pulse to input ④ of weight control flip-flop F19 (FIGURE 8) causes F19 to transfer from the "1" state to the "0" state.

Also with flip-flop F19 in the logic 1 state when clock pulse 101 occurs, X19 will be at −12 volts whereby this clock pulse causes gate 902 to give out a negative pulse, the positive going trailing edge of which via the ④ input to F13 (FIGURE 9) tries to reset odd-even flip-flop F13. But F13 is already in the logic 0 state.

*Clock pulse 102*

Clock pulse 102 causes gate 923 to give out a negative pulse, the positive going trailing edge of which via conductor 329, cable 816, conductor 329, and connected diode to the ④ input of flip-flop F7 causes F7 to assume the logic 0 state to reset the backward counter 111.

HUNDREDTHS OF POUND MULTIPLIED BY DOLLARS, DIMES AND CENTS

*Clock pulse 103*

By reference to the logic formula for the output of gate 921, it can be seen that clock pulse 103 causes gate 921 to give out a negative pulse, the positive going trailing edge of which via the ③ input of weight control flip-flop F19 (FIGURE 8) causes F19 to transfer to the logic 1 state.

The $\overline{X19}$ input to scale sequence gate 808 becomes −12 volts. However, prior to this, the $\overline{X11}$ and $\overline{X12}$ inputs to scale sequence gate 804 both became 0 volts (as a result of the 101st clock pulse) whereby the output of gate 804 became −12 volts. This −12 volts input to gate 808 insured that the output of gate 808 would be 0 volt which is input to inverter 809 to insure that the output of inverter 809 would be −12 volts, whereby the 0.1 lb. conductor 204 became activated for scale readout. However, any readout could not get past gates 248–250 until $\overline{X19}$ became 0 volt due to clock pulse 103.

Accordingly, when F19 assumed its logic 1 state due to the trailing edge of clock pulse 103, the hundredths of a pound digit 1 (0011) is read into the backward counter resulting in flip-flops F7 and F8 both assuming the logic 1 state. As the previous digit (i.e., the tenths of a pound digit "0") was even, F13 is in its logic 0 state so that flip-flop F10 remains in its logic 0 state.

*Clock pulse 104*

With weight control flip-flop F19 in the logic 1 state and the X19(1) input via conductor 821 at −12 volts, clock pulse 104 via the CP input to gate 902 causes gate 902 to give out a negative pulse, the positive going trailing edge of which via the input ④ of weight program flip-flop F13 tries to reset F13 to the logic 0 state. However, F13 is already in the logic 0 state.

Clock pulse 104 also resets F19 to the logic 0 state by the CP pulse to input ④ of F19.

*Clock pulse 105*

Clock pulse 105 causes gate 1007 to step the price program circuit 126 to its dollars position by transferring flip-flop 1041 (F6) to the logic 1 state; causes gate 316 (FIGURE 3) to step the backward counter back one step from the digit 1 position (0011) to the digit 0 position (0001) by a negative pulse output therefrom over conductor 1, rectifier 340, to the ④ input of flip-flop 301 (F8), the positive going trailing edge of which transfers F8; and causes gate 1003 to send a negative pulse to flip-flop 901 (F13) whereby F13 transfers from the logic 0 to the logic 1 state.

*Clock pulses 106–115*

Clock pulses 106–114 cause gate 1020 to step the forward counter from the digit 0 position to the digit 9 position in a manner as previously described. Clock pulse 115 causes gate 1001 to reset the forward counter to a digit 0 position.

During this round of the forward counter with X5 and $\overline{X6}$ both at 0 volts, gate 408 gives out a single negative pulse on conductor 419 to the dollars bus from which an input extends to AND gate 514. As the other input to gate 514 is connected to the .01 lb. bus which has −12 volts thereon, this pulse causes gate 514 to give out a negative pulse to gate 525 which gives out a positive pulse to the $.01 Decade Counter 604 stepping this Decade Counter.

Clock pulse 115 resets the forward counter to the digit 0 position as stated; and causes gate 1007 to step the price program 126 to the dimes position by transferring flip-flop 1041 (F6) to the logic 0 state which in turn transfers flip-flop 1040 (F5) to the logic 1 state.

*Clock pulses 116–125*

Clock pulses 116–124 cause gate 1020 to step the forward counter 112 from the digit 0 position to the digit 9 position in a manner as previously described. Clock pulse 125 causes gate 1001 to reset the forward counter 112 to the digit 0 position.

During this round of the forward counter with $\overline{X5}$ and X6 both at 0 volts, price sequence gate 409 prepares to give out pulses but with the arm thereof on the bank 0 terminal to which −12 volts is solidly connected, no pulses are given out by gate 409 to the dimes bus D, whereby gate 515, which already has its other input at −12 volts due to connection with the 0.1 lb. bus, does not give out any pulses to gate 526. Accordingly, gate 526 does not give out any pulses to $.001 Decade Counter 605 which is the same as placing 0 therein.

Clock pulse 125 resets the forward counter to the digit 0 position as stated; and causes price program gate 1007 to step the price programmer to the cents position by transferring flip-flop 1041 (F6) to the logic 1 state.

*Clock pulses 126–135*

Clock pulses 126–134 cause gate 1020 to step the forward counter from the digit 0 position to the digit 9 position in a manner as previously described. Clock pulse 135 causes gate 1001 to reset the forward counter 112 to the digit 0 position as can be appreciated by reference to the output of gate 1001 (see logic formulae above).

During this round of the forward counter with $\overline{X5}$ and $\overline{X6}$ both at 0 volts, due to the connection of the arm to the bank 5 terminal for digit 5, price sequence gate 410 gives out five negative pulses via conductor 421 to the cents bus to which one input of gate 516 is connected. As the other input to gate 516 is connected to the .01 lb. bus which is at −12 volts, partial product gate 516 gives out five negative pulses to gate 527 which gives out five positive pulses via conductor 580 to $.0001 Decade Counter 606 to advance the same five counts.

Clock pulse 135 resets the forward counter 112 to the digit 0 position as described above; resets the weight program to neutral position; causes price program gate 1007 to step the price program to the neutral position by transferring F6 to the logic 0 state, which in turn steps F5 to the logic 0 state, (as can be appreciated by reference to the logic formula above for the output of gate 1007); and causes gate 1010 to give out a negative pulse to input ③ of round-off flip-flop 1101 (F18) causing F18 to transfer to the logic 1 state in preparation for round-off.

Figure 6:
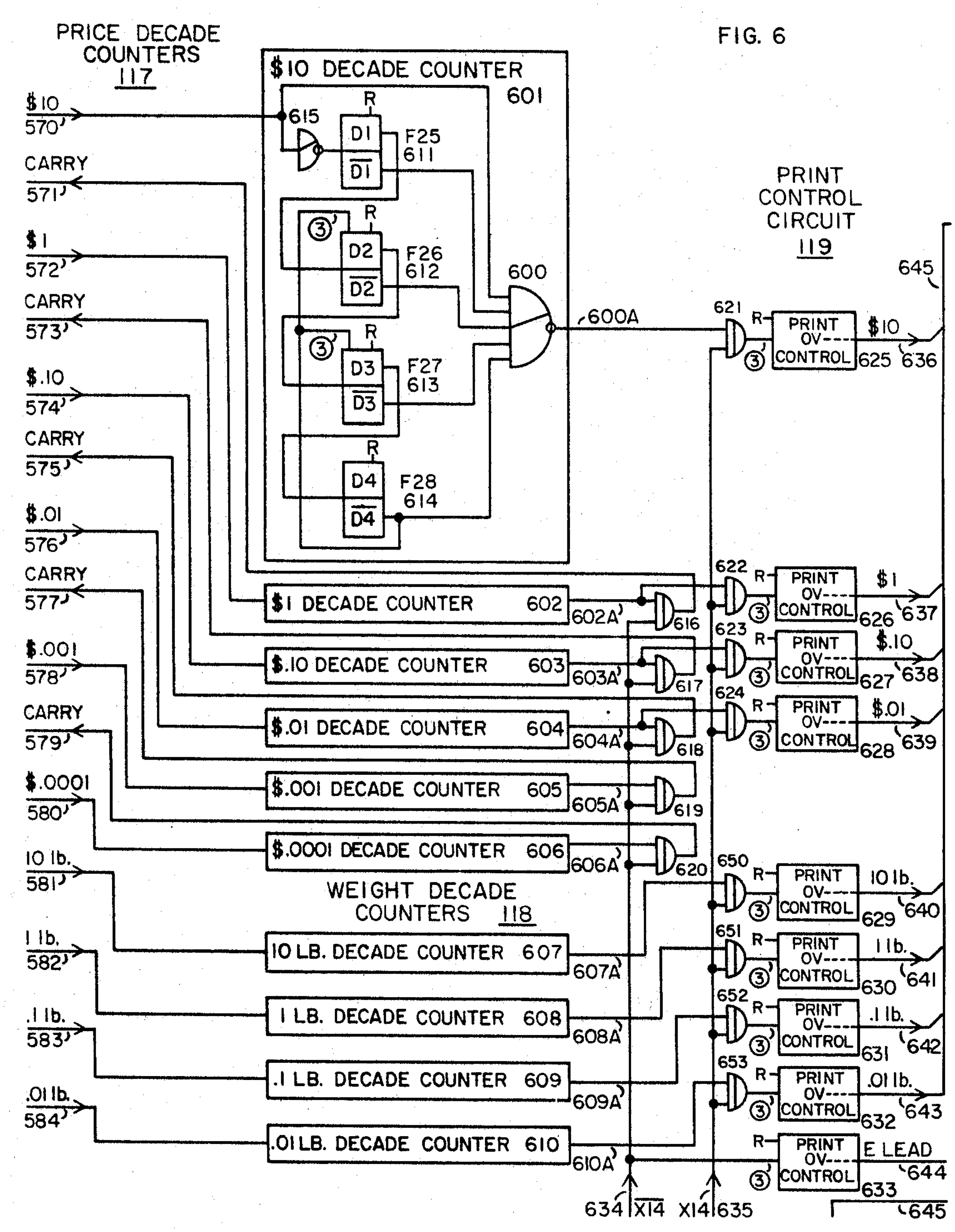

Before proceeding further with the operational sequence, the operation of the Decade Counters of FIGURE 6 is considered in more detail.

*Decade counters*

As the Decade Counters 601–610 (FIGURE 6) are identical, a brief description of the $10 Decade Counter 601 will provide an understanding of the invention.

As noted above, inverter 615 gives out negative pulses which drive the flip-flops F25–F28 of Decade Counters 611–614, the positive going trailing edge of the pulses driving flip-flop F25 which drives succeeding flip-flops F26-F28 by means of connections shown.

Flip-flops F25–F28 are essentially the same as flip-flops F1–F4 (FIGURE 4) using inputs ① and ⑤ but not ④; and having an additional ③ input corresponding to the ③ input of flip-flop F7 as would be understood.

0 0 0 0
Initial condition *F25·F26·F27·F28*

Assuming the decade counter in the reset condition with F25–F28 all in the logic 0 condition, pulses from gate 615 drive the flip-flops as follows.

1 0 0 0
First pulse *F25·F26·F27·F28*

The first pulse transfers flip-flop F25 to the logic 1 state. The transfer of the D1 output from 0 volts to −12 volts constitutes a negative going signal which does not step F26.

0 1 0 0
Second pulse *F25·F26·F27·F28*

The second pulse transfers F25 from the logic 1 state back to the logic 0 state. The transfer of D1 from −12 volts to 0 volt constitutes a positive going signal which causes F26 to transfer from the logic 0 to the logic 1 state.

1 1 0 0
Third pulse *F25·F26·F27·F28*

The third pulse transfers F25 from the logic 0 state to the logic 1 state. The transfer of D1 from 0 volt to −12 volts constitutes a negative going signal which does not step F26.

0 0 1 0
Fourth pulse *F25·F26·F27·F28*

The fourth pulse transfers F25 from the logic 1 state to the logic 0 state. The transfer of D1 from −12 volts to 0 volt constitutes a positive going signal which steps F26 from the logic 1 to the logic 0 state. The transfer of D2 from −12 volts to 0 volt constitutes a positive going signal which steps F27 from the logic 0 to the logic 1 state.

1 0 1 0
Fifth pulse *F25·F26·F27·F28*

The fifth pulse transfers F25 from the logic 0 to the logic 1 state. The transfer of D1 from 0 volt to −12 volts constitutes a negative going signal which does not drive F26.

0 1 1 0
Sixth pulse *F25·F26·F27·F28*

The sixth pulse transfers F25 from the logic 1 to the logic 0 state. The transfer of D1 from −12 volts to 0 volt constitutes a positive going signal which steps F26 from the logic 0 to the logic 1 state.

The transfer of D2 from 0 volt to −12 volts constitutes a negative going signal which does not step F27.

1 1 1 0
Seventh pulse *F25·F26·F27·F28*

The seventh pulse transfers F25 from the logic 0 to the logic 1 state. The transfer of D1 from 0 volt to −12 volts constitutes a negative going signal which does not step F26.

0 0 0 1 0 1 1 1
Eighth pulse *F25·F26·F27·F28* to *F25·F26·F27·F28*

The eighth pulse transfers F25 from the logic 1 to the logic 0 state. The transfer of D1 from −12 volts to 0 volt constitutes a positive going signal which steps F26 from the logic 1 to the logic 0 state. The transfer of D2 from −12 volts to 0 volt constitutes a positive going signal which transfers F27 from the logic 1 to the logic 0 state. The transfer of D3 from −12 volts to 0 volt constitutes a positive going signal which transfers F28 from the logic 0 to the logic 1 state.

So far, the stepping has been that of a straight-forward binary counter, which would continue stepping as indicated in the following table:

| | Stage 1 | Stage 2 | Stage 3 | Stage 4 |
|---|---|---|---|---|
| Pulse: | | | | |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |
| 16 | 0 | 0 | 0 | 0 |

Now, in order to modify a straight four stage binary counter so as to count to ten instead of sixteen, when pulse 8 has stepped the fourth stage, a feedback is taken from the fourth stage to the second and third stages to step these stages, whereby the counter will be found resting in the same position a straight binary counter would after pulse 14, whereby only two more pulses will drive the counter to completion of the cycle and return to the at rest reset position.

Accordingly when F28 transfers from the logic 0 to the logic 1 state on the eighth pulse, $\overline{D4}$ transfers from −12 volts to the 0 volt which constitutes a positive going signal which via the ② input of flip-flops F26 and F27 (which inputs function in the same manner as ③ input of F7, for example) transfers F26 and F27 from the logic 0 to the logic 1 state.

1 1 1 1
Ninth pulse *F25·F26·F27·F28*

The ninth pulse transfers F25 from the logic 0 to the logic 1 state. The transfer of D1 from 0 volt to −12 volts constitutes a negative going pulse which does not step F26.

0 0 0 0
Tenth pulse *F25·F26·F27·F28*

The tenth pulse steps F25 from the logic 1 to the logic 0 state. The transfer of D1 from −12 volts to 0 volt constitutes a positive going signal which steps F26 from logic 1 to the logic 0 state. The transfer of D2 from −12 volts to 0 volt constitutes a positive going signal which steps F27 from the logic 1 to the logic 0 state. The transfer of D3 from −12 volts to 0 volt constitutes a positive going signal which steps F28 from the logic 1 to the logic 0 state. It will be noted that the change of $\overline{D4}$ from 0 volt to −12 volts constitutes a negative going signal which does not further affect F26 and F27.

The following table summarizes this modified operation:

| | Stage 1 F25 | Stage 2 F26 | Stage 3 F27 | Stage 4 F28 |
|---|---|---|---|---|
| Pulse: | | | | |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| | 0 | 1 | 1 | 1 |
| 9 | 1 | 1 | 1 | 1 |
| 10 | 0 | 0 | 0 | 0 |

This modification of a straight four stage binary counter to constitute a decimal counter is given in the following reference: Electronic Industries, March 1962, pp. 95–97, "A Simplified Method of Designing Flip-Flop Counting Circuits" by Eugene A. Rowland, Light Military Electronics Division, General Electric Company, Utica, New York.

With reference now to the NOR gate 600, it will be apparent that gate 600 has inputs from gate 522, $\overline{D1}$, $\overline{D2}$, $\overline{D3}$, and $\overline{D4}$.

If the decade counter is in the di git 4 position $$(\overset{1}{F25}\cdot\overset{1}{F26}\cdot\overset{1}{F27}\cdot\overset{1}{F28})$$

$\overline{D1}$, $\overline{D2}$, $\overline{D3}$ and $\overline{D4}$ are all at 0 volt preparing gate 600, for the next pulse. When the next positive pulse is provided by gate 522 on lead 570, gate 600 gives out a negative pulse. Thus the pulse which steps decade counter from the "9" position to the "0" position, causes gate 600 to give out a negative pulse on output conductor 600A. Decade Counters 602–610 are operated in a similar manner.

Referring now to gates 616–620, it will be observed that one input of each of these gates is connected to lead 634 which has $\overline{X14}$ potential thereon (−12 volts prior to the print cycle). Accordingly, AND gates 616–620 are prepared to give an output.

Referring to gate 620, if pulses input to the $.0001 Decade Counter 606 drive this decade counter from the "9" to the "0" position, a negative pulse is given out on lead 606A which causes AND gate 620 to give out a negative carry pulse over conductor 579 as input to $.001 gate 526 which causes this gate to give out a positive pulse over lead 578 as input to the $.001 Decade Counter 605, advancing it one step to register a carry of "1."

Similarly, referring to gate 619, if pulses input to the $.001 Decade Counter 605 drive this decade counter from the "9" to the "0" position, a negative pulse is given out on lead 605A which causes AND gate 619 to give out a negative carry pulse over conductor 577 as input to $.01 gate 525 which causes this gate to give out a positive pulse over lead 576 as input to the $.01 Decade Counter 604, advancing it one step to register a carry "1."

Gates 618, 617 and 616 are connected in a similar manner. Thus partial products fed into the price decade counters result in carry whenever carry is necessary.

*Clock pulses 136–145 Round-Off*

Referring to the output of forward count gate 1020, it can be seen that with the forward counter in the "NOT 9" position $$(\overset{0}{F1}\cdot+\overset{1}{F2}+\overset{1}{F3}+\overset{0}{F4})\text{ and }\overset{1}{F18}\text{ and }\overset{0}{F14}\cdot\overset{0}{F19}$$

clock pulses 136–144 drive the forward counter from position 0000 to position 1001. Clock pulse 145 resets the forward counter to the 0000 position through the output of gate 1001.

Referring now to Round-Off gate 517 (FIGURE 5) one input of this gate is switched from 0 volt to −12 volts when round-off flip-flop F18 assumes its logic 1 state as a result of clock pulse 135 in preparation for round-off pulses. During the Round-Off cycle of the forward counter 112 during clock pulses 136–145, the other input to AND gate 517 which is connected to X1 (FIGURE 4) will have negative pulses thereon during clock pulses 137, 139, 141, 143, and 145 (see table above).

These five pulses cause AND gate 517 to give out five negative pulses to $.001 gate 526 which gives out five positive pulses as a result thereof over conductor 578 to the $.001 Decade Counter 605.

If Decade Counter 605 had a count therein of five or higher, these five round off pulses would drive it beyond nine which would cause a negative pulse output therefrom to gate 619 which would give out a negative pulse over carry conductor 577 as input to $.01 gate 525 which would give out a positive pulse over conductor 576 to the $.01 Decade Counter 604 advancing it by one step to register another cent.

In the example given, prior to round off the digits in the Price Decade Counters will be as follows:

1 in $10 Decade Counter 601
2 in $1 Decade Counter 602
6 in $.10 Decade Counter 603
1 in $.01 Decade Counter 604
0 in $.001 Decade Counter 605
5 in $.0001 Decade Counter 606

Round off added "5" to the digit in $.001 Decade Counter 605 bringing the digits in the price decade counters to:

1
2
6
1
5
5

As there was no carry from the $.001 Decade Counter 605 to the $.01 Decade Counter 604 the values finally found in the Decade Counters 601–604 will be:

1
2
6
1 } representing $12.61

The digits found in the weight decade counters will be:

1 in 10 lb. Decade Counter 607
2 in 1 lb. Decade Counter 608
0 in .1 lb. Decade Counter 609
1 in .01 lb. Decade Counter 610 } representing 12.01 lb.

out a negative pulse because of the following condition present when the pulse occurs:

$$\overset{1}{F1}\cdot\overset{0}{F2}\cdot\overset{0}{F3}\cdot\overset{1}{F4}\cdot\overset{1}{F18}$$

The positive going trailing edge of this pulse over conductor 935 to the ④ input of round-off flip-flop 1101 (F18) resets F18 to the logic 0 condition. This pulse over conductor 935 to input ③ of flip-flop 1201 (F14) causes F14 to assume the logic 1 condition thus setting F14.

Clock pulse 145 also resets the forward counter 112 as stated above with the condition $$\overset{1}{F1}\cdot\overset{1}{F4}\cdot\overset{0}{F14}$$

as this pulse occurs.

With weight program flip-flop 1201 (F12) in the logic 1 state, X14 is at −12 volts and $\overline{X14}$ at 0 volt.

It should be noted that the 0 volt output of $\overline{X14}$ to inverter 1204 results in −12 volts output therefrom which controls inverter 1204A to provide a 0 volt output therefrom on conductor 634 which inhibits carry gate 616–620.

It should also be noted that −12 volts output of X14 input to inverter 1205, results in 0 volt output therefrom. This 0 volt input to inverter 1205A results in −12 volts output over conductor 635 to prepare AND gates 650–653.

*Print cycle*

The change of potential on conductor 634 (FIGURE 12) from −12 volts to 0 volt constitutes a positive going signal to input ③ of Print Control 633 which connects low resistance 0 volt to its output which, via conductor 644, contacts 768–769 (FIGURE 7), 762–761, winding of relay 759, and contacts 713C–713B (which are presently held closed by cam surface 713A of cam 713) to −12 volts, energizes relay 759. The relay 759 operates and immediately locks over its contacts 761–760 to 0 volt independent of the start circuit conductor 644.

Relay 759 at its contacts 764 operates relay 767 to the path extending from −24 volts over contacts 764–763, 772–771, and the winding of relay 767 to 0 volt. Relay 767 operates and at contacts 771, 770 locks over conductor 280 (which is the Printer Reset Lead) to −24 volts in the Scale, independent of relay 759. Relay 759 at its contacts 766, 765 also operates relay 773 over an obvious path.

Relay 767 operates and at its contacts 768–769 opens the original circuit of relay 759. Relay 773 operates and at its contacts 776–777 connects −24 volts to conductor 750 and at its contacts 774–775 closes a circuit from one terminal of the 115 volts AC source through contacts 784–785, 774–775, the winding of AC relay 778, to a second terminal of the 115 volts AC source to operate relay 778.

*Printer scan pulse 1*

When relay 773 closes contacts 776–777, −24 volts through these contacts on lead 750 to brush member 745A of Sequence Switch 745, over rotatable switch arm 745C resting on terminal 9, through the lead joining all swtich terminals, and over conductor 645, to the ④ input of monostable flip-flop 1202 (F20—FIGURE 12) in the printer sequence circuit 129 constitutes a negative going signal which passes through a differentiating circuit in the flip-flop, causing F20 to transfer to its logic 1 state for approximately a two millisecond interval determined by an RC circuit which is part of F20. Thereafter, F20 reverts to the logic 0 state (see FIGURES 14G and 14H and previous description.)

Thus $\overline{X20}$ goes from −12 volts to 0 volts to −12 volts to provide a positive pulse over conductor 1030 to one input of each NOR gate 1017 and 1018. The other input of each NOR gate 1017 and 1018 is connected to $\overline{X14}$ which is at 0 volt. Accordingly in response to this positive pulse, NOR gates 1017 and 1018 give out a negative pulse on conductors 568 and 569 to accumulator NOR gates 522, 523, 524, 525, 528, 529, 560, and 561 of FIGURE 5.

It will be noted that the negative pulse on conductor 568 is extended as an output to forward count gate 1019 which causes gate 1020 to give out a negative pulse over the forward count conductor 411, cable 816, and conductor 411 to the flip-flop 401 (F1) of the forward counter 112. This can be further appreciated by referring to the last part of the logic formula $$(\overset{1}{F14}\cdot\overset{1}{F20})$$

for the output of gate 1020, this pulse not being controlled by the clock.

Thus the first scan pulse steps the forward counter to the "1" position (0001). (The forward counter is being driven by the scan switch 745 in the counting of the pulses for the purpose of determining that there are not more than ten pulses. As will be seen hereinafter if eleven pulses are received, a print error control signal will be produced).

The negative pulse input to gates 522, 523, 524, 525, 528, 529, 560, and 561 causes these gates to give out a positive pulse to the $10 Decade Counter, the $1 Decade Counter, the $.10 Decade Counter, the $.01 Decade Counter, the 10 lb. Decade Counter, the 1 lb. Decade Counter, the .1 Decade Counter, and the .01 lb. Decade Counter. This changes the count in these Decade Counters as follows:

| | From— | To— |
|---|---|---|
| $10 | 1 | 2 |
| $1 | 2 | 3 |
| $.10 | 6 | 7 |
| $.01 | 1 | 2 |
| 10 lb | 1 | 2 |
| 1 lb | 2 | 3 |
| .1 lb | 0 | 1 |
| .01 lb | 1 | 2 |

Relay 778 at its contacts 779–780 operates relay 783 over an abvious path; and at its contacts 781–782 closes the circuit from the 115 volts AC source to the Print Motor 712 which operates to turn rotary translation mechanisms indicated by a dotted line in such manner as as cause the controlled wheels to turn in a clockwise direction to the position shown in which digit 9 is normally set for visual inspection on wheels 723–730 and in which 9 is normally set adjacent the print bar 746. This resets the print mechanism from the previous weighing. Thereafter the Print Motor 712 in turning drives the wheels and Sequence Switch 745 in sequence in the counter-clockwise direction.

Relay 783 at its contacts 784–785 opens the energizing circuit of relay 778 releasing 778, but cam surface 713B of cam 714 becomes effective upon the turning of cam 714 off-normal to hold contacts 779–780 and 781–783 closed, even with relay 778 released.

At times, the relays 759, 767, 773, and 783 are in the operated condition and relay 778 is released.

As the Print Motor 712 turns the wheels and Sequence Switch 745 counterclockwise in synchronism, arm 745C leaves contact 9, and −124 volts is disconnected from conductor 645 until arm 745C engages contact 8.

As the Sequence Switch arm 745C goes from contact 9 to contact 8, the indicator wheels and print wheels go from 9 in the read and print positions respectively to the 8 position.

*Printer scan pulse 2*

When the arm 745C engages contact 8 in the counterclockwise turning of the Sequence Switch 745, a −24 volts negative going signal via conductor 645 to the ④ input of sequence flip-flop 1202 (F20) transfers F20 to its logic 1 condition again for approximately two milliseconds. F20 gives out a positive pulse over conductor 1030 which causes readout control gaes 1017 and 1018 to give out a negative pulse. The resultant pulse input to gate 1019 causes gate 1020 to give out a negative pulse to forward counter flip-flop 401 (F1) driving it to the logic 0 position. X1 goes from −12 volts to 0 volts constituting a positive going signal which causes flip-flop 402 (F2) to transfer to its logic 1 position.

The negative pulse from readout control gates 1017 and 1018 over conductors 568 and 569 input to accumulator gates 522, 523, 524, 525, 528, 529, 560, and 561 again cause these gates to give out a positive signal to the associated Decade Counters, advancing the same. This changes the count in these Decade Counters as follows:

| | From— | To— |
|---|---|---|
| $10 | 2 | 3 |
| $1 | 3 | 4 |
| $.10 | 7 | 8 |
| $.01 | 2 | 3 |
| 10 lb | 2 | 3 |
| 1 lb | 3 | 4 |
| .1 lb | 1 | 2 |
| .01 lb | 2 | 3 |

*Printer scan pulse 3*

When the arm 745C engages contact 7 in the counterclockwise turning of the Sequence Switch 745, F20 assumes its logic 1 state for approximately two milliseconds. Through means described above, the forward counter steps, assuming its (0011) position. Also the pulse from above listed NOR gates causes the count in the associated Decade Counters to be changed as follows:

| | From— | To— |
|---|---|---|
| $10 | 3 | 4 |
| $1 | 4 | 5 |
| $.10 | 8 | 9 |
| $.01 | 3 | 4 |
| 10 lb | 3 | 4 |
| 1 lb | 4 | 5 |
| .1 lb | 2 | 3 |
| .01 lb | 3 | 4 |

*Printer scan pulse 4*

When the arm 745C engages contact 6 in the counterclockwise turning of the Sequence Switch 745, the forward counter assumes its (0100) position and the pulse from the NOR gates causes the Decade Counters to change as follows:

| | From— | To— |
|---|---|---|
| $10 | 4 | 5 |
| $1 | 5 | 6 |
| $.10 | 9 | 0 |
| $.01 | 4 | 5 |
| 10 lb | 4 | 5 |
| 1 lb | 5 | 6 |
| .1 lb | 3 | 4 |
| .01 lb | 4 | 5 |

As the $.10 Decade Counter 603 goes from 9 to 0, the negative pulse output on lead 603A to associated AND gate 623 causes gate 623 to give out a negative pulse to the 3 input of Print Control 627. As a result, Print Control 627 changes its output to low resistance 0 volts which extends over conductor 638, cable 645 (FIGURE 7), conductor 638 to solenoid 721, conductor 756, and contacts 776–777 to −24 volts. Solenoid 721 operates and pulls an associated cantilever arm, similar to 715A, the end of which engages ratchet 729A of indicator wheel 729 to stop the same. Thus this indicator wheel will be stopped with digit 6 in the visual inspection window in preparation for the inspection of "6" in the dimes position of price. Through mechanical linkage, not shown, this stops the associated print wheel 740 with digit 6 in the print position in preparation for the printing of "6" in the dimes position of price.

Any carry is inhibited by the fact that the $\overline{X14}$ input to gate 617 is at 0 volts.

*Printer scan pulse 5*

When the arm 745C engages contact 5 in the counterclockwise turning of the Sequence Switch 745, the forward counter assumes its (0101) position and the pulse from the NOR gates, causes the Decade Counters to change as follows:

| | From— | To— |
|---|---|---|
| $10 | 5 | 6 |
| $1 | 6 | 7 |
| $.10 | 0 | 1 |
| $.01 | 5 | 6 |
| 10 lb | 5 | 6 |
| 1 lb | 6 | 7 |
| .1 lb | 4 | 5 |
| .01 lb | 5 | 6 |

*Printer scan pulse 6*

When the arm 745C engages contact 4 in the counterclockwise turning of the Sequence Switch 745, the forward counter assumes its (0110) position and the pulse from the NOR gates causes the Decade Counters to change as follows:

| | From— | To— |
|---|---|---|
| $10 | 6 | 7 |
| $1 | 7 | 8 |
| $.10 | 1 | 2 |
| $.01 | 6 | 7 |
| 10 lb | 6 | 7 |
| 1 lb | 7 | 8 |
| .1 lb | 5 | 6 |
| ,01 lb | 6 | 7 |

*Printer scan pulse 7*

When the arm 745C engages contact 3 in the counterclockwise turning of the Sequence Switch 745, the forward counter assumes its (0111) position and the pulse from the NOR gates causes the Decade Counters to change as follows:

| | From— | To— |
|---|---|---|
| $10 | 7 | 8 |
| $1 | 8 | 9 |
| $.10 | 2 | 3 |
| $.01 | 7 | 8 |
| 10 lb | 7 | 8 |
| 1 lb | 8 | 9 |
| .1 lb | 6 | 7 |
| .01 lb | 7 | 8 |

*Printer scan pulse 8*

When the arm 745C engages contact 2 in the counterclockwise turning of the Sequence Switch 745, the forward counter assumes its (1000) position and the pulse from the NOR gates causes the Decade Counters to change as follows:

| | From— | To— |
|---|---|---|
| $10 | 8 | 9 |
| $1 | 9 | 0 |
| $.10 | 3 | 4 |
| $.01 | 8 | 9 |
| 10 lb | 8 | 9 |
| 1 lb | 9 | 0 |
| .1 lb | 7 | 8 |
| .01 lb | 8 | 9 |

As the $1 Decade Counter goes from 9 to 0, the negative pulse output on lead 602A to the associated AND gate 622 causes gate 622 to give out a negative pulse to the ③ input of Print Control 626. As a result, Print Control 626 changes its output to low resistance 0 volts over conductor 637, cable 645, conductor 637 (FIGURE 7) to solenoid 720, conductor 755, and contacts 776–777 to −24 volts. Solenoid 720 operates and pulls an associated cantilever arm, similar to 715A, the end of which engages ratchet 728A of indicator wheel 728 to stop the same. Thus this indicator wheel will be stopped with digit 2 in the visual inspection window in preparation for inspection of "2" in the dollars position of price.

Through mechanical linkage, not shown, this stops the associated print wheel 739 with digit 2 in the print position in preparation for the printing of "2" in the dollars position of price.

Similarly, as the 1 lb. Decade Counter goes from 9 to 0, the negative pulse output on lead 608A to AND gate 651 results in the stoppage of wheels 724 and 735 with digit "2" in the inspection and print positions respectively.

*Printer scan pulse 9*

When the arm 745C engages contact 1 in the counterclockwise turning of the Sequence Switch 745, the forward counter assumes its (1001) position and the pulse from the NOR gate causes the Decade Counters to change as follows:

| | From— | To— |
|---|---|---|
| $10 | 9 | 0 |
| $1 | 0 | 1 |
| $.10 | 4 | 5 |
| $.01 | 9 | 9 |
| 10 lb | 9 | 0 |
| 1 lb | 0 | 1 |
| .1 lb | 8 | 9 |
| .01 lb | 9 | 0 |

As the $10 Decade Counter goes from 9 to 0, wheels 727 and 738 are stopped in the digit 1 position; as the $.01 Decade Counter goes from 9 to 0 wheels 730 and 741 are stopped in the digit 1 position.

As the 10 lb. Decade Counter goes from 9 to 0, wheels 723 and 734 are stopped in the digit 1 position.

Also, as the .01 lb. Decade Counter goes from 9 to 0, wheels 733 and 744 are stopped in the digit 1 position.

*Printer scan pulse 10*

When the arm 745C engages contact 0 in the counterclockwise turning of the Sequence Switch 745, the forward counter assumes its (1010) position, digital reset of the forward counter under the influence of gate 1001 having been prevented by the −12 volts input of X14 (1) to gate 1001. Also, the pulse from the NOR gates causes the Decade Counters to change as follows:

| | From— | To— |
|---|---|---|
| $10 | 0 | 1 |
| $1 | 1 | 2 |
| $.10 | 5 | 6 |
| $.01 | 0 | 1 |
| 10 lb | 0 | 1 |
| 1 lb | 1 | 2 |
| .1 lb | 9 | 0 |
| .01 lb | 0 | 1 |

As the .1 lb. Decade Counter goes from 9 to 0, wheels 725 and 736 are stopped in the digit 0 position.

Thus after ten printer scan pulses the indicator and print wheels will be stopped in the positions as follows:

*Print and indicator wheel positions*

| | |
|---|---|
| $10 | 1 |
| $1 | 2 |
| $.10 | 6 |
| $.01 | 1 |
| 10 lb. | 1 |
| 1 lb. | 2 |
| .1 lb. | 0 |
| .01 lb. | 1 |

This corresponds to what was originally in the Decade Counters (see Printer Scan Pulse 1 above).

*Printer scan pulse 11*

If by error there should be an eleventh printer scan pulse, the forward counter would be driven to the next digital setting (acting as a 16 counter) of (1011).

Referring to FIGURE 9, with $\overline{X1}$, $\overline{X2}$, X3, and $\overline{X4}$ all at 0 volts these inputs to NOR gate 908A result in 0 volts output to a Print Error Control PEC. Error control PEC can be arranged to operate suitable alarm means or effect suitable lockout, etc., until the operator manually effects a release.

*Printing operation*

In the event that there is no eleventh pulse, and assuming after the Sequence Switch 745 has reached terminal 0, the Printer Mechanism causes the print bar 746 to strike against the print wheel characters printing the total price, the price per pound, and the weight on the label (which is positioned between the print bar and the print wheel characters) and to eject the printed label.

As the Printer Mechanism comes to rest, cam 713 opens its contacts 713B–713C releasing relay 759 which releases relay 773 to remove −124 volts from conductor 750.

Thereafter cam 714 opens contacts 779–780, releasing relay C, and opens contacts 781–782 to stop the Print Motor 712.

During the return to rest of the Printer 121, Sequence Switch 745 is driven to position 9, but the wheels remain in their stopped position.

*Removal of package from scale*

Thereupon the operator removes the package from the Scale and affixes the printed label thereto.

As the pan of the scale returns to normal it removes −24 volts from the Printer Reset Lead 280 (see FIGURES 2 and 7) which release relay 767.

As the pan of the scale returns to normal, it transfers the "NO LOAD SENSE" lead from 0 volts to −12 volts. This −12 volts input to gate 270 causes gate 270 to put out 0 volts as an input to gate 271. As the other input is connected to X19(2) which is at 0 volts, gate 271 gives out −12 volts to the reset lead 272, which extends to all points designated "R" to reset the computer. This −12 volts output from gate 271 to inhibit gate 810 keeps clock pulses from reaching the CP and $\overline{CP}$ leads. Thus this inhibit extends to inhibit gate 810 before the X14 (2) inhibit is removed due to reset.

Actually as the pan is returning to normal, and before it reaches its limiting position, light impinging on various photoresistors causes pulses input to the 50 millisecond guard circuit. Guard circuit gives out −12 volts to gate 270 even before −12 volts is incoming to gate 270 from the NO LOAD SENSE lead, thereby initiating reset, and inhibit of clock pulses even before the pan returns to normal.

*Miscellaneous-additional description of backward counter*

To further explain the workings of the Backward Counter, the following table sets forth the various positions the Backward Counter may take:

| | F10 | F9 | F8 | F7 |
|---|---|---|---|---|
| Reset Digit: | 0 | 0 | 0 | 0 |
| 0 | 0 | 0 | 0 | 1 |
| 1 | 0 | 0 | 1 | 1 |
| 2 | 0 | 0 | 1 | 0 |
| 3 | 0 | 1 | 1 | 0 |
| 4 | 0 | 1 | 0 | 0 |
| 5 | 1 | 1 | 0 | 0 |
| 6 | 1 | 1 | 1 | 0 |
| 7 | 1 | 0 | 1 | 0 |
| 8 | 1 | 0 | 1 | 1 |
| 9 | 1 | 0 | 0 | 1 |

Assuming that the Backward Counter is in the digit 9 position, and the counter is stepped backward to the digit 0 position in the following manner.

Normally −12 volts extends from gates 1004 and 1005 over conductor 334 and 335 to NOR gates 316–325 in FIGURE 3.

With the Backward Counter in the digit "9" position (1001) the inputs $\overline{X7}$, X8, X9, and $\overline{X10}$ to gate 324 have 0 volts thereon, so that a positive pulse (−12 volts to 0 volts to −12 volts) on conductor 335 causes NOR gate 324 to give out a negative pulse over conductor 9, cable 336, conductor 9 and diode 339, to the ③ input of F8 causing F8 to assume its logic 1 state whereby the Backward Counter goes from its "9" position (1001) to its "8" position (1011).

With the Backward Counter in the "8" position, the inputs $\overline{X7}$, $\overline{X8}$, X9, and $\overline{X10}$ to gate 323 have 0 volts thereon, so that a positive pulse on conductor 335 causes NOR gate 323 to give out a negative pulse over conductor 8, cable 336, conductor 8, and diode 337 to the ④ input of F7 causing F7 to assume its logic 0 state whereby the Backward Counter goes from its "8" position (1011) to its "7" position (1010).

With the backward counter in the "7" position, the inputs X7, $\overline{X8}$, X9, and $\overline{X10}$ to gate 322 have 0 volts thereon, so that a positive pulse on conductor 335 causes NOR gate 322 to give out a negative pulse over conductor 7, cable 336, and conductor 7 to the ③ input of F9, causing F9 to assume its logic 1 state whereby the Backward Counter goes from its "7" position (1010) to its "6" position (1110).

With the Backward Counter in the "6" position, the inputs X7, $\overline{X8}$, $\overline{X9}$, and $\overline{X10}$ to gate 321 have 0 volts thereon, so that a positive pulse on conductor 335 causes NOR gate 321 to give out a negative pulse over conductor 6, cable 336 and conductor 6 and diode 341 to the ④ input of F8 causing F8 to assume its logic 0 state whereby the Backward Counter goes from its "6" position (1110) to its "5" position (1100).

With the Backward Counter in the "5" position, the inputs X7, X8, $\overline{X9}$, and $\overline{X10}$ to gate 320 have 0 volts thereon, so that a positive pulse on conductor 334 causes NOR gate 320 to give out a negative pulse on conductor 5, cable 336, conductor 5 and diode 343 to the ④ input of F10, causing F10 to assume its logic 0 state whereby the Backward Counter goes from its "5" position (1100) to its "4" position (0100).

With the Backward Counter in the "4" position, the inputs X7, X8, $\overline{X9}$, and X10 to gate 319 have 0 volts thereon, so that a positive pulse on conductor 334 causes NOR gate 319 to give out a negative pulse on conductor 4, cable 336, conductor 4, and diode 338 to the ③ input of F8, causing F8 to assume its logic 1 state whereby the Backward Counter goes from its "4" position (0100) to its "3" position (0110).

With the Backward Counter in the "3" position, the inputs X7, $\overline{X8}$, $\overline{X9}$, and X10 to gate 318 have 0 volts thereon, so that a positive pulse on conductor 334 causes NOR gate 318 to give out a negative pulse on conductor 3, cable 336, conductor 3, and diode 342 to the ④ input of F9, causing F9 to assume its logic 0 state, whereby the Backward Counter goes from its "3" position (0110) to its "2" position (0010).

With the Backward Counter in the "2" position, the inputs X7, $\overline{X8}$, X9, and X10 to gate 317 have 0 volts thereon, so that a positive pulse on conductor 334 causes NOR gate 317 to give out a negative pulse on conductor 2, cable 336, and conductor 2 to the ③ input of F7, causing F7 to assume its logic 1 state, whereby the Backward Counter goes from its "2" position (0010) to its "1" position (0011).

With the Backward Counter in the "1" position, the inputs $\overline{X7}$, $\overline{X8}$, X9, and X10 have 0 volts thereon, so that a positive pulse on conductor 334 causes NOR gate 316 to give out a negative pulse on conductor 1, cable 336, conductor 1 and diode 340 to the ④ input of F8, causing F8 to assume its logic 0 state whereby the Backward Counter goes from its "1" position (0011) to its "0" position (0001).

Gate 325 is for the purpose of special testing and will drive the Backward Counter from the digit "0" position "around the horn" to the digit "9" position. More specifically, with the Backward Counter in the digit "0" position (0001), the inputs $\overline{X7}$, X8, X9, and X10 have 0 volts thereon, so that a positive pulse on conductor 335 causes NOR gate 325 to give out a negative pulse on conductor 0, cable 336, and conductor 0 to the ③ input of F10 causing F10 to assume its logic 1 state whereby the Backward Counter goes from its digit "0" state (0001) to its digit "9" state (1001).

While what is described is regarded to be a preferred embodiment of the invention, it will be apparent that variations, rearrangements, modifications and changes may be made therein without departing from the scope of the present invention as defined by the appended claims.

What is claimed is:

1. In a system for weighing articles and providing a price therefor, computer means including first input means including price registering means for registering the price of the article per unit weight, second input means for providing electrical signals representative of the weight of the article, counter means including means for marking the different digits representing the weight of said article, means for operating the counter means in a reverse count a number of steps proportional to the value of the digt marked thereon, and means operative with said counter means and said price register means to compute the product of the price registered on said price register means and the value of the digit marked on said counter means.

2. In a system for weighing articles and providing a price therefor, computer means including first input means including price registering means for registering the price of the article per unit weight, second input means for providing coded electrical signals representative of the weight of the article and motion detection means including means for detecting motion of the weighing mechanism indicated by the changing value of said signals, including inhibit means for preventing system operation during the period of motion detection, counter means including means for marking the different digits representing the weight of said article, means for operating the counter means in a plurality of reverse counts proportional to the value of the digits marked thereon, and means operative with said counter means and said price register means to compute the product of the price registered on said price register means and the digits which were marked on said counter means.

3. A system as set forth in claim 2 which includes a time delay circuit operative to measure a predetermined period subsequent to receipt of a signal indicating motion from said motion detector means, and means for controlling said inhibit means to prevent operation of said system for said predetermined period.

4. In a system for weighing articles and providing a price therefor, computer means including first input means including unit price registering means for registering the price of the article per unit weight, a second input means for providing electrical signals representative of a plurality of digits which indicates the weight of the article, counter means, weight register means for marking the value of each digit of said plurality on said counter means, sequence control means including weight sequence means for controlling said weight register means to mark said counter means in a predetermined sequence, means in said counter means operative subsequent to marking of each digit thereon to provide the value of the digit marked thereon, and means including said price register means operative with said counter means to provide signals representative of the product of the price registered on said price register means and the value of the digit provided by said counter means.

5. In a system for weighing articles and providing a price therefor, computer means including first input means including unit price registering means for registering the price of the article per unit weight, second input means for providing electrical signals representative of a plurality of digits which indicate the weight of the article, counter means having a plurality of positions, each of which represents a different value digit, weight register means for operating said counter means to the position which represents the value of each digit of said plurality on said counter, scale sequence means including weight program means operative to control transmission of one of said digits to said weight register means for registration on said counter means, means operative subsequent to marking of said digit thereon to operate the counter backward a number of steps consistent with the value of the digit marked thereon, means including said price register means operative with said stepping to provide signals representative of the product of the price registered on said price register means and the digit marked on said counter means, and means operative responsive to completion of said stepping operation to control said weight sequence means to transmit a further digit to said weight register means for marking on said counter means.

6. In a system for weighing articles and providing a price therefor, computer means including first input means including unit price registering means for registering the price of the article per unit weight, second input means for providing electrical signals in a binary decimal reflected code which is representative of a plurality of digits which indicate the weight of the article, each of said digits being represented by a plurality of bit signals, counter means having a plurality of positions, each of which represents a different value digit, weight register means for operating said counter means to the position which represents the value of each digit of said plurality on said counter means, scale sequence means including weight program means operative to control transmission of one of said digits to said weight register means for registration on said counter means, means operative subsequent to marking of said digit thereon to operate said counter means backward a number of steps consistent with the value of the digit marked on said counter means, odd-even means for providing an indication of the odd-even characteristic of the decimal digit marked on said counter means and means for operating said odd-even means with each step of said counter means, means including said price register means operative with said stepping to provide signals representative of the product of the price registered on said price register means and the digit marked on said counter means, and means operative responsive to completion of said stepping operation to control said weight sequence means to transmit a further digit to said weight register means for marking on said counter means.

7. A system as set forth in claim 6 which includes code translator means connected to said odd-even means to translate said binary decimal reflected code to a binary decimal nonreflected code.

8. A system as set forth in claim 6 in which said code translator means includes means for inverting one bit signal of a coded signal for a digit transmitted to said counter means, and in which said odd-even means include means for operating said code translator means only responsive to said odd-even means being in a predetermined condition after the previous stepping of said counter means.

9. In a system for weighing articles and providing a price therefor, computer means including first input means including price registering means for registering the price of the article per unit weight, second input means for providing electrical signals in a binary decimal units distance reflected cyclic code representative of the weight of the article, translator means including odd-even detector means for detecting the occurrence of odd and even digits in the next higher digit order immediately preceding the next lower order digit, and means operative to translate the code for the lower order digit from such reflected code to a nonreflected code whenever said odd-even detector means detect the digit of the preceding order as odd, counter means including means for marking the different digits representing the weight of said article on said counter means, means for operating the counter means in reverse counts a number of steps equal to the value of the digits marked thereon, and means operative with said counter means and said price register means to compute the product of the price registered on said price register means and the value of the digits marked on said counter means.

10. In a system for weighing articles and providing a price therefor, computer means including first input means including price registering means for registering the price of the article per unit weight, second input means for providing electrical signals in a binary decimal reflected units distance code representative of the weight of the article, translator means including means for translating said reflected code to a nonreflected code, counter means connected to said translator means for operation by said signals in said nonreflected code including means for marking the different digits representing the weight of said article, means for operating the counter means in reverse counts a number of steps equal to the value of the digits marked thereon, and means operative with said counter means and said price register means to compute the product of the price registered on said price register means and the value of digits marked on said counter means.

11. In a system for weighing articles and providing a price therefor, computer means including first input means comprising price registering means for registering the price of the article per unit weight a plurality of bistable devices operative in different states to provide marking signals representative of different weight values in a code, motion detector means for detecting changing values in said marking signals, second input means for providing electrical signals representative of the weight of the article to said bistable devices, counter means including means for marking the value of the different digits representing the weight of said article, gate means including means for initially connecting said motion detector means to the output of said bistable devices and means for controlling connection of said output of said bistable devices to said counter means subsequent to termination of motion detection, means for operating said counter means in a plurality of reverse counts proportional to the value of the digits marked thereon, and means operative with said counter means and said price register means to compute the product of the price registered on said price register means and the value of the digits marked on said counter means.

12. In a system for weighing articles and providing a price therefor, computer means including first input means including unit price register means for registering the price of the article per unit weight, second input means for providing electrical signals representative of a plurality of digits which indicate the weight of the article, counter means including means for marking the value of each digit of said plurality in a predetermined sequence, means operative subsequent to marking of each digit thereon to operate said counter means one step at a time from the marked value toward a predetermined reference value to provide the value of the digit marked thereon, and means including said price register means operative with each step of said counter means to provide signals representative of partial product information of the price registered on said price register means and one count of the digit marked on said counter means.

13. In a system for weighting articles and providing a price therefor, computer means including first input means including a plurality of price register means, each of which marks a different digit of the price of the article per unit weight, second input means for providing electrical signals representative of a plurality of digits which indicate the weight of the article, backward counter means including means for marking the value of each digit of said plurality in a predetermined sequence, means operative subsequent to marking of each digit thereon to operate the counter one step at a time from the marked value toward a predetermined reference value to provide the value of the digit marked thereon, a forward counter means including means connected to said price register means, and gate means operative responsive to each backward step of said backward counter to operate said forward counter means in a plurality of cycles to provide the value of the digit registered on each of said price register means, and means including said price register means and said backward counter means operative to provide readout signals representative of the product of said price and said weight.

14. In a system for weighting articles and providing a price therefor, computer means including first input means including a plurality of price register means, each of which marks a different digit of the price of the article per unit weight, second input means including weight program means for providing electrical signals representative of a plurality of digits in a predetermined sequence which indicate the weight of the article, counter means including means for marking the value of each digit of said plurality in a predetermined sequence, means operative subsequent to marking of each digit thereon to operate the counter one step at a time from the marked value toward a predetermined reference value to provide the value of the digit marked thereon, circuit means operative with said price register means and said counter means to provide price signals representative of the price registered on said price register means for each step of said counter means, a plurality of groups of gates, and weight sequence means for preparing a different group of said gates for operation by said price signals responsive to the coupling of each different digit to said counter means.

15. A system as set forth in claim 14 in which said circuit means includes predetermined sequence means for enabling a different gate of the prepared group preparatory to the provision of each different digit by said predetermined register means.

16. In a system for weighing articles and providing a price therefor, computer means including first input means including a plurality of price register means, each of which marks a different digit of the price of the article per unit weight, second input means including weight program means for providing electrical signals representative of a plurality of digits in a predetermined sequence which indicate the weight of the article, counter means including means for marking the value of each digit of said plurality in a predetermined sequence, means operative subsequent to marking of each digit thereon to operate the counter one step at a time from the marked value toward a predetermined reference value to provide the value of the digit marked thereon, circuit means operative with said price register means and said counter means to provide price signals representative of the price registered on said price register means for each step of said counter means, a plurality of groups of partial product gates, weight sequence means for preparing a different group of said gates for operation by said price signals responsive to the coupling of each different digit to said counter means, and a plurality of partial product accumulator gates for gating the partial products of said price registered on said price register means and each of said digits registered on said counter means.

17. In a system for weighing articles and providing a price therefor, computer means including first input means having a plurality of price register means, each of which register means marks a different digit of the price of the article per unit weight, second input means including weight program means for sequentially providing signals representative of a plurality of digits which indicate the weight of the article, counter means including means for marking the value of each digit of said plurality in a predetermined sequence, means operative subsequent to marking of each digit thereon to operate the counter one step at a time from the marked value toward a predetermined reference value to provide the value of the digit marked thereon, a plurality of decade counter means including means operative with said price register means and said counter means to register in said decade counter means the product of the price on said price register means and the weight of said article, and print means connected to said decade counter means to provide a printed record of said product registered on said decade counter means.

18. A system as set forth in claim 17 in which said print means include further means for providing said price of the article per unit weight on said record, and means for providing the weight of said article on said record.

19. In a system for weighing articles and providing a price therefor, computer means including first input means having a plurality of price register means, each of which register means marks a different digit of the price of the article per unit weight, second input means including weight program means for sequentially providing signals representative of a plurality of digits which indicate the weight of the article, counter means including means for marking the value of each digit of said plurality in a predetermined sequence, means operative subsequent to marking of each digit thereon to operate the counter one step at a time from the marked value toward a predetermined reference value to provide the value of the digit marked thereon, a plurality of decade counter means including means operative with said price register means and said counter means to register the digits in said decade counter means for the product of the price registered on said price register means and the weight of said article, and print means for providing a printed record of said product including a set of print wheels, each of which has ten different decimal digits disposed thereon in sequence and each of which is operative to print the value of the digit which is stored in a different one of said decade counters, means for initially setting each of said print wheels to print the digit nine, pulse means for advancing the value of the digit in each of said decade counters one unit higher and simultaneously stepping each of said wheels to print a digit one unit lower, and means for stopping each print wheel responsive to advancement of its associated decade counter to the digit zero, whereby the digit wheel will be operative to print the digits registered on said decade counter.

20. A system as set forth in claim 19 in which said print means include per unit weight print wheels for providing a printed record of the price of the article per unit weight, and means operable with adjustment of said price register means to simultaneously operate said price per unit weight print wheels to corresponding positions for use in the printing thereof on said printed record.

21. In a system for weighing articles and providing a price thereof, computer means including first input means including a plurality of price register means, each of which marks a different digit of the price of the article per unit weight, second input means including scale means for providing the weight of the article and weight program means for providing electrical signals representative of a plurality of digits in a predetermined sequence which indicate the weight of the article provided by said scale means, means for computing the product of the price registered on said price register means and the digits representing the weight of said article, including a plurality of decade counter means for registering the digits of the computed product, and print means for providing a printed record of said product including a set of print wheels, each of which has ten different decimal digits disposed thereon in sequence and each of which is operative to print the value of a different digit which is stored in said decade counters, means for initially setting each of said print wheels to print the digit nine, pulse means for advancing the value of each digit stored in said decade counters one unit higher and simultaneously stepping a corresponding one of said wheels to a digit one unit lower, and means for stopping each print wheel responsive to advancement of its associated digit in the decade counters to the digit zero, whereby the digit wheel will be operative to print the digits originally registered on said decade counter.

22. In a system for weighing articles and providing a price therfor, computer means including first input means including a plurality of price register means, each of which marks a different digit of the price of the article per unit weight, second input means including scale means for providing the weight of the article, and weight program means for providing electrical signals representative of a plurality of digits in a predetermined sequence which indicate the weight of the article provided by said scale means, means for computing the product of the price registered on said price register means and the weight of said article including price decade counter means for registering the digits of the computed product, print means for providing a printed record of said product and the weight of said article including weight decade counter means for storing the value of each of said plurality of digits which represent the weight, a set of print wheels each of which is operative to print the value of the digit which is stored in a different one of said price and weight decade counters, means for initially setting each of said print wheels to print the digit nine, pulse means for advancing the value of the digit in each of said decade counters one unit higher and simultaneously stepping each of said wheels to print a digit one unit lower, and means for stopping each print wheel responsive to advancement of its associated decade counter to the digit zero, whereby the digit wheel will be operative to print the digits registered on said decade counter.

23. In a system for weighing articles and providing a price therefor, computer means including first input means including a plurality of price register means, each of which marks a different digit of the price of the article per unit weight, second input means including weight program means for providing electrical signals representative of a plurality of digits in a predetermined sequence which indicate the weight of the article, counter means including means for marking the value of each digit of said plurality in a predetermined sequence, means operative subsequent to marking of each digit thereon to operated the counted one step at a time from the marked value toward a predetermined reference value to provide the value of the digit marked thereon, means operative with said price register means and said counter means to provide the product of the price registered on said price register means and the weight of said article, weight decade counter means for storing the value of each of said plurality of digits which represent said weight, means controlled by said counter means in its operation to store the value of each of said digits thereon, and print means for providing a printed record of said product and the weight of said article including a set of print wheels each of which has ten different decimal digits disposed thereon in sequence and each of which is operative to print the value of the digit which is stored in a different one of said decade counters, means for initially setting each of said print wheels to print the digit nine, pulse means for advancing the value of the digit in each of said decade counters one unit higher and simultaneously stepping each of said wheels to print a digit one unit lower, and means for stopping each print wheel responsive to advancement of its associated decade counter to the digit zero, whereby the digit wheel will be operative to print the digits degistered on its associated decade counter.

No references cited.

MALCOLM MORRISON, *Primary Examiner.*

W. M. JOHSON, K. W. DOBYNS,
*Assistant Examiners.*